United States Patent
Foresman et al.

(10) Patent No.: US 10,349,614 B2
(45) Date of Patent: Jul. 16, 2019

(54) VISION SYSTEM FOR TEAT DETECTION

(71) Applicant: Technologies Holdings Corp., Houston, TX (US)

(72) Inventors: Mark A. Foresman, Houston, TX (US); Marijn Van Anart, Marknesse (NL)

(73) Assignee: Technologies Holdings Corp., Houston, TX (US)

( * ) Notice: Subject to any disclaimer, the term of this patent is extended or adjusted under 35 U.S.C. 154(b) by 182 days.

(21) Appl. No.: 15/448,879

(22) Filed: Mar. 3, 2017

(65) Prior Publication Data

US 2018/0049394 A1    Feb. 22, 2018

Related U.S. Application Data

(63) Continuation-in-part of application No. 15/239,559, filed on Aug. 17, 2016, now Pat. No. 9,936,670.

(51) Int. Cl.
| | | |
|---|---|---|
| *G06K 9/00* | (2006.01) | |
| *A01J 5/007* | (2006.01) | |
| *A01J 5/017* | (2006.01) | |
| *G01B 11/24* | (2006.01) | |

(52) U.S. Cl.
CPC .............. *A01J 5/007* (2013.01); *A01J 5/0175* (2013.01); *G01B 11/24* (2013.01); *G06K 9/00664* (2013.01)

(58) Field of Classification Search
None
See application file for complete search history.

(56) References Cited

U.S. PATENT DOCUMENTS

| | | | | |
|---|---|---|---|---|
| 5,718,186 A * | 2/1998 | van der Lely | ........ | A01J 5/0175 119/14.03 |
| 5,934,220 A * | 8/1999 | Hall | ........................ | G06T 7/70 119/14.08 |
| 6,227,142 B1 * | 5/2001 | Birk | ....................... | A01J 5/0175 119/14.08 |
| 6,450,118 B1 * | 9/2002 | Eppers, Jr. | .............. | A01J 5/017 119/14.53 |

(Continued)

OTHER PUBLICATIONS

Design and Management of Automatic Milking Systems, Toby Trevor Fury Mottram, Researchgate, 1992, pp. 6-12 and 87-119 (Year: 1992).*

*Primary Examiner* — Jayesh A Patel
(74) *Attorney, Agent, or Firm* — Baker Botts L.L.P.

(57) ABSTRACT

A system includes a robotic arm, memory, and a processor. The processor is configured to access first and second success counters stored in the memory. The first success counter is associated with a first attach algorithm and the second success counter is associated with a second attach algorithm. The processor is further configured to determine whether the first success counter is greater than the second success counter. The processor is further configured to execute the first attach algorithm if the first success counter is greater than the second success counter, and to execute the second attach algorithm if the first success counter is not greater than the second success counter. The processor is further configured to increment the first success counter if the first attach algorithm is successful, and to increment the second success counter if the second attach algorithm is successful.

20 Claims, 22 Drawing Sheets

(56) References Cited

U.S. PATENT DOCUMENTS

| | | | |
|---|---|---|---|
| 6,742,474 B2* | 6/2004 | van den Berg | A01J 5/007 119/14.08 |
| 7,017,515 B1* | 3/2006 | Ruda | A01J 5/007 119/14.01 |
| 7,614,361 B2* | 11/2009 | Van Den Berg | A01J 5/0175 119/14.02 |
| 8,807,079 B2* | 8/2014 | Nilsson | A01J 5/017 119/14.02 |
| 2002/0152963 A1* | 10/2002 | Vijverberg | A01J 5/0175 119/14.08 |
| 2006/0196432 A1* | 9/2006 | Peacock | A01J 5/0175 119/14.08 |
| 2007/0215652 A1* | 9/2007 | Rockow | B65D 47/0842 222/565 |
| 2007/0277737 A1* | 12/2007 | Maier | A01J 5/007 119/14.45 |
| 2008/0314324 A1* | 12/2008 | Pettersson | A01J 5/0175 119/14.08 |
| 2010/0307420 A1* | 12/2010 | Axelsson | A01J 5/0175 119/14.02 |
| 2012/0097107 A1* | 4/2012 | Torgerson | A01J 5/007 119/14.02 |
| 2013/0036975 A1* | 2/2013 | Carlsson | A01J 5/007 119/14.08 |
| 2013/0098295 A1* | 4/2013 | Mulder | A01J 5/007 119/14.02 |
| 2013/0239897 A1* | 9/2013 | Birk | A01J 5/0175 119/14.04 |
| 2013/0319336 A1* | 12/2013 | Thompson | A01J 5/007 119/14.02 |
| 2013/0340682 A1* | 12/2013 | Bareket | A01J 5/0175 119/14.02 |
| 2014/0000520 A1* | 1/2014 | Bareket | A01J 5/0175 119/14.02 |

* cited by examiner

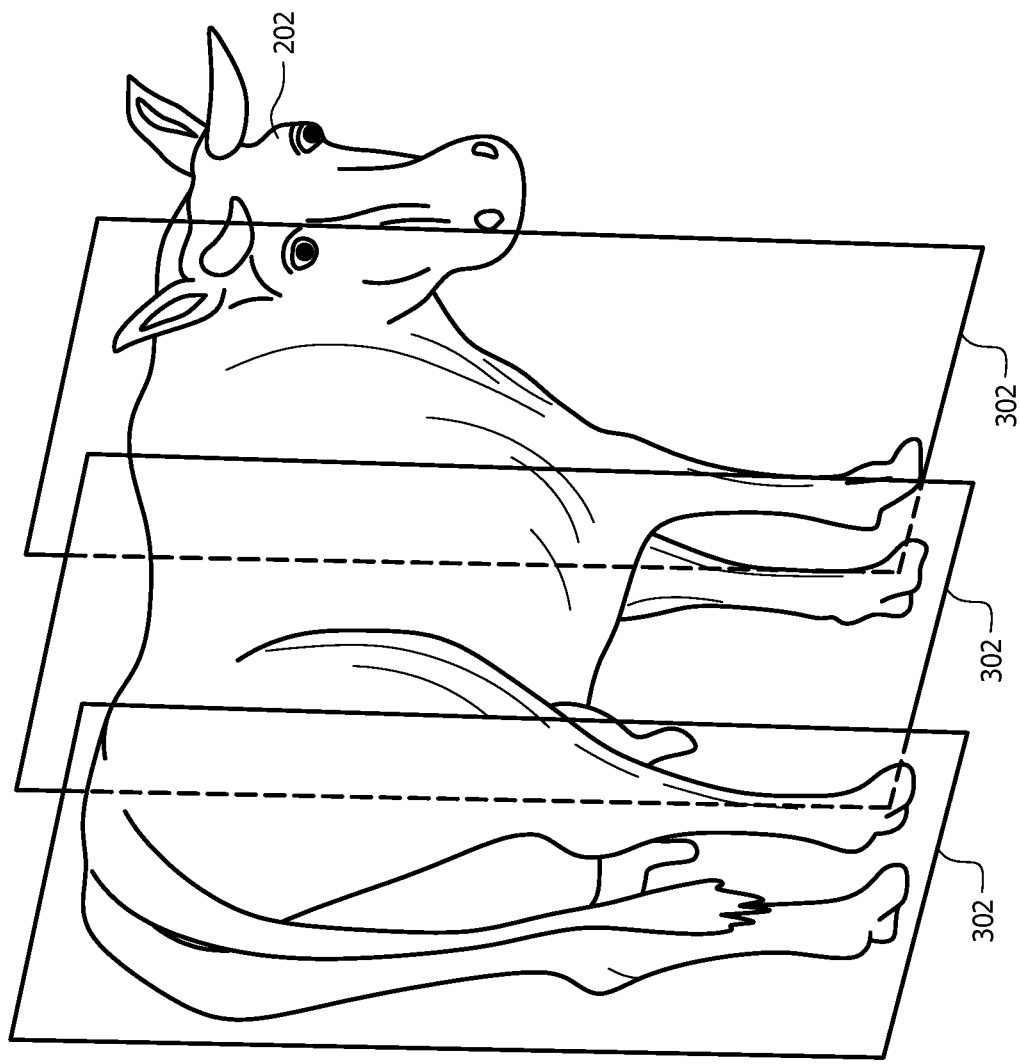
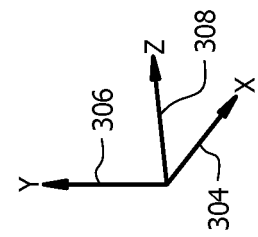
FIG. 3

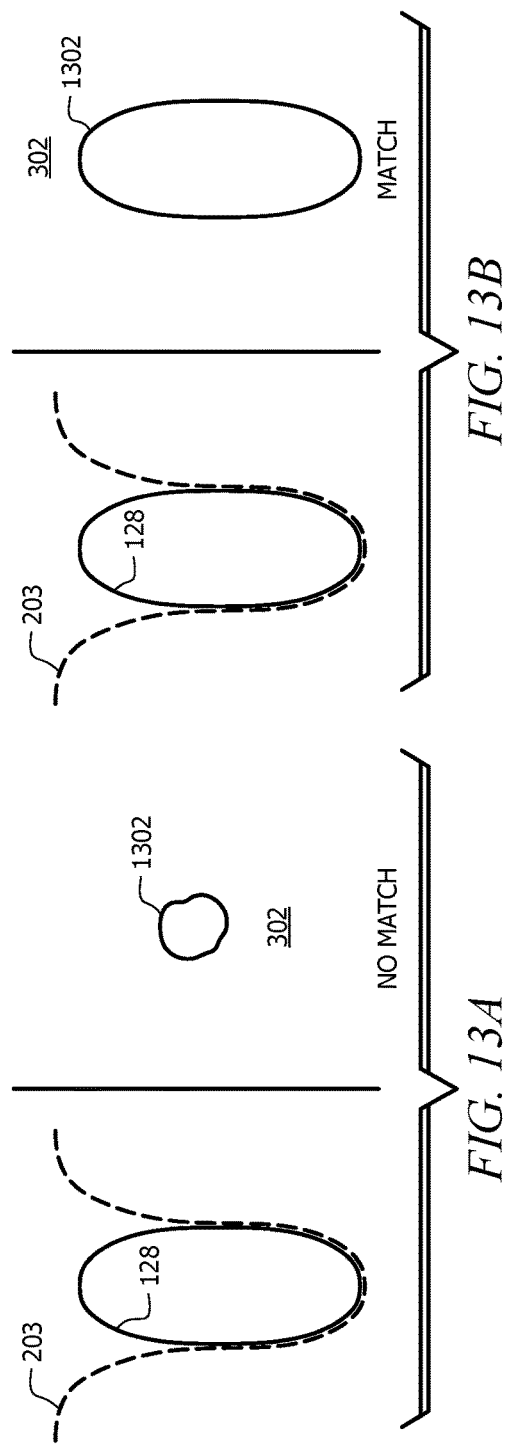

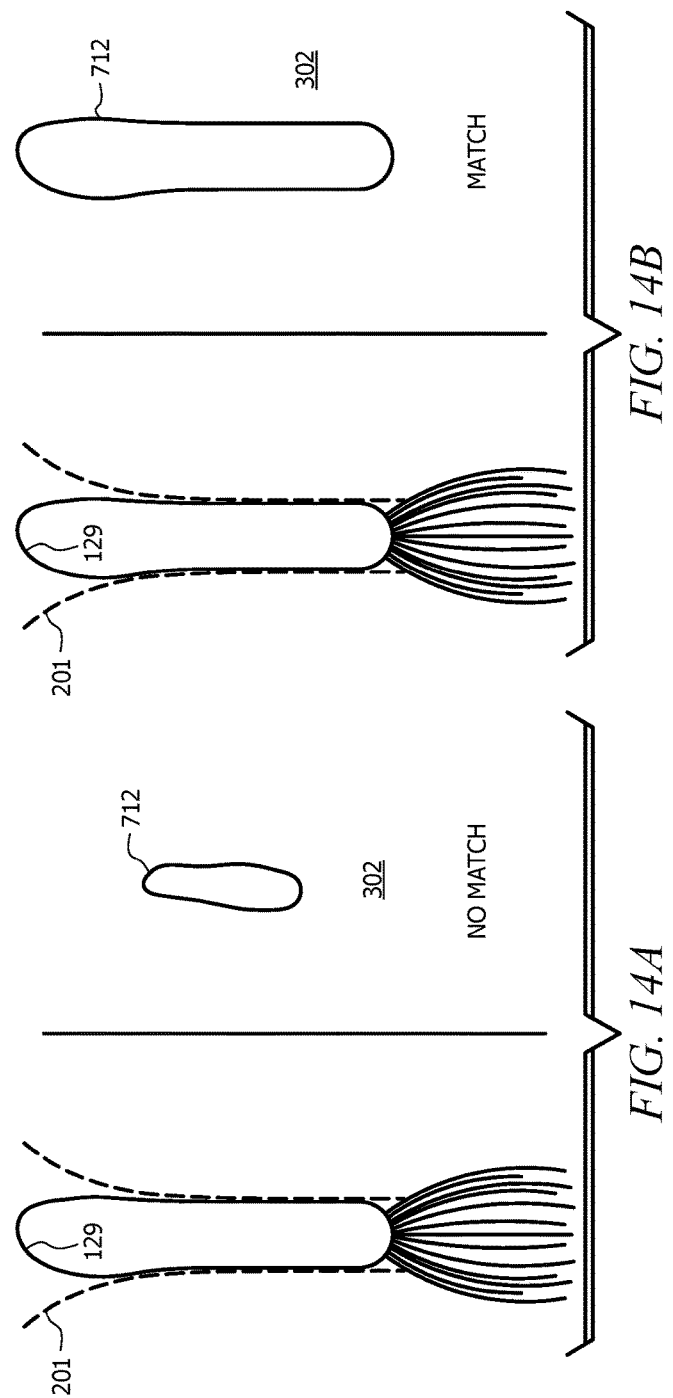

VISION SYSTEM FOR TEAT DETECTION

RELATED APPLICATION

This application is a continuation-in-part application of pending U.S. patent application Ser. No. 15/239,559 filed Aug. 17, 2016 and entitled "Vision System with Teat Detection."

TECHNICAL FIELD

This disclosure relates generally to dairy farming, and more specifically, to a vision system for facilitating operations on a dairy livestock.

BACKGROUND

Over time, the size and complexity of dairy milking operations has increased. Accordingly, the need for efficient processes and systems that support dairy milking operations has also increased. However, existing solutions for supporting dairy milking operations have proven inadequate in various respects.

SUMMARY

In some embodiments, a vision system includes a robotic arm, one or more memory devices, and a processor. The robotic arm is configured to attach a teat cup to a dairy livestock in a stall. The one or more memory devices are operable to store a plurality of success counters, each success counter associated with a successful attachment of the teat cup to a particular dairy livestock using a particular attach algorithm. The processor is communicatively coupled to the robotic arm and the one or more memory devices and is configured to access a first success counter associated with a first attach algorithm and a second success counter associated with a second attach algorithm. The processor is further configured to determine whether the first success counter is greater than the second success counter. The processor is further configured to, if it is determined that the first success counter is greater than the second success counter: execute the first attach algorithm in order to attempt to attach the teat cup to the dairy livestock using the robotic arm; determine that the teat cup was successfully attached to the dairy livestock using the first attach algorithm; and in response to determining that the teat cup was successfully attached to the dairy livestock using the first attach algorithm, increment the first success counter. The processor is further configured to, if it is determined that the first success counter is not greater than the second success counter: execute the second attach algorithm in order to attempt to attach the teat cup to the dairy livestock using the robotic arm; determine that the teat cup was successfully attached to the dairy livestock using the second attach algorithm; and in response to determining that the teat cup was successfully attached to the dairy livestock using the second attach algorithm, increment the second success counter.

The present disclosure presents several technical advantages. For example, a vision system allows the robotic arm to detect and to compensate for leg movement by a dairy livestock in about real time and without requiring hard coding movements and positions. As another example, the vision system allows the robotic arm to detect and to compensate for teat movement by the dairy livestock in about real time and without requiring hard coding movements and positions. As another example, the vision system allows the robotic arm to detect and to avoid the tail of the dairy livestock when positioning the robot and/or performing operations on the dairy livestock, which allows the robotic arm to position itself and to make adjustment in about real time to avoid the tail of the dairy livestock. As another example, the vision system allows the robotic arm to determine the identity of unknown teats or to confirm the identity of teats while performing operations on the dairy livestock. As another example, the vision system allows the robotic arm to utilize various methods of approaching teats in order to successfully attach a teat cup to dairy livestock. As another example, the vision system allows the robotic arm to utilize particular methods of approaching close, hidden, and offset teats in order to successfully attach a teat cup to dairy livestock. As another example, the vision system allows the robotic arm to utilize a method for selecting teat attachment algorithms in order to successfully attach a teat cup to dairy livestock.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is a perspective view of an embodiment of a plurality of image depth planes in a 3D image of a dairy livestock;

FIG. 13A is an embodiment of a comparison between a teat model and a feature of a dairy livestock in an image depth plane without a match;

FIG. 13B is an embodiment of a comparison between a teat model and a feature of a dairy livestock in an image depth plane with a match;

FIG. 14A is an embodiment of a comparison between a tail model and a tail candidate in an image depth plane without a match;

FIG. 14B is an embodiment of a comparisons between a tail model and a tail candidate in an image depth plane with a match;

DETAILED DESCRIPTION

Figure 1:
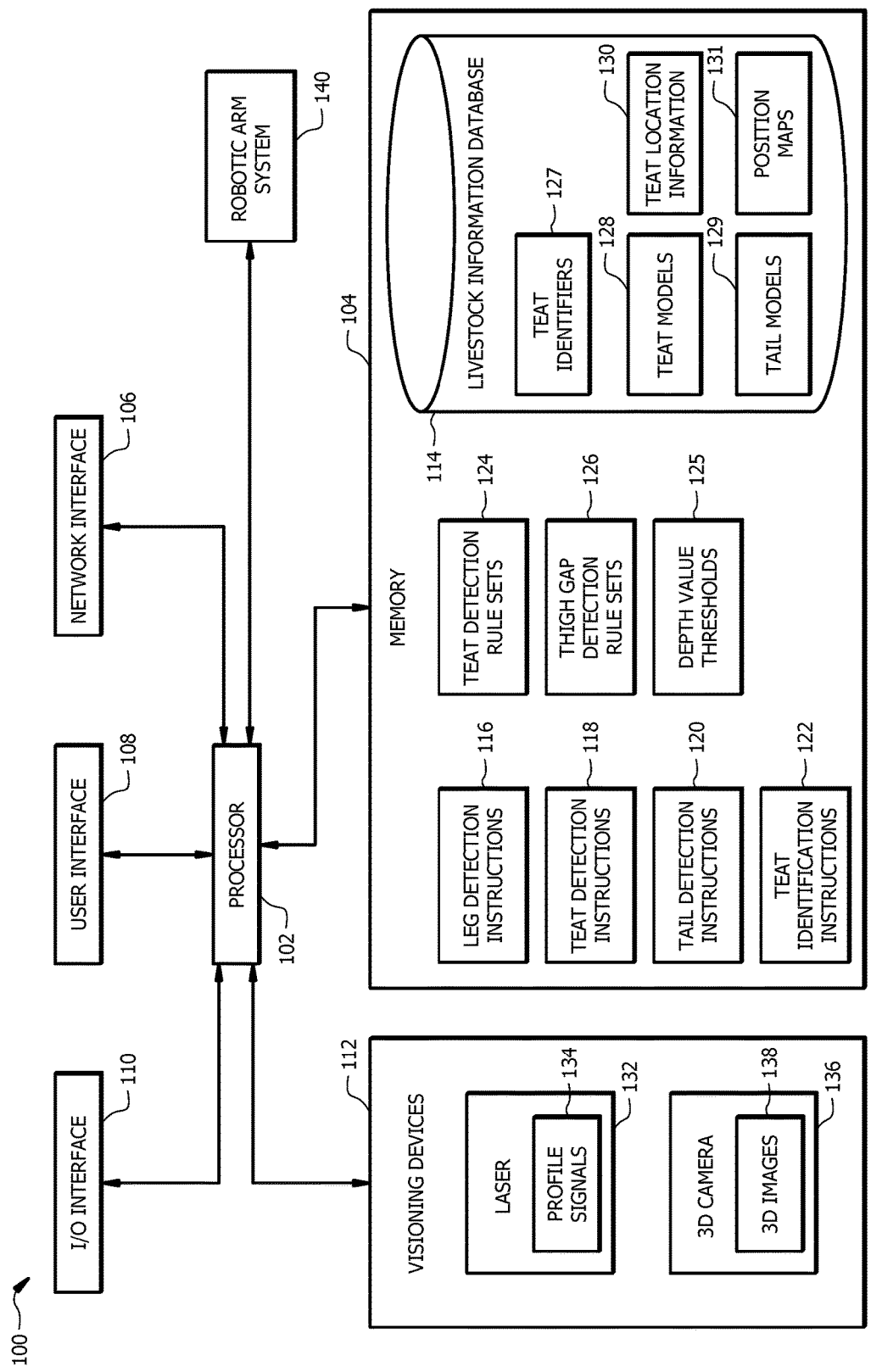
FIG. 1 is a schematic view of an embodiment of a vision system.

In the dairy industry, collecting milk from dairy animals such as cows is an important part of dairy farming. The process of collecting milk typically involves positioning a robotic arm with a teat cup (e.g. a teat prepping cup or a milking cup) in a region adjacent to the teats of the cow. The robotic arm may enter and exit the region adjacent to the cow numerous times during the milking process, for example, to attach and to remove the teat cups from the cow. Due to the repetitive nature of this process, it is advantageous to automate this milking process. However, accurately positioning and maneuvering the robotic arm presents a myriad of problems. For instance, cows may not remain in a fixed position within a stall during the milking process, and thus, hard coding specific movements and/or positions is ineffective. The teats of a cow may not be in the exact same position on every cow, and thus, hard coding specific teat positions is also is ineffective. Other features of the cow (e.g. the tail) may cause problems when trying to position a robotic arm and/or when trying to perform operations on the cow such as attaching a teat cup.

Disclosed herein are various embodiments of a vision system that addresses several of these challenges. In one embodiment, a vision system may be configured to provide the ability to perform leg detection using three-dimensional (3D) images. The functionality and performance of an autonomous system, such as a robotic arm system, may be improved when the vision system is configured to provide leg detection capabilities. For example, the accuracy and speed of a robotic arm may be increased when positioning or maneuvering the robotic arm adjacent to the cow while safely avoiding the legs of a dairy livestock. The vision system allows the robotic arm to detect and to compensate for leg movement by a dairy livestock. The vision system may allow the robotic arm to position itself and to make adjustment in about real time, and thus hard coding is not required.

In another embodiment, a vision system may be configured to provide the ability to perform teat detection using 3D images. The functionality and performance of the robotic arm system may also be improved when the vision system is configured to provide the ability to perform teat detection using 3D images. The accuracy and speed of a robotic arm may be increased when locating and/or performing operations on the teats of a dairy livestock. Using 3D images, the vision system allows the robotic arm to detect and to compensate for teat movement by the dairy livestock. The vision system may allow the robotic arm to position itself and to make adjustment in about real time, and thus hard coding is not required.

In another embodiment, a vision system may be configured to provide the ability to perform teat detection using profile signals. Similarly, the functionality and performance of the robotic arm system may also be improved when the vision system is configured to provide the ability to perform teat detection using profile signals. The accuracy and speed of a robotic arm may be increased when locating and/or performing operations on the teats of a dairy livestock. Using profile signals, the vision system allows the robotic arm to detect and to compensate for teat movement by the dairy livestock.

In another embodiment, a vision system may be configured to provide the ability to perform tail detection using 3D images. The functionality and performance of the robotic arm system may also be improved when the vision system is configured to provide the ability to perform tail detection using 3D images. The accuracy and speed of a robotic arm may be increased when performing operations on the teats of a dairy livestock. The vision system allows the robotic arm to detect and to avoid the tail of the dairy livestock when positioning the robot and/or performing operations on the dairy livestock. The vision system may allow the robotic arm to position itself and to make adjustment in about real time to avoid the tail of the dairy livestock.

In another embodiment, a vision system may be configured to provide the ability to perform teat identification. The functionality and performance of the robotic arm system may also be improved when the vision system is configured to provide the ability to perform tail detection using 3D images. The accuracy and speed of a robotic arm may be increased when performing operations on the teats of a dairy livestock. The vision system allows the robotic arm to determine the identity of unknown teats or to confirm the identity of teats while performing operations on the dairy livestock.

Figure 2:
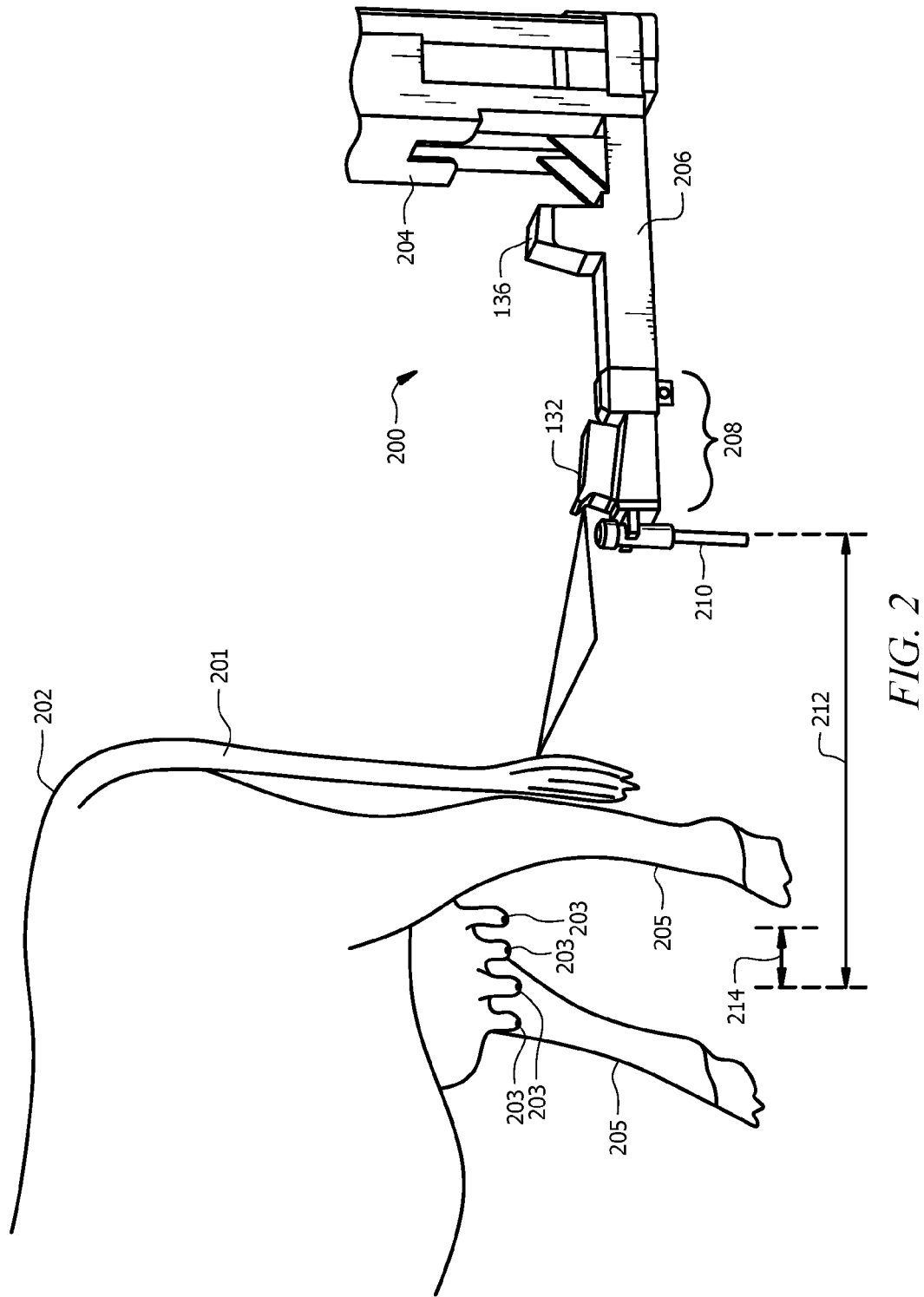
FIG. 2 is a side view of an embodiment of a dairy livestock and a robotic arm employing the vision system.
Figure 4:
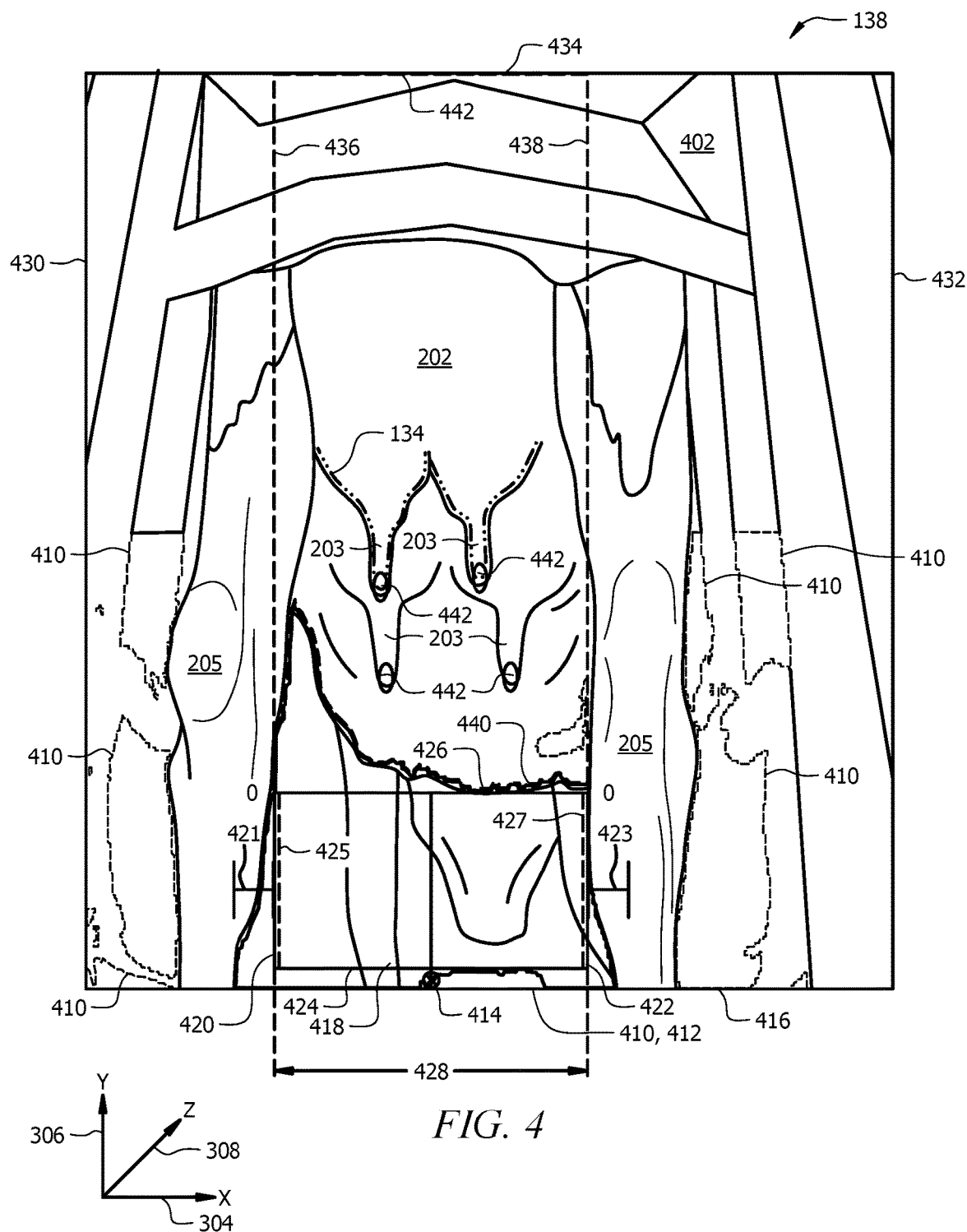
FIG. 4 is an embodiment of a three-dimensional (3D) image of a rearview of a dairy livestock in a stall.
Figure 5:
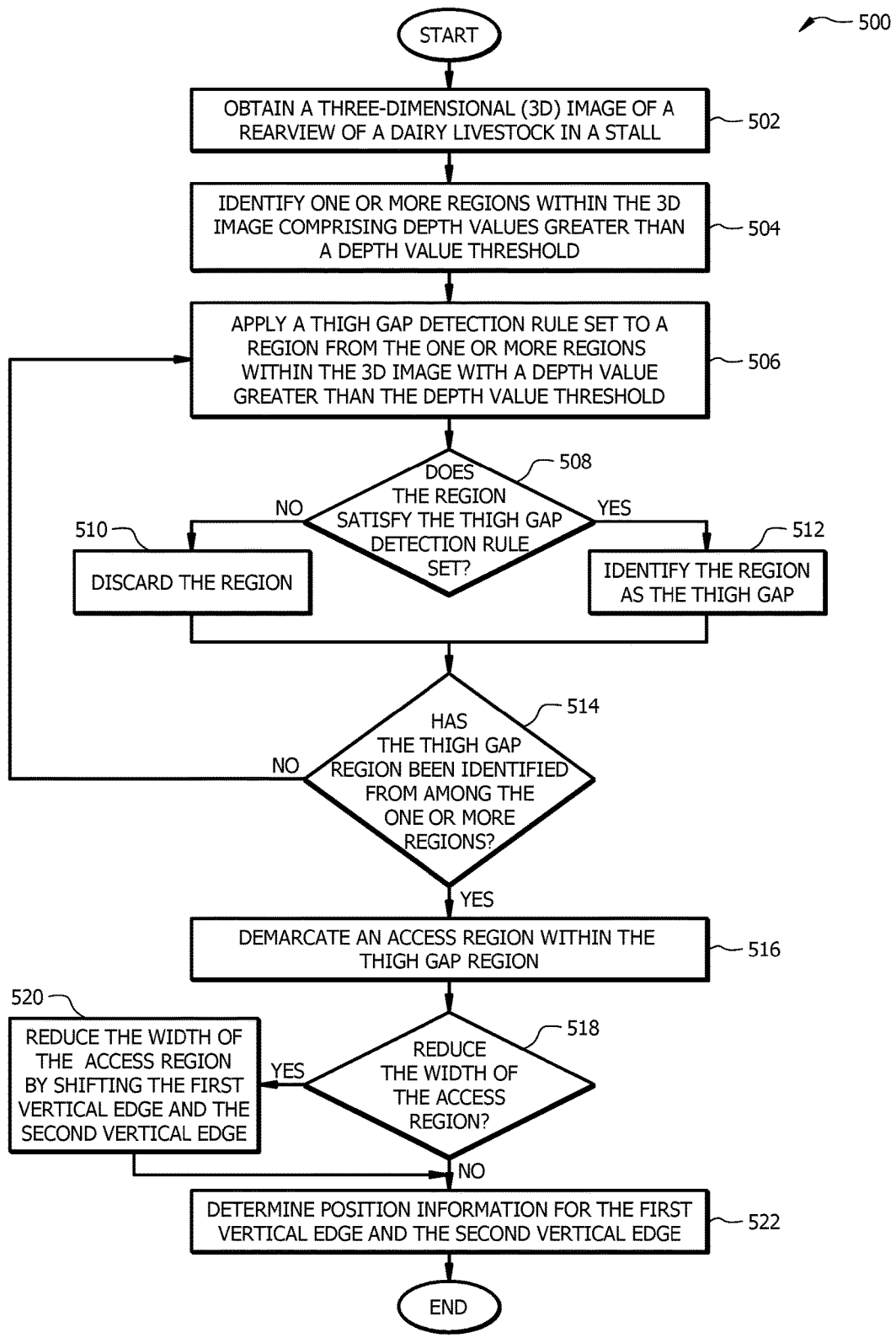
FIG. 5 is a flowchart of an embodiment of a leg detection method using the vision system.
Figure 6:
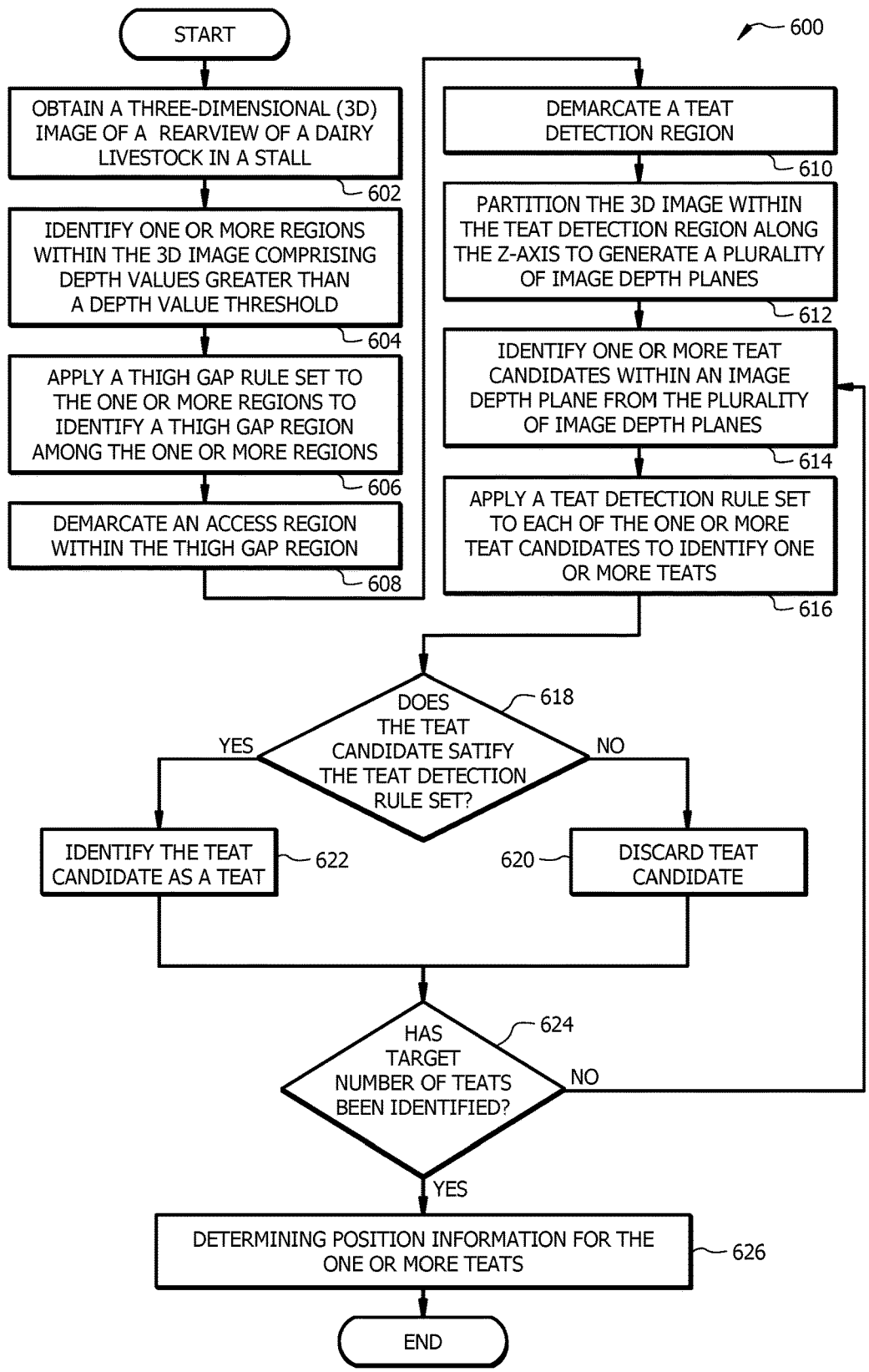
FIG. 6 is a flowchart of an embodiment of a teat detection method using the vision system with a 3D image.
Figure 7:
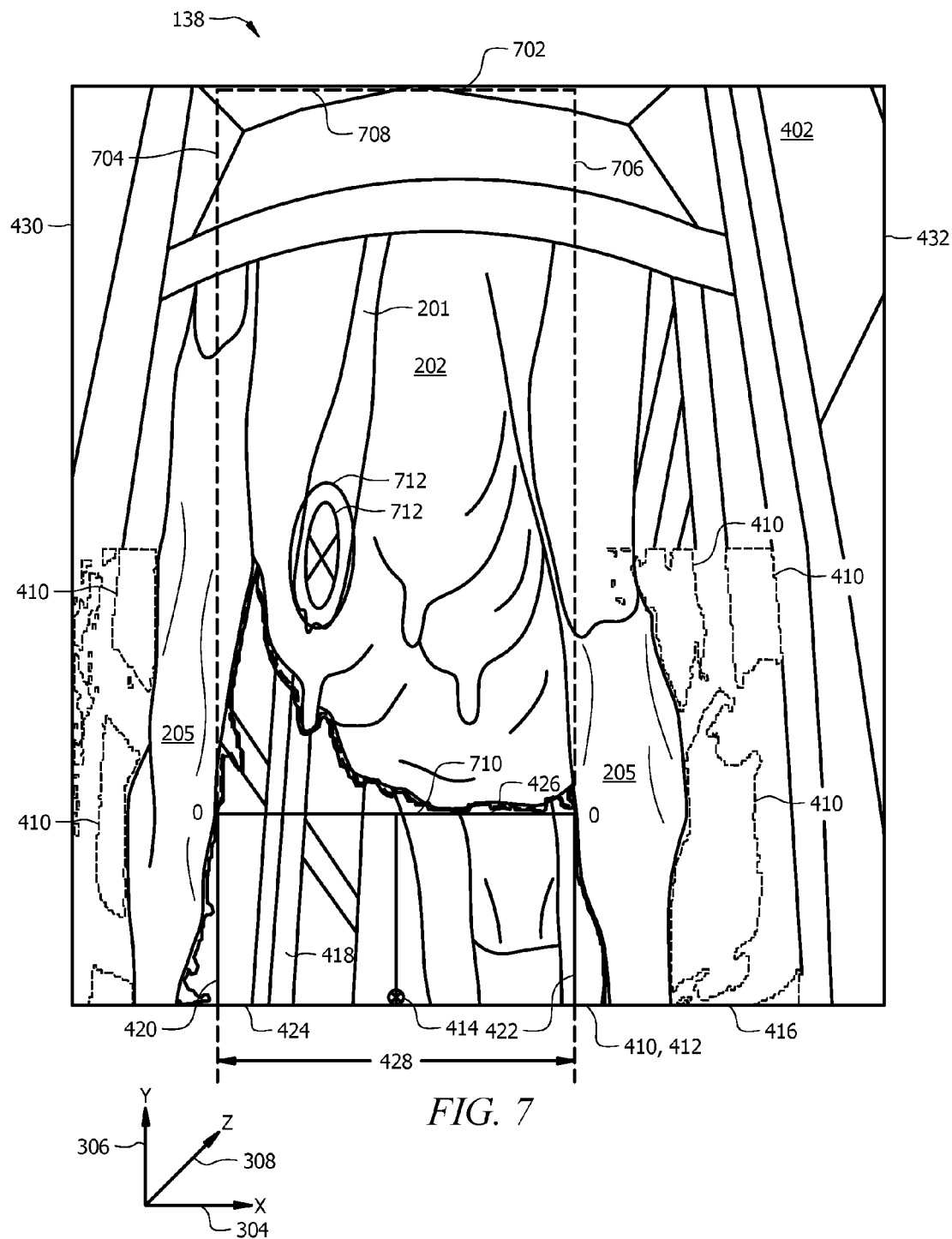
FIG. 7 is another embodiment of a 3D image of a rearview of a dairy livestock in a stall.
Figure 8:
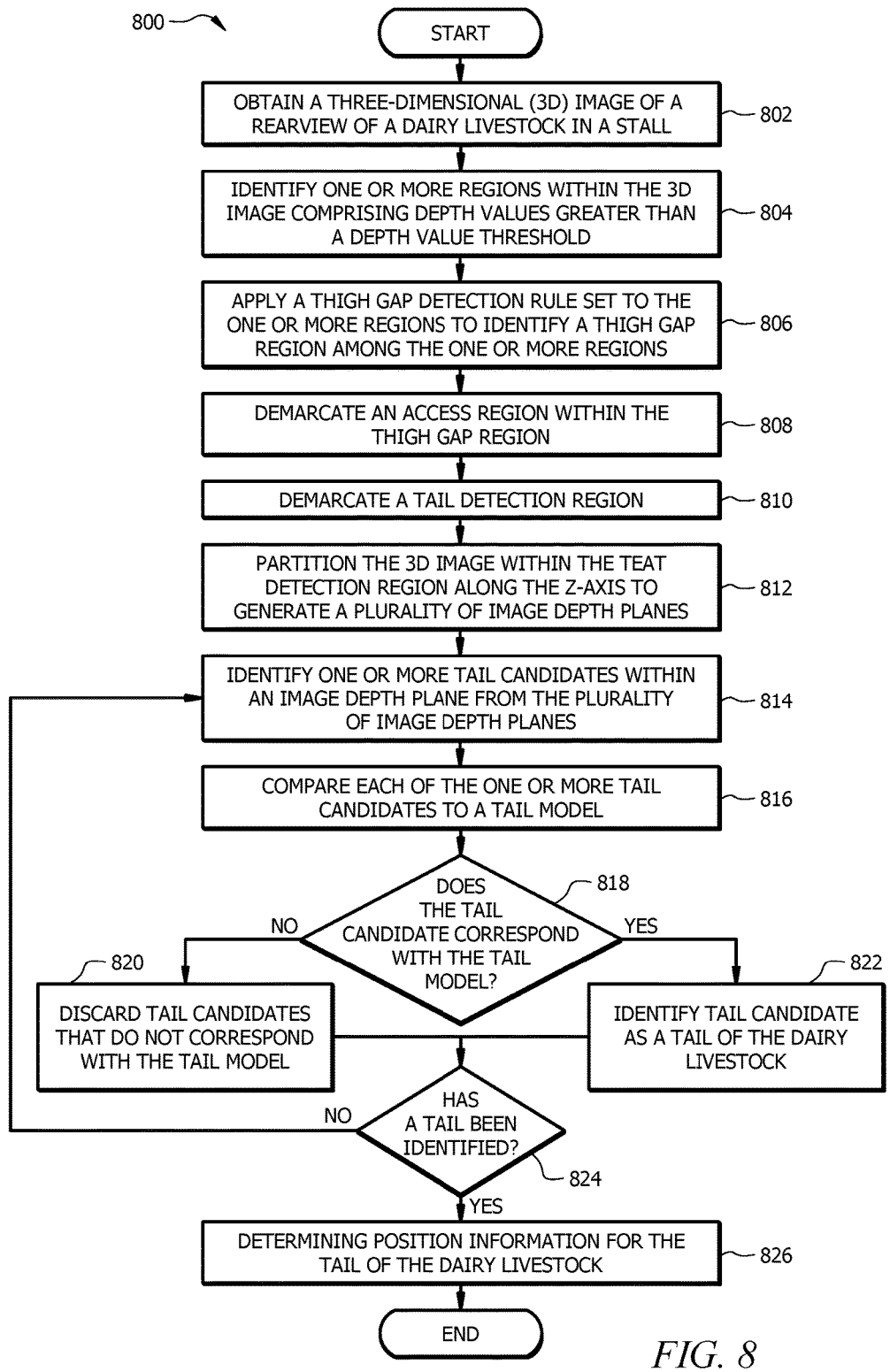
FIG. 8 is a flowchart of an embodiment of a tail detection method using the vision system.
Figure 9:
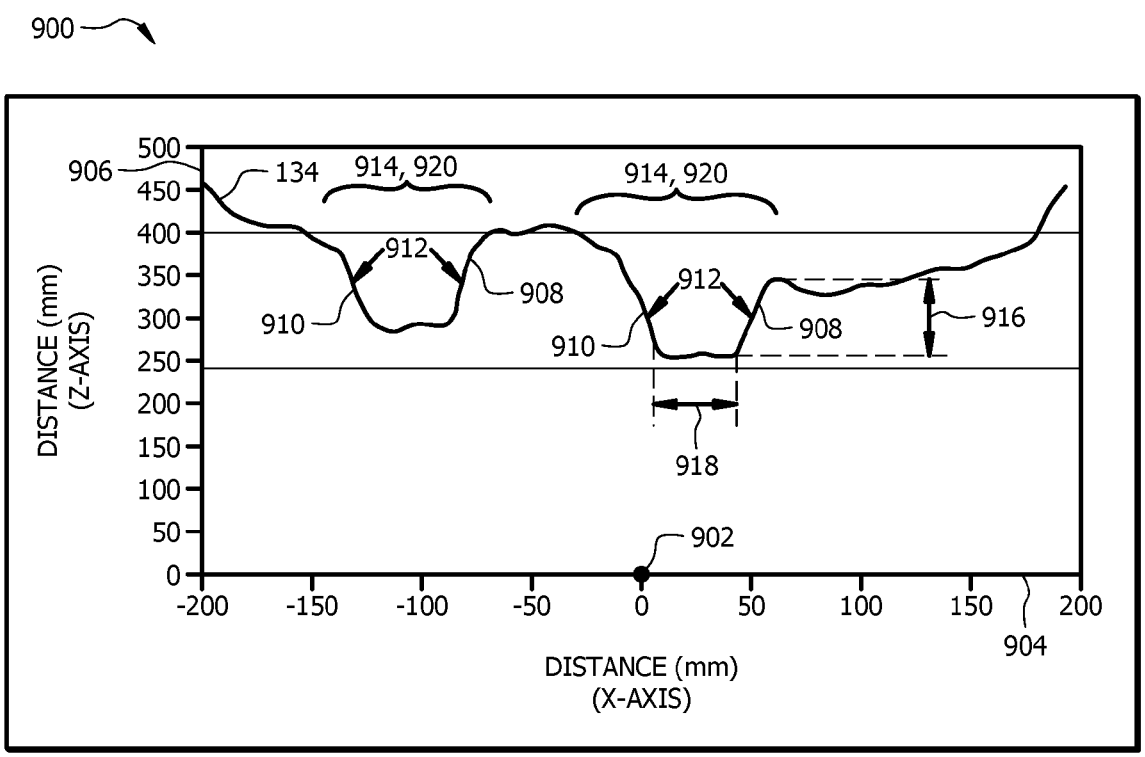
FIG. 9 is a graph of an embodiment of a profile signal of a portion of a dairy livestock.
Figure 10:
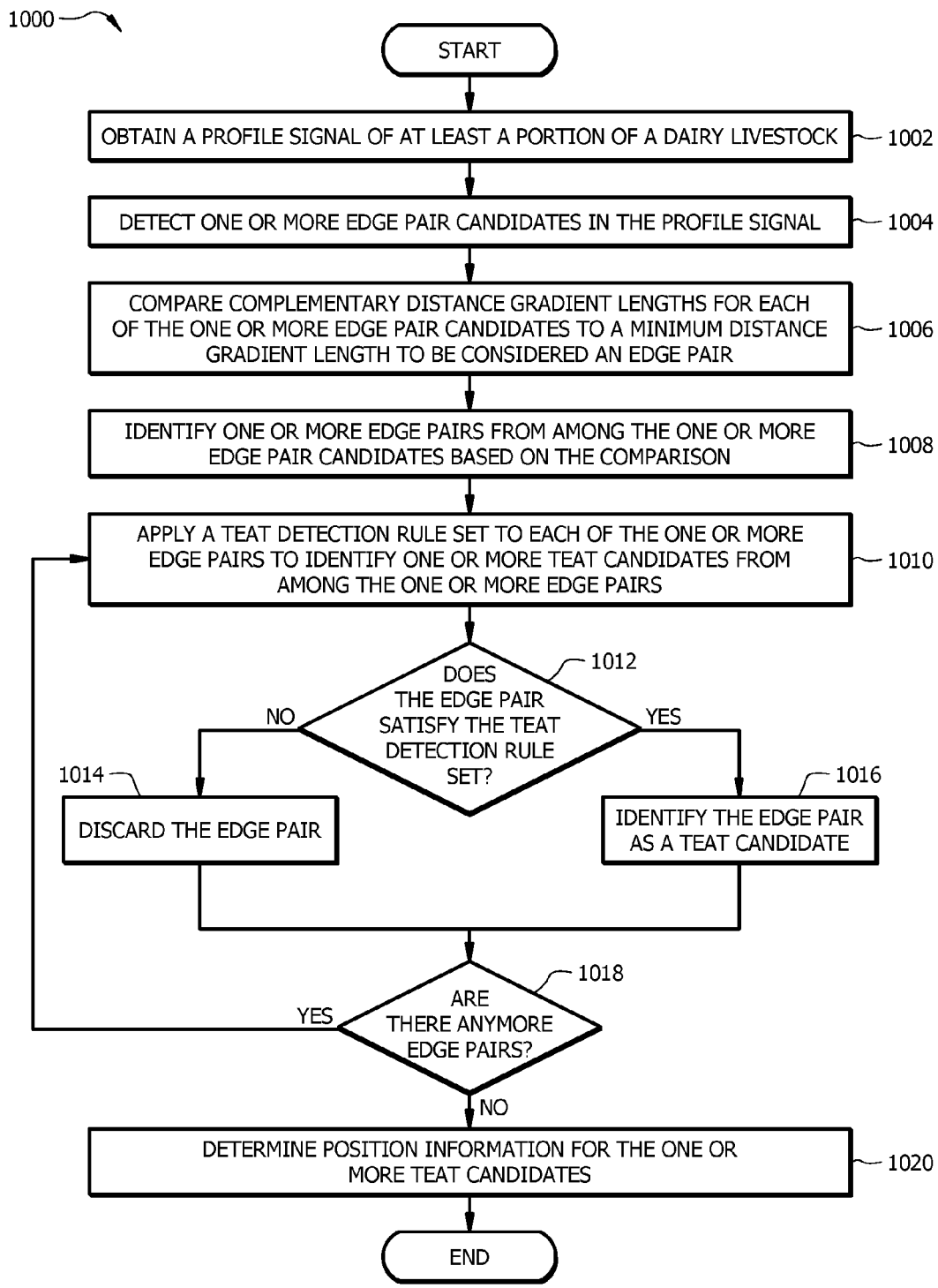
FIG. 10 is a flowchart of an embodiment of a teat detection method using the vision system with a profile signal.
Figure 11A:
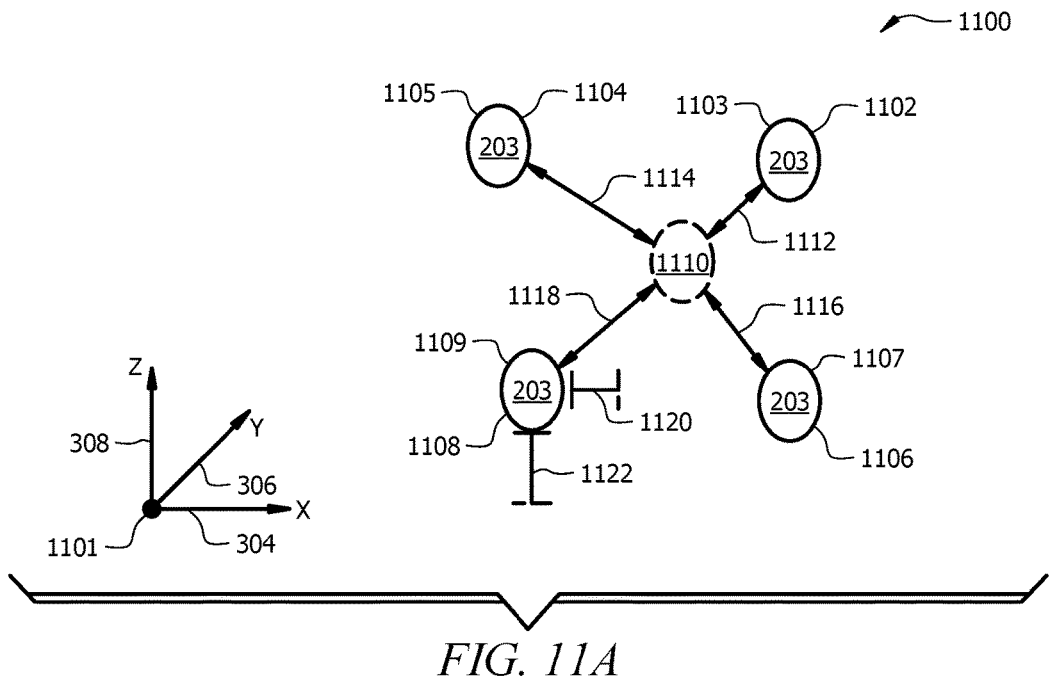
FIG. 11A is a position map of an embodiment of a plurality of teats of a dairy livestock.
Figure 11B:
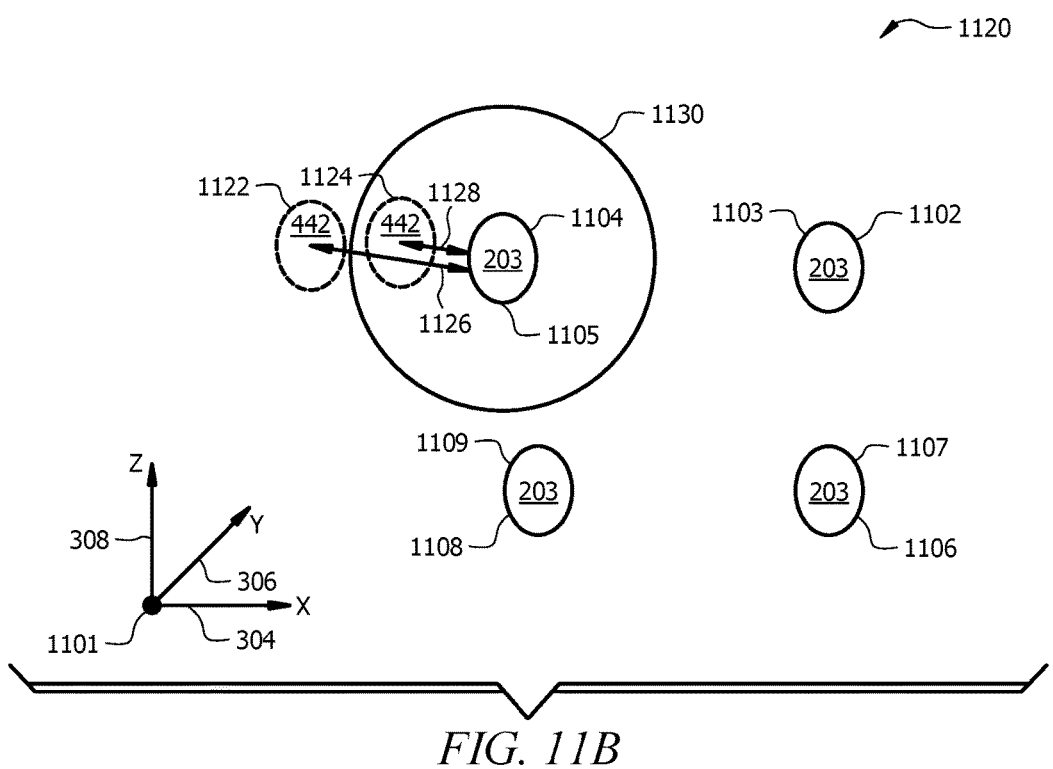
FIG. 11B is a position map of another embodiment of a plurality of teats of a dairy livestock.
Figure 12A:
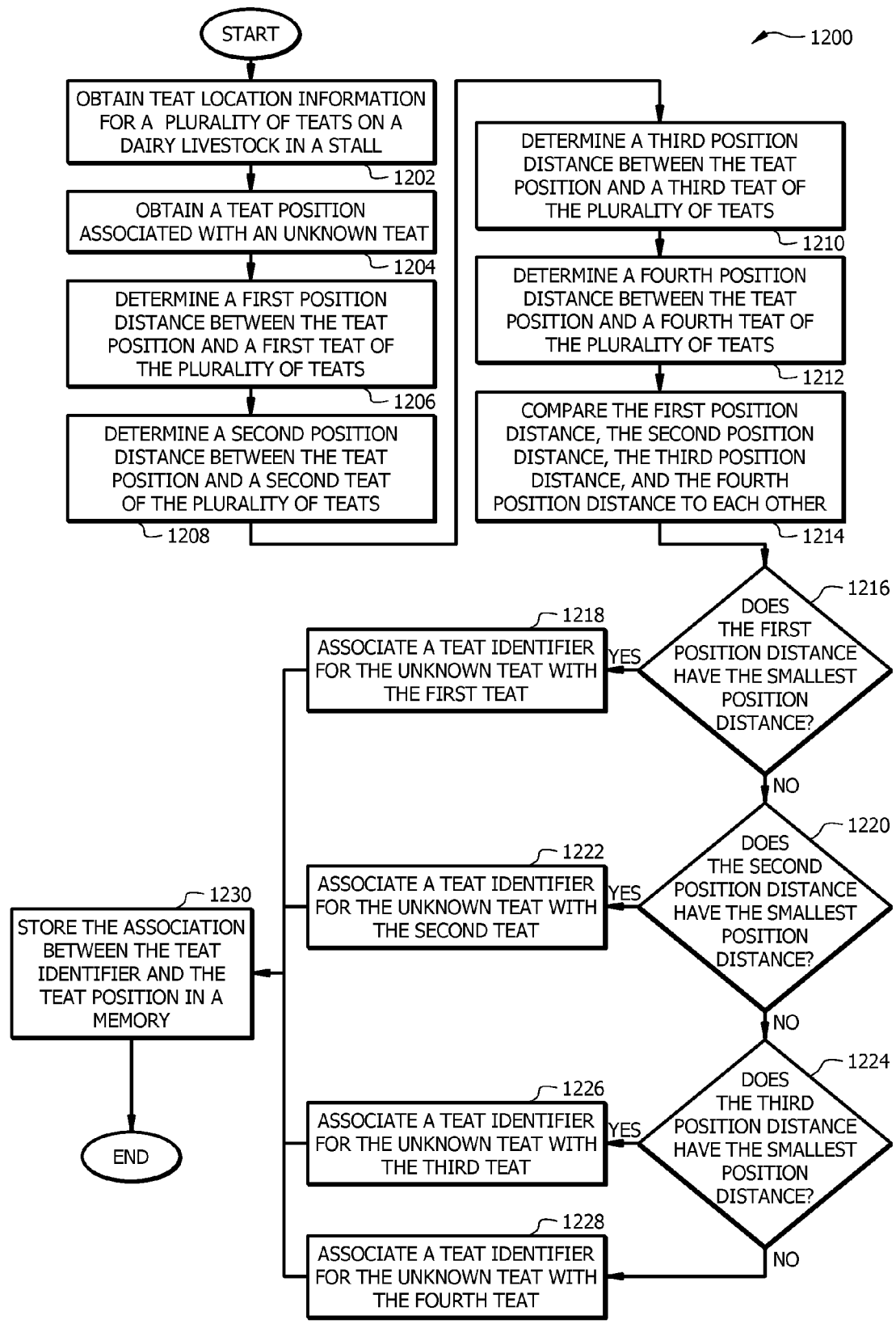
FIG. 12A is a flowchart of an embodiment of a teat identification method using the vision system.
Figure 12B:
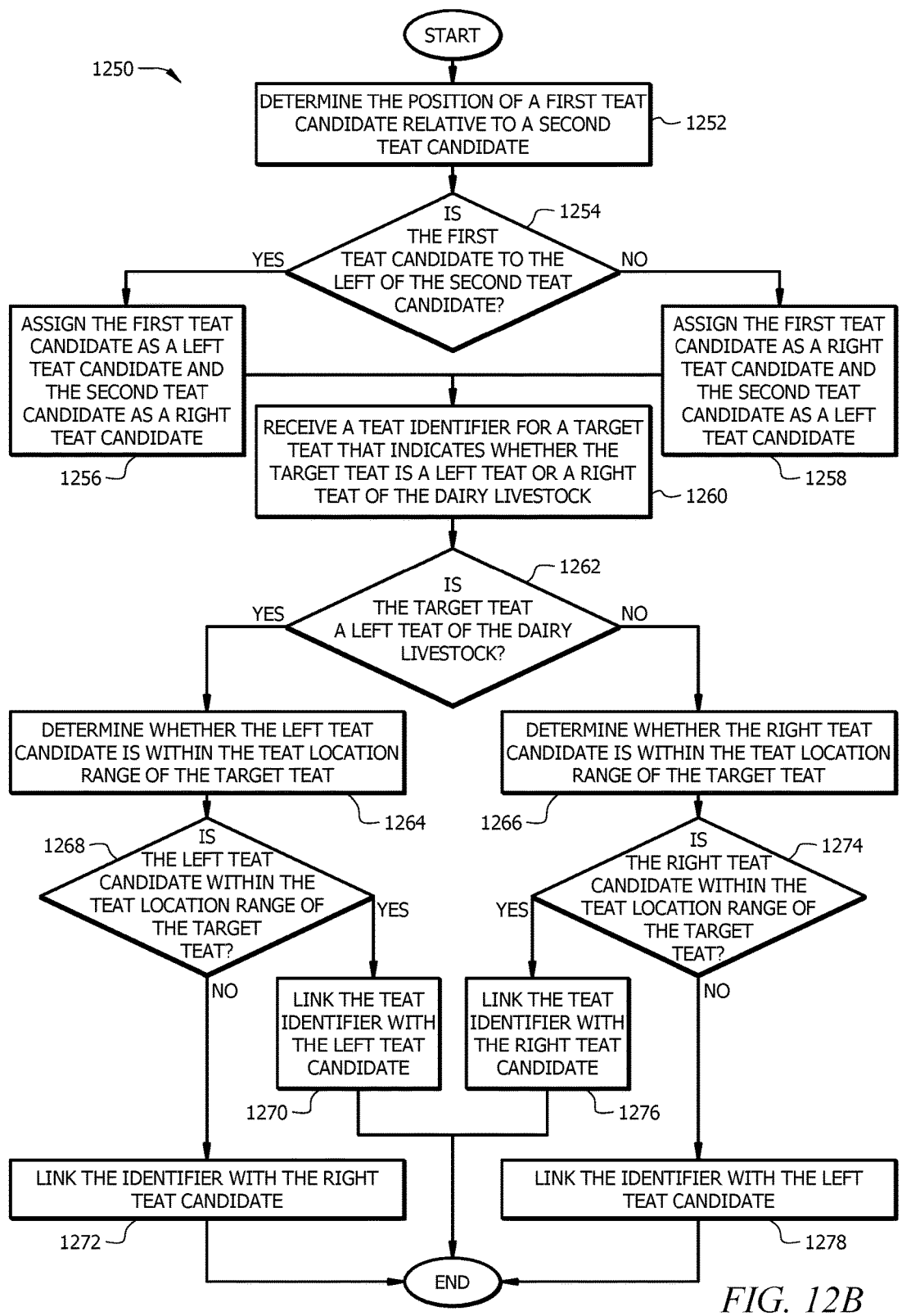
FIG. 12B is a flowchart of another embodiment of a teat identification method.
Figure 15:
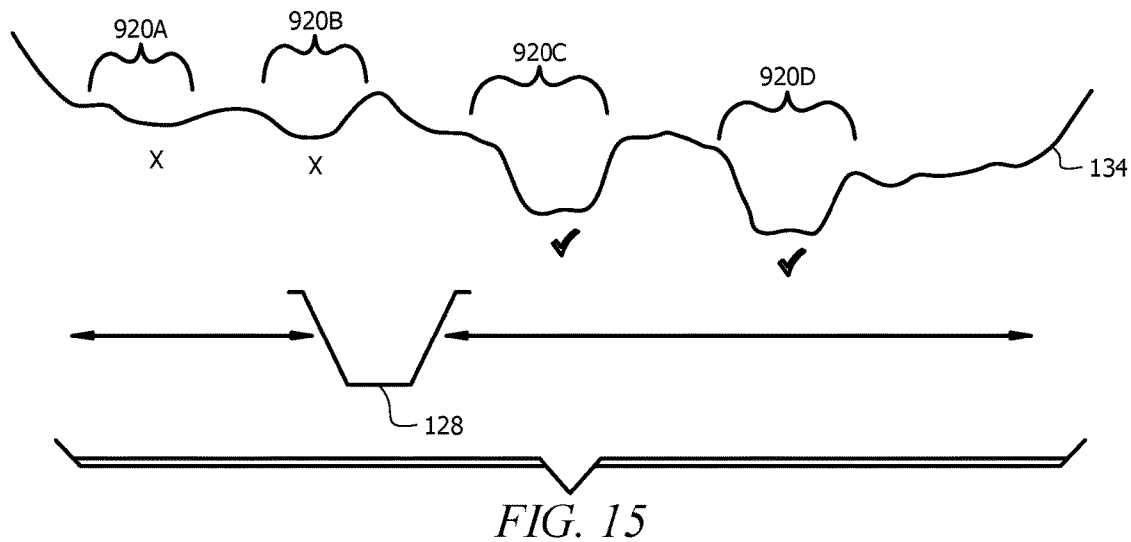
FIG. 15 is an embodiment of a comparison between a teat model and edge pairs in a profile signal.
Figure 16:
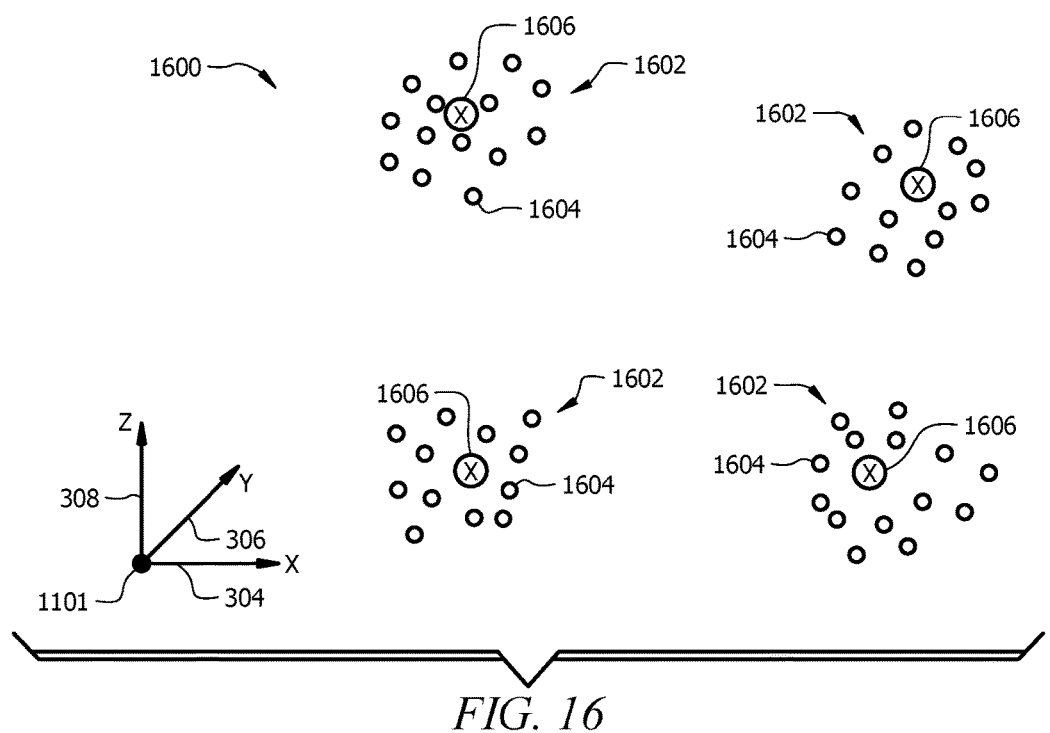
FIG. 16 is a position map of an embodiment of teat candidate clusters for teats of dairy livestock.
Figure 17:
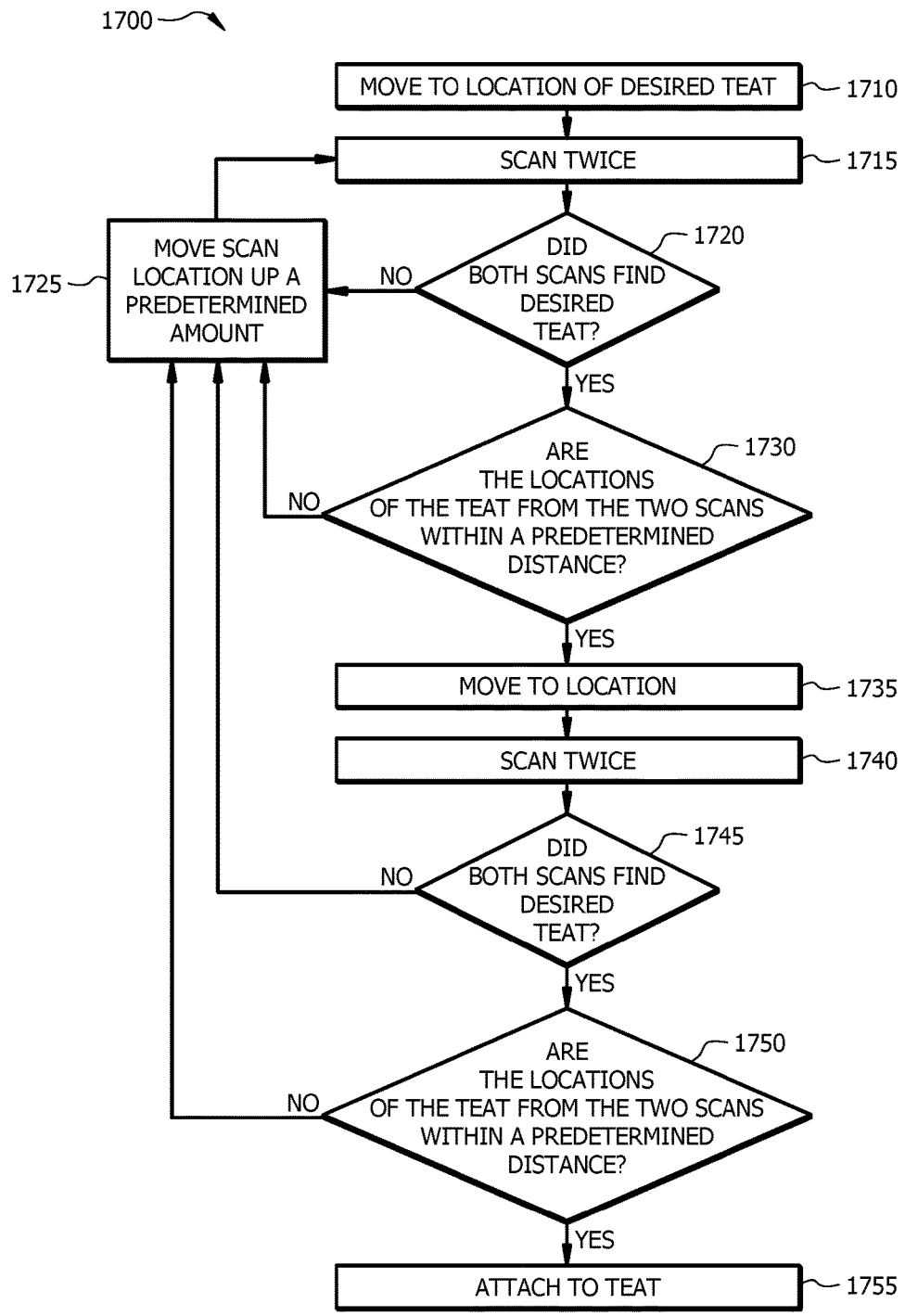
FIG. 17 is a flowchart of an embodiment of a teat attachment method using the vision system.
Figure 18:
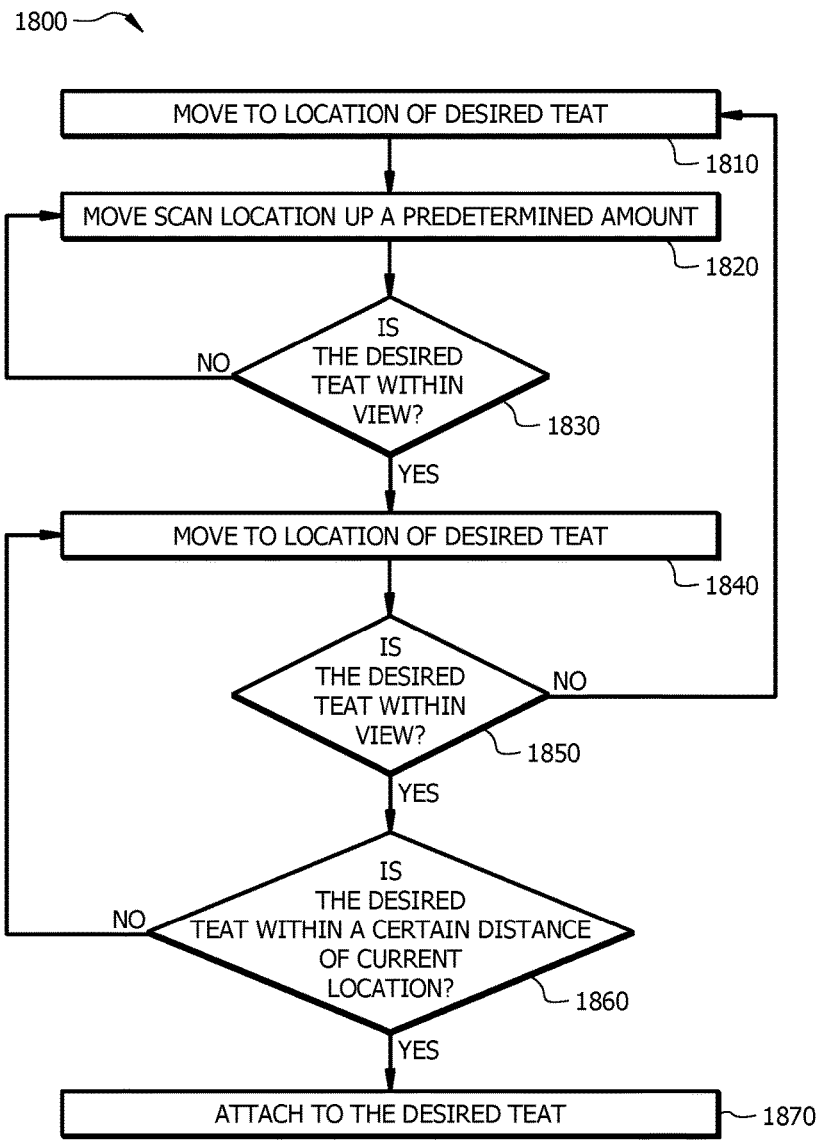
FIG. 18 is a flowchart of an embodiment of another teat attachment method using the vision system.
Figure 19:
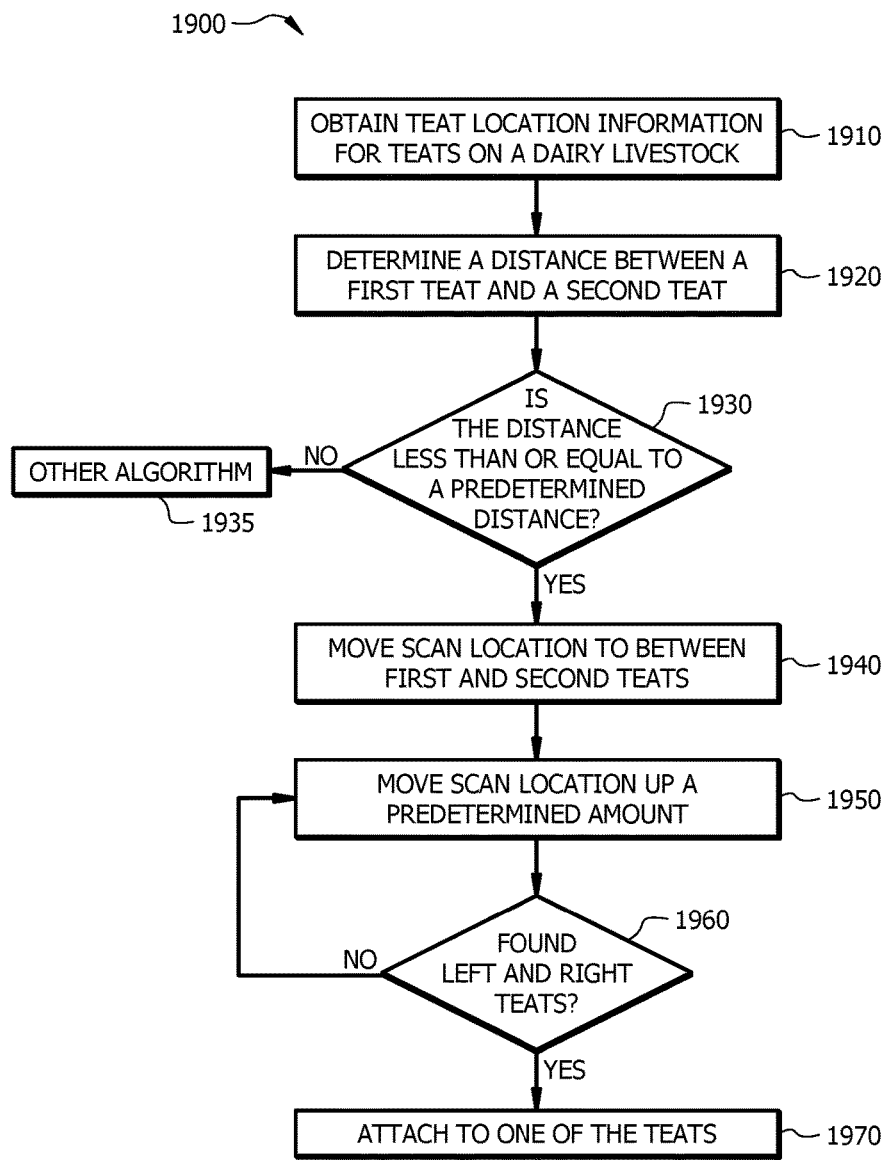
FIG. 19 is a flowchart of an embodiment of a teat attachment method using the vision system that may be used for close teats.
Figure 20:
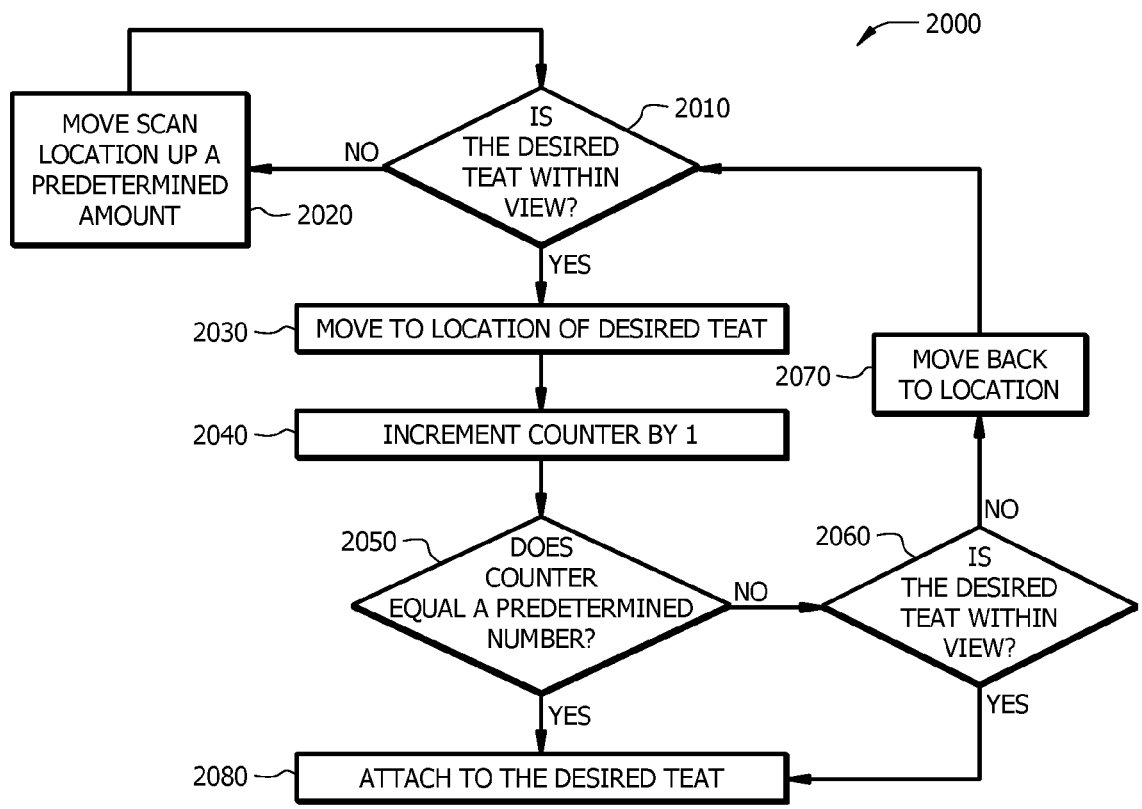
FIG. 20 is a flowchart of an embodiment of a teat attachment method using the vision system that may be used for offset teats.
Figure 21:
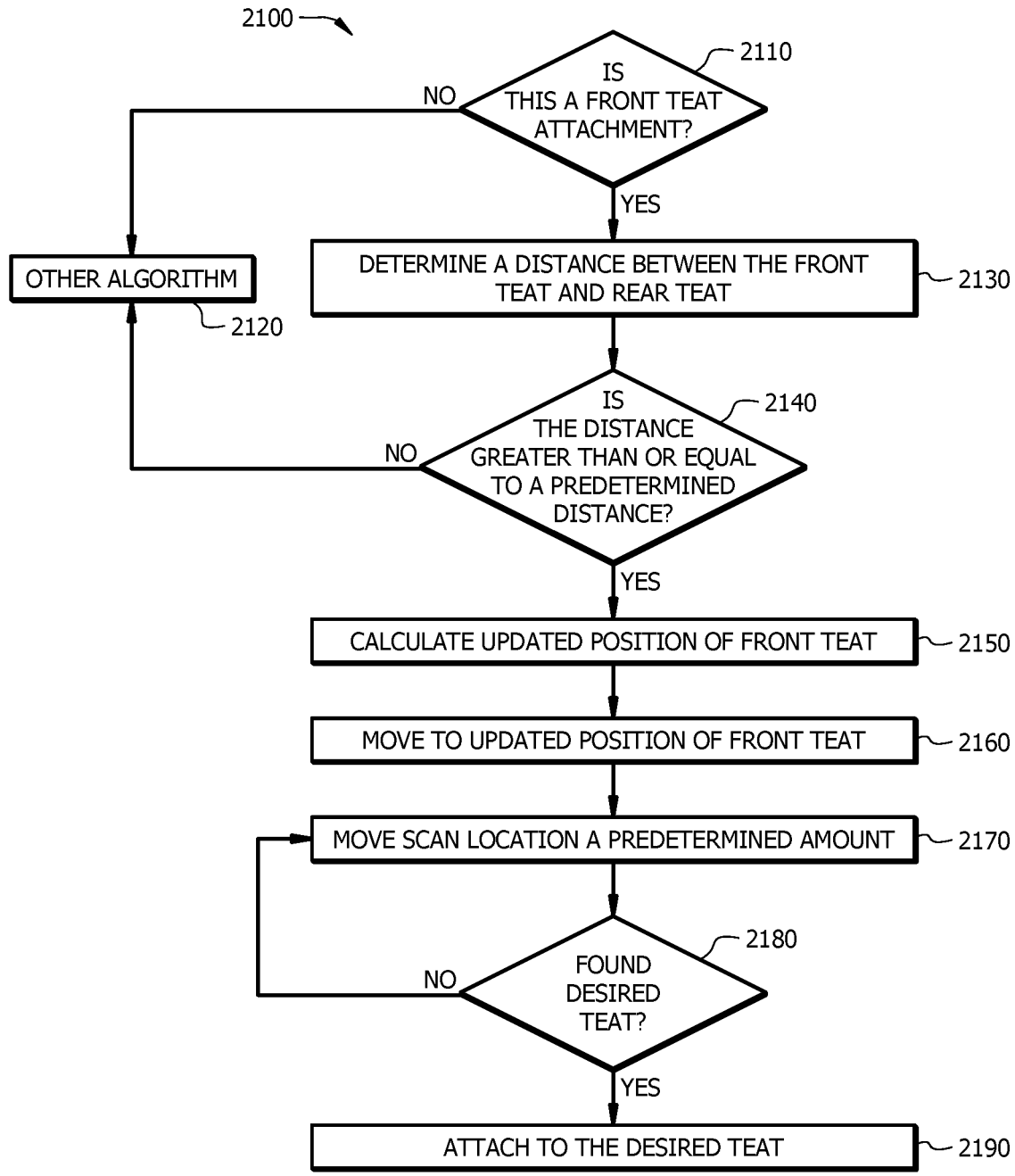
FIG. 21 is a flowchart of an embodiment of a teat attachment method using the vision system that may be used for hidden teats.
Figure 22:
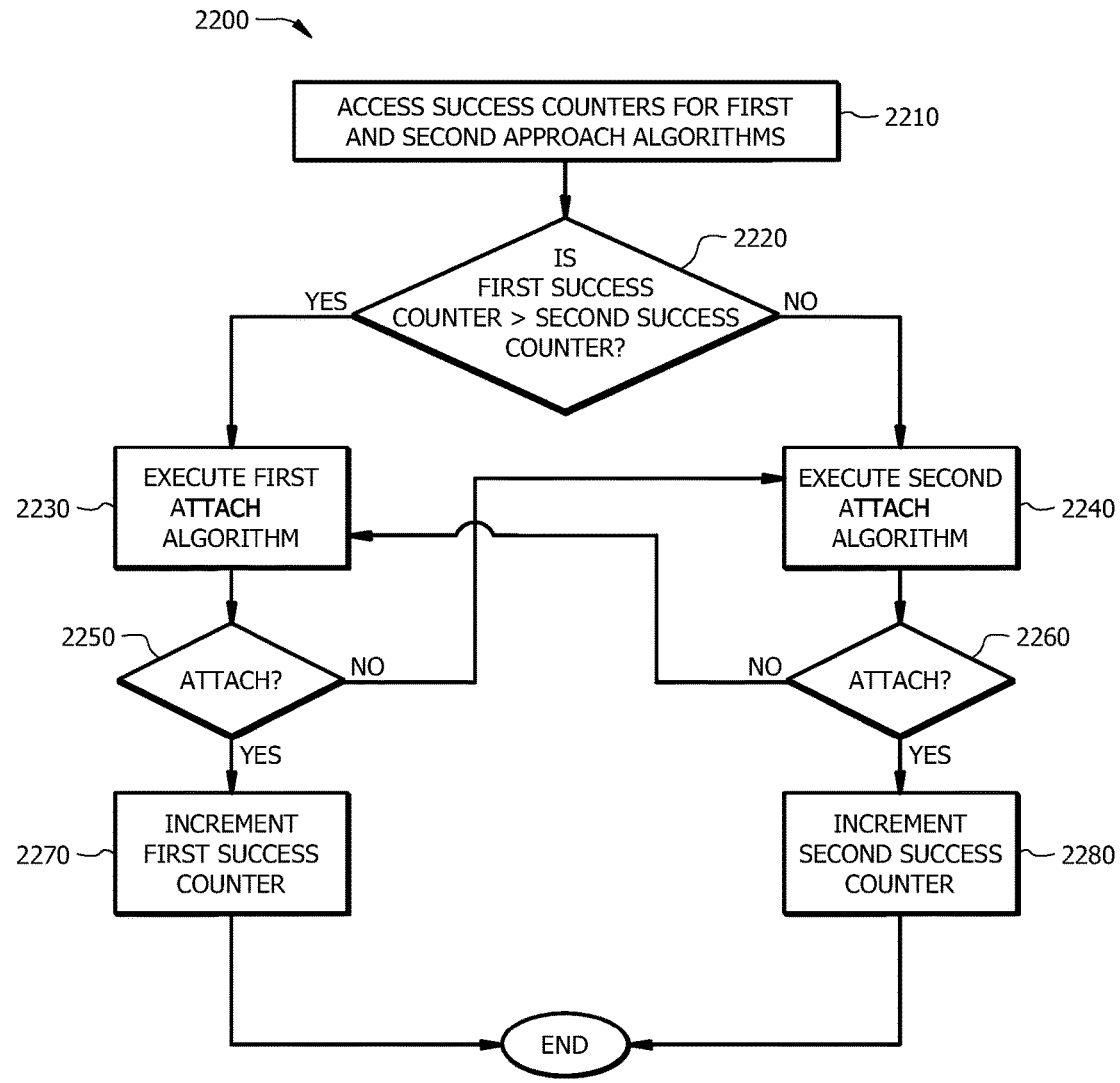
FIG. 22 is a flowchart of an embodiment of a method for selecting teat attachment algorithms using the vision system.

The present disclosure will be described in more detail using FIGS. 1-15. FIG. 1 illustrates a general overview of a vision system for facilitating the positioning and maneuvering of a robotic arm. FIG. 2 illustrates positioning a robotic arm adjacent to a dairy livestock. FIG. 3 illustrates features of a 3D image. FIGS. 4 and 7 illustrate examples of 3D images. FIGS. 5, 6, and 8 illustrate examples of methods of using 3D images to identify features of a dairy livestock. FIG. 9 illustrates an example of a profile signal. FIG. 10 illustrates an example of a method of using a profile signal to identify features of a dairy livestock. FIGS. 11A and 11B illustrate examples of position maps of teats of a dairy livestock. FIG. 12A illustrates an example of a method for identifying an unknown teat using teat location information. FIG. 12B illustrates an example of a method for associating teat candidates with teats of a dairy livestock. FIGS. 13A and 13B illustrates an example of using a teat model to identify teats of a dairy livestock in an image depth plane. FIGS. 14A and 14B illustrates an example of using a tail model to identify a tail of a dairy livestock in an image depth plane. FIG. 15 illustrates another example of using a teat model to identify teats of a dairy livestock in a profile signal. FIG. 16 illustrates using teat candidate clusters to determine the location of teats of a dairy livestock. FIGS. 17 and 18 illustrate example teat attachment methods for attaching a teat cup to a dairy livestock using teat location information and the vision system. FIG. 19 illustrates an example teat attachment method for attaching a teat cup to a dairy livestock with close teats using teat location information and the vision system. FIG. 20 illustrates an example teat attachment method for attaching a teat cup to a dairy livestock with offset teats using teat location information and the vision system. FIG. 21 illustrates an example teat attachment method for attaching a teat cup to a dairy livestock with hidden teats using teat location information and the vision system. FIG. 22 illustrates an example method for selecting teat attachment algorithms using the vision system.

FIG. 1 is a schematic view of an embodiment of a vision system 100. The vision system 100 may be configured to obtain visual information of a dairy livestock and to determine information associated with the features of the dairy livestock based on the visual information. Examples of dairy livestock include, but are not limited to, cows, buffaloes, goats, or any other suitable animal. The vision system 100 may be configured to capture and to process visual information of the dairy livestock in order to facilitate one or more operations on the dairy livestock. Processing the visual information may include, but is not limited to, performing leg detection, performing tail detection, performing teat detection, and performing teat identification. For example, the vision system 100 may be configured to detect and to determine the location of one or more legs of a dairy livestock. An example of a leg detection method is described in FIG. 5. The vision system 100 may be configured to detect and to determine the location of teats of the dairy livestock. An example of teat detection methods are described in FIGS. 6 and 11. The vision system 100 may be configured to detect and to determine the location of a tail of the dairy livestock. An example of a tail detection method is described in FIG. 8. The vision system 100 may be also be configured to identify one or more teats of the dairy livestock. An example of a teat identification method is described in FIG. 12A.

The vision system 100 may comprise a processor 102, a memory 104, a network interface 106, a user interface 108, an input/output (I/O) interface 110, and visioning devices 112. The vision system 100 may be configured as shown or in any other suitable configuration.

The processor 102 may be implemented as one or more central processing unit (CPU) chips, logic units, cores (e.g. a multi-core processor), field-programmable gate array (FPGAs), application specific integrated circuits (ASICs), or digital signal processors (DSPs). The processor 102 is communicatively coupled to and in signal communication with the memory 104, the network interface 106, the user interface 108, the I/O interface 110, the visioning devices 112, and a robotic arm system 140. The processor 102 is configured to receive and transmit electrical signals among one or more of the memory 104, the network interface 106, the user interface 108, the I/O interface 110, and the visioning devices 112. The electrical signals may be used to send and receive data (e.g. profile signals 134 and 3D images 138) or to control other devices (e.g. visioning devices 112 and robotic arm system 140). For example, the processor 102 may transmit electrical signals to operate one the laser 132 and/or the 3D camera 136. The processor 102 may be operably coupled to one or more other devices (not shown).

The processor 102 is configured to process data and may be implemented in hardware or software. The processor 102 may be configured to implement various instructions. For example, the processor 102 may be configured to implement leg detection instructions 116, teat detection instructions 118, tail detection instructions 120, and teat identification instructions 122. In FIG. 1, leg detection instructions 116, teat detection instructions 118, tail detection instructions 120, and teat identification instructions 122 are implemented as instructions (e.g. software code or firmware) stored in the memory 104. In other embodiments, leg detection instructions 116, teat detection instructions 118, tail detection instructions 120, and/or teat identification instructions 122 may be implemented as instructions stored in the processor 102. The processor 102 may be configured to implement leg detection instructions 116, teat detection instructions 118, tail detection instructions 120, and/or teat identification instructions 122 in about real time. The inclusion of leg detection instructions 116, teat detection instructions 118, tail detection instructions 120, and/or teat identification instructions 122 provide an improvement to the functionality of the vision system 100, which effects a transformation of the vision system 100 to a different state.

The memory 104 may comprise one or more disks, tape drives, or solid-state drives, and may be used as an over-flow data storage device, to store programs when such programs are selected for execution, and to store instructions and data that are read during program execution. The memory 104 may be volatile or non-volatile and may comprise read-only memory (ROM), random-access memory (RAM), ternary content-addressable memory (TCAM), dynamic random-access memory (DRAM), and static random-access memory (SRAM). The memory 104 is operable to store leg detection instructions 116, teat detection instructions 118, tail detection instructions 120, teat identification instructions 122, teat detection rule sets 124, depth value thresholds 125, thigh gap detection rule sets 126, livestock information database 114, teat models 128, tail models 129, teat location information 130, and/or any other data, rule sets, models, or instructions. The leg detection instructions 116, teat detection instructions 118, tail detection instructions 120, and teat identification instructions 122 may be implemented by the processor 102 to execute instructions for processing visual information of a dairy livestock. For example, executing the leg detection instructions 116 may configure the processor 102 to detect one or more legs of a dairy livestock and to determine position information for the legs of the dairy livestock. An example of executing the leg detection instructions 116 is described in FIG. 5. Executing the teat detection instructions 118 may configure the processor 102 to detect one or more teats of a dairy livestock and to determine position information for the one or more teats, for example, with respect to a robotic arm. Examples of executing the teat detection instructions 118 are described in FIGS. 6 and 10. Executing the tail detection instructions 120 may configure the processor 102 to detect a tail of a dairy livestock and to determine position information for the tail of the dairy livestock. An example of executing the tail detection instructions 120 is described in FIG. 8. Executing the teat identification instructions 122 may configure the processor 102 to determine the identity of an unknown teat on a dairy livestock. An example of executing the teat identification instructions 122 is described in FIG. 12A.

The vision system 100 may be configured to use depth value thresholds 125 to identify regions within 3D images 138 with a particular depth into the 3D image 138. A depth value threshold 125 may be a color, intensity, numeric value, or any other suitable indicator of a particular depth in the 3D image 138. For example, the vision system 100 may compare portions of the 3D image 138 to the depth value threshold 125 and to identify one or more regions in the 3D image 138 that comprise depth values greater than the depth value threshold 125. Examples of using depth value thresholds 125 are described in FIGS. 4-8.

Teat detection rule sets 124 comprise one or more rules that may be used for identifying teats of a dairy livestock. In one embodiment, rules from a teat detection rule set 124 may be applied to edge pairs in a profile signal 134 to determine whether an edge pair is teat candidate for a dairy livestock. Examples of using a teat detection rule set 124 to identify teat candidates in a profile signal 134 are described in FIGS. 9, 10, and 15. In another embodiment, rules from a teat detection rule set 124 may be applied to a teat candidate from a 3D image 138 to determine whether the teat candidate is a teat on a dairy livestock. Examples of using the teat detection rule set 124 to identify teats on a dairy livestock in a 3D image 138 are described in FIGS. 4, 6, 13A, and 13B. Examples of rules in a teat detection rule set 124 include, but are not limited to, using a teat model 130 to identify a teat candidates, a minimum or maximum complementary distance gradient spacing to be considered a teat candidate, a minimum or maximum distance gradient length to be considered a teat candidate, a minimum or maximum area to be considered a teat, a minimum or maximum height position to be considered a teat, and a minimum or maximum width to be considered a teat.

Thigh gap detection rule sets 126 comprise one or more rules that may be used for identifying a thigh gap region from among a plurality of regions in a 3D image 138. For example, rules from a thigh gap detection rule set 126 may be applied to one or more regions in a 3D image 138 to discard regions that are not a thigh gap region and to identify a thigh gap region from among the one or more regions. Examples of rules in a thigh gap detection rule set 126 include, but are not limited to, using markers (e.g. predetermined pixel locations) to identify a thigh gap region, using boundaries of or within a 3D image 138 to identify a thigh gap region, a minimum or maximum area to be considered a thigh gap region, a minimum or maximum height to be considered a thigh gap region, and a minimum or maximum width to be considered a thigh gap region. Examples of using a thigh gap detection rule set 126 to identify a thigh gap region are described in FIGS. 4-8.

The livestock information database 114 may be configured to store information associated with one or more dairy livestock. Examples of information stored in the livestock information database 114 include, but are not limited to, identification information for dairy livestock, historical information associated with dairy livestock, teat identifiers 127, teat models 128, tail models 129, teat location information 130, and position maps 131. In one embodiment, the livestock information database 114 may be external to the vision system 100. For example, the livestock information database 114 may be in a different geographic location than the vision system 100 and may be communicatively coupled to the vision system 100 using a network connection. In another embodiment, the livestock information database 114 may be integrated with the vision system 100.

Teat identifiers 127 may be associated with and uniquely identify teats 203 of a dairy livestock. An example of a teat identifier 127 includes, but is not limited to, an alphanumeric label. For example, a teat identifier 127 may be a numeric value, a descriptive name (e.g. right front teat), or an alias. A teat identifier 127 may be represented using any suitable structure, form, or format as would be appreciated by one of ordinary skill in the art upon viewing this disclosure.

Teat models 128 comprise one or more models of a dairy livestock teat that may be used to identify teat candidates or teats of a dairy livestock in a profile signal 134 or a 3D image 138. Examples of teat models 128 includes, but are not limited to, data sets, images, computer-aided design (CAD) models, 3D renderings, point clouds, two-dimensional (2D) renderings, geometric shape models, and boundary representations. In one example, a teat model 128 may be compared to features of a dairy livestock in a 3D image 138 or a profile signal 134 to identity teat candidates. In another example, a teat model 128 may be compared to one or more teat candidates to determine whether a teat candidate is a teat. In another example, a teat model 128 may be compared to one or more edge pairs in a profile signal 134 to determine whether an edge pair is a teat candidate. Examples of using a teat model 128 to identify a teat candidate or teat is described in FIGS. 4, 6, 9, 10, 13A, and 13B. In one embodiment, teat models 128 may be generated based on historical information associated with dairy livestock. For instance, a teat model 128 may be generated based on measurements of a particular dairy livestock and may be specific to the dairy livestock. In another embodiment, teat models 128 may be generated based on statistical or geometric information about dairy livestock teats and may not be specific to a particular dairy livestock.

Tail models 129 comprise one or more models of a dairy livestock tail that may be used to identify a dairy livestock tail in a 3D image 138. Examples of tail models 129 includes, but are not limited to, a data set, images, CAD models, 3D renderings, point clouds, 2D renderings, geometric shape models, and boundary representations. In one embodiment, a tail model 129 may comprise a 2D geometric shape model or a 3D rendering of a predetermined tail shape that corresponds with a tail of a dairy livestock. Examples of predetermined tail shapes include, but are not limited to, an ellipse and an ellipsoid. In one example, a tail model 129 may be compared to features of a dairy livestock in a 3D image 138 or a profile signal 134 to identity tail candidates. In another example, one or more tail candidates in a 3D image 138 may be compared to a tail model 129 to determine whether tail candidates are a portion of the tail of the dairy livestock. Examples of using a tail model 129 to identify portions of a dairy livestock tail are described in FIGS. 7, 8, and 14A, and 14B. In one embodiment, tail models 129 may be generated based on historical information associated with dairy livestock. For instance, a tail model 129 may be generated based on measurements of a particular dairy livestock and may be specific to the dairy livestock. In another embodiment, tail models 129 may be generated based on statistical or geometric information about dairy livestock tails and may not be specific to a particular dairy livestock.

Teat location information 130 and position maps 131 may comprise position information associated with teat identifiers 127 and/or locations for a plurality of teats for one or more dairy livestock. Position maps 131 may comprise graphical representations of information derived from teat location information 130. For example, a position map 131 may be a graph of the location of one or more teats of a dairy livestock. Examples of a position map 131 are described in FIGS. 11 and 16. In one embodiment, teat location information 130 may be generated based on historical information associated with one or more dairy livestock. For instance, teat location information 130 may be generated based on measurements of the teat locations for a particular dairy livestock and may be specific to the dairy livestock. Examples of using teat location information 130 are described in FIGS. 11 and 12. In another embodiment, teat location information 130 may be generated based on statistical or geometric information about teat locations from dairy livestock and may not be specific to a particular dairy livestock.

The network interface 106 may comprise or may be integrated with a modem, a switch, a router, a bridge, a server, or a client. The network interface 106 may be configured to enable wired and/or wireless communications and to communicate data through a network, system, and/or domain. The processor 102 may be configured to send and to receive data using network interface 106 from a network or a remote source. For instance, the processor 102 may be configured to send and receive information about a dairy livestock using network interface 106.

Examples of the user interface 108 include, but are not limited to, touch screens, a light emitting diode (LED) display, an organic LED (OLED) display, an active matric OLED (AMOLED), a projector display, a cathode ray (CRT) monitor, or any other suitable type of display as would be appreciated by one of ordinary skill in the art upon viewing this disclosure. The user interface 108 may be configured to present information to a user using the vision system 100. For example, the user interface 108 may comprise a graphical user interface (GUI). The GUI may be employed to provide interfaces that allow the operator to view and interact with programs or instructions executed on the vision system 100.

The I/O interface 110 may comprise ports, transmitters, receivers, transceivers, or any other devices for transmitting and/or receiving data as would be appreciated by one of ordinary skill in the art upon viewing this disclosure. For example, the I/O interface 110 may be configured to communicate data between the processor 102 and peripheral hardware such as a mouse, a keyboard, or a touch sensor (e.g. a touch screen).

In one embodiment, the vision devices 112 may comprise a laser 132 and a 3D camera 136. For example, the visioning devices 112 may comprise a laser 132 configured to measure depth information and to generate profile signals 134 of one or more surfaces of a dairy livestock. Additional information about profile signals 134 is described in FIG. 9. Examples of 3D cameras 136 include, but are not limited to, time-of-flight cameras. The visioning devices 112 may comprise a 3D camera 136 configured to generate depth maps and/or 3D images 138 of a dairy livestock. Examples of 3D images 138 include, but are not limited to, point clouds, depth maps, and range maps. Additional information and examples of 3D images 138 are described in FIGS. 3-8. The visioning devices 112 may further comprise other cameras (e.g. a color camera or an infrared camera) and/or any other imaging devices for capturing visual information of a dairy livestock. Generally, the visioning devices 112 may be configured to capture or to generate visual information from a dairy livestock.

The vision system 100 may be communicatively coupled to a robotic arm system 140. The robotic arm system 140 comprises a robotic arm. The robotic arm may be coupled to processor 102 and/or another processor or controller. The processor coupled to the robotic arm may be configured to send instructions to move the robotic arm to a particular position or orientation. Also, the processor may be configured to send instructions for performing various operations such as attaching or removing teat cups to teats of a dairy livestock. Additional information and an example of a robotic arm is described in FIG. 2.

FIG. 2 is a side view of an embodiment of a dairy livestock 202 and a robotic arm 200 employing the vision system 100. In one embodiment, the robotic arm 200 comprises a main arm 204, a supplemental arm 206, a gripping portion 208, a laser 132, and a 3D camera 136. The robotic arm 200, laser 132, and/or 3D camera 136 may be configured as shown or in any other suitable configuration. The laser 132 and the 3D camera 136 may be positioned at any suitable location along the main arm 204 or the supplemental arm 206. For example, the laser 132 may be coupled to the gripping portion 208 of the supplemental arm 206 at a location proximate to the part of the gripping portion 208 adapted to hold a teat cup 210 and the 3D camera 136 may be coupled to the supplemental arm 206 at a location between the laser 132 and the main arm 204.

The robotic arm 200 may be configured to employ the 3D camera 136 and/or the laser 132 of the vision system 100 to identify features of the dairy livestock 202 which may allow the robotic arm 200 to perform various operations on the dairy livestock 202. Examples of dairy livestock features include, but are not limited to, a dairy livestock tail 201, teats 203, and legs (e.g. hind legs) 205. In various embodiments, the dairy livestock 202 may have a plurality of teats 203. Generally, dairy livestock 202, such as cows, have four teats 203. Teats 203 may be positioned in a predetermined orientation on an udder of the dairy livestock 202. For example, there may be a front right teat 203, a front left teat 203, a rear right teat 203, and a rear left teat 203, where the front teats 203 are closer to the head of the dairy livestock 202 and the rear teats 203 are closer to the rear of the dairy livestock 202.

As an example, the robotic arm 200 may be configured to retrieve a teat cup 210, such as teat preparation cup or a milking cup, to move the teat cup 210 toward a teat 203 of the dairy livestock 202 within a stall (e.g. a milking station or box), and to attach the teat cup 210 to the teat 203 of the dairy livestock 202. Teat cup 210 may be any suitable container or conduit through which fluid may flow. For example, teat cup 210 may comprise a flexible material which may compress and expand in response to internal and/or external air pressure changes. The teat cup 210 may comprise multiple openings. For instance, the teat cup 210 may comprise a first opening large enough for a teat 203 to be inserted into the teat cup 203. The teat cup 210 may comprise a second opening which may serve as an ingress for the teat cup 210, for example, to allow treatment fluids such as detergents and chemicals to flow into the teat cup 210. The teat cup 210 may comprise a third opening which may serve as an egress for the teat cup 210, for example, to allow fluids such as milk, detergents, and chemicals to exit the teat cup 210.

In one embodiment, the robotic arm 200 may be configured to employ the 3D camera 136 when the robotic arm 200 is at approximately a first distance 212 away from the dairy livestock 202 and may use the laser 132 when the robotic arm 200 is closer to the dairy livestock 202 at approximately a second distance 214 away from the dairy livestock 202. For instance, the robotic arm 200 may be configured to perform one or more operations on the teats 203 of the dairy livestock 202. The robotic arm 200 may employ the 3D camera 136 at approximately the first distance 212 away from the dairy livestock 202 to locate the rear hind legs 205 of the dairy livestock 202. The robotic arm 200 may then use information derived from the 3D camera 136 to position the robotic arm 200 at approximately the second distance 214 away from the dairy livestock 202. For example, the robotic arm 200 may position the laser 132 to the rear of and below the dairy livestock 202 to locate the teats 203 of the dairy livestock 202. The robotic arm 200 may be further configured to employ the laser 132 to locate one or more teats 203 of the dairy livestock 202. In other examples, the robotic arm 200 may use the 3D camera 136 and/or the laser 132 at any suitable distances away from the dairy livestock 202. The robotic arm 200 may also be configured to be positioned at any suitable locations with respect to the dairy livestock 202, for example, in front of the dairy livestock 202 or on the side of the dairy livestock 202.

FIG. 3 is a perspective view of an embodiment of a plurality of image depth planes 302 in a 3D image 138 of a dairy livestock 202. Image depth planes 302 may be used to isolate and view specific portions of a dairy livestock 202 within the 3D image 138. The dairy livestock 202 is oriented within the 3D image 138 with respect to an x-axis 304, a y-axis 306, and a z-axis 308. The x-axis 304 corresponds with a horizontal dimension of the 3D image 138. The y-axis 306 corresponds with a vertical dimension of the 3D image 138. The z-axis 308 corresponds with a depth dimension into the 3D image 138.

Each image depth plane 302 is a two-dimensional view plane of the dairy livestock 202 that extends along the x-axis 304 and the y-axis 306. Image depth planes 302 may be used to partition the dairy livestock 202 or a portion of the dairy livestock 202 along the z-axis 308 into a plurality of view planes or image slices. The dairy livestock 202 may be partitioned into any suitable number and/or combination of image depth planes 302. Image depth planes 302 may use any suitable spacing between the image depth planes 302 along the z-axis 308. For example, the plurality of image depth planes 302 may be equidistant apart from each other, or image depth planes 302 may be configured to partition the entire length of the dairy livestock 202 along the z-axis 308 or just a portion of the dairy livestock 202 along the z-axis 308.

Additional information and examples of using image depth planes 302 within a 3D image 138 are described in FIGS. 4-8. The vision system 100 may use 3D images 138 to identify features (e.g. a tail 201, teats 203, and/or legs 205) of the dairy livestock 202 and/or to identify potential access regions where a robotic arm 200 can access teats 203 of the dairy livestock 202. FIGS. 4 and 7 are examples of 3D images 138 used by the vision system 100 to identify features of the dairy livestock 202. FIGS. 5, 6, and 8 are embodiments of the vision system 100 using 3D images 138 to identify features of the dairy livestock 202. The vision system 100 may be configured to use the 3D image 138 to identify features of the dairy livestock 202 to facilitate performing one or more operations on the dairy livestock 202. Examples of operations that are performed on the dairy livestock 202 includes, but are not limited to, teat preparation and milk extraction.

FIG. 4 is an embodiment of a 3D image 138 of a rearview of a dairy livestock 202 in a stall 402. In FIG. 4, the vision system 100 may use the 3D image 138 to detect legs 205 and teats 203 of the dairy livestock 202. Each pixel of the 3D image 138 may be associated with a depth value. In other words, the color, intensity, and/or numeric value of each pixel in the 3D image 138 may be associated with a particular depth with respect to the z-axis 308. The vision system 100 may be configured to use a depth value threshold 125 to identify one or more regions 410 within the 3D image 138. A depth value threshold 125 may be represented by any a color, intensity, numeric value, or any other suitable indicator of a particular depth in the 3D image 138. For example, the vision system 100 may compare portions of the 3D image 138 to the depth value threshold 125 and to identify one or more regions 410 in the 3D image 138 that comprise depth values greater than a depth value threshold 125. A region 410 with a depth value greater than the depth value threshold 125 indicates that the region 410 extends to at least a predetermined depth along the z-axis 308 into the 3D image 138. Comparing the portions of the 3D image 138 to the depth value threshold 125 allows the vision system 100 to identify one or more regions 410 with a depth that is suitable to be considered a thigh gap region 412.

A thigh gap region 412 is a region 410 that corresponds with a space or opening between the hind legs 205 of the dairy livestock 202. The thigh gap region 412 is a region 410 where the vision system 100 may define or demarcate an access region 418 that provides a suitable amount of clearance for a robotic arm 200 to access the teats 203 of the dairy livestock 202. The vision system 100 may apply one or more rules from a thigh gap rule set 126 to the identified regions 410 in order to determine whether a region 410 is the thigh gap region 412. Examples of applying rules from a thigh gap rule set 126 are described in FIG. 5. In other embodiments, the thigh gap region 412 may correspond with a space or opening between any other pairs of legs 205 of the dairy livestock 202.

The vision system 100 may be configured to demarcate an access region 418 within the thigh gap region 412. An access region 418 may be an area or space that provides a suitable amount of clearance for a robotic arm 200 to access the teats 203 of the dairy livestock 202. The access region 418 may comprise a first vertical edge 420, a second vertical edge 422, a first lower edge 424 spanning between the first vertical edge 420 and the second vertical edge 422, and a first upper edge 426 spanning between the first vertical edge 420 and the second vertical edge 422. The first vertical edge 420 and the second vertical edge 422 of the access region 418 may generally define the width 428 of the access region 418. In other words, the width 428 of the access regions 418 corresponds with a dimension (e.g. the x-axis 304) that spans between the hind legs 205 of the dairy livestock 202. The vision system 100 may be configured to determine and/or output position information for the first vertical edge 420, the second vertical edge 422, the first upper edge 426, and/or the first lower edge 424 of the access region 418. For instance, the vision system 100 may determine and/or output the position of the first vertical edge 420 and the second vertical edge 422 based on their pixel locations in the 3D image 138, Cartesian coordinates or vectors with respect to the x-axis 304, the y-axis 306, and the z-axis 308, or any other suitable technique as would be appreciated by one of ordinary skill in the art upon viewing this disclosure.

In one embodiment, the vision system 100 may be configured to reduce the width 428 of the access region 418, for example, to provide a safety margin for when a robotic arm 200 positions itself adjacent to the dairy livestock 202. Reducing the width 428 of the access region 418 may help the robotic arm 200 to avoid the legs 205 of the dairy livestock 202. The vision system 100 may shift the first vertical edge 420 and/or the second vertical edge 422 of the access region 418 to reduce the width 428 of the access region 418. For example, the vision system 100 may shift the first vertical edge 420 of the access region 418 along the x-axis 304 toward the second vertical edge 422 of the access region 418 by a first offset value 421. The vision system 100 may also shift the second vertical edge 422 of the access region 418 along the x-axis 304 toward the first vertical edge 420 of the access region 418 by a second offset value 423. The first offset value 421 and the second offset value 423 may be the same or different. The vision system 100 may be configured to determine and/or output position information for the shifted first vertical edge 420 and the shifted second vertical edge 422 of the access region 418.

In one embodiment, the vision system 100 may be configured to establish boundaries for a robotic arm 200 to limit the movement of a robotic arm 200 based on the access region 418. For example, the vision system 100 may be configured to set a first boundary 425 at the location of the first vertical edge 420 and a second boundary 427 at the location of the second vertical edge 422. The movement of a robotic arm 200 may be limited to the space within the first boundary 425 and the second boundary 427.

In one embodiment, the vision system 100 may be configured to demarcate a teat detection region 434. A teat detection region 434 may be an area that the vision system 100 examines to detect and identify teat candidates 442 and/or teats 203 of the dairy livestock 202. In general, the teat detection region 434 may be an area where teats 203 of the dairy livestock 202 are likely to be located.

The teat detection region 434 may comprise a third vertical edge 436 extending vertically from the first vertical edge 420 of the access region 418, a fourth vertical edge 438 extending vertically from the second vertical edge 422 of the access region 418, a second upper edge 442 spanning between the third vertical edge 436 and the fourth vertical edge 438, and a second lower edge 440 spanning between the third vertical edge 436 and the fourth vertical edge 438. The second lower edge 440 may be adjacent to or coincident with the first upper edge 426 of the access region 418. The vision system 100 may be configured to partition the 3D image 138 within the teat detection region 434 along the z-axis 308 to generate a plurality of image depth planes 302 and to examine each of the plurality of image depth planes 302 for teat candidates 442 as explained below with respect to FIG. 6.

In one embodiment, the vision system 100 may be configured to generate a profile signal 134 of at least a portion of the dairy livestock 202 within an image depth plane 302. For instance, the vision system 100 may generate the profile signal 134 based on a profile or a surface of a portion of the dairy livestock 202 within an image depth plane 302, for example, an udder of the dairy livestock 202. The vision system 100 may be further configured to process the profile signal 134 to determine position information for the one or more teat candidates 442. Examples of the vision system 100 processing the profile signal 134 to determine position information teat candidates 442 and/or teats 203 are described in FIGS. 9 and 10.

In another embodiment, the vision system 100 may be configured to identify one or more teat candidates 442 within an image depth plane 302 and/or to apply one or more rules from a teat detection rule set 124 to the one or more teat candidates 442 to identify one or more teats 203. Examples of applying rules from a teat detection rule set 124 to teat candidates 442 are described in FIGS. 6, 13A, and 13B.

The vision system 100 may be configured to determine and/or output position information for the one or more teat candidates 442 and the one or more teats 203. For instance, the vision system 100 may determine and/or output the position of the one or more teat candidates 442 and the one or more teats 203 based on their pixel locations in the 3D image 138, Cartesian coordinates or vectors with respect to the x-axis 304, the y-axis 306, and the z-axis 308, or any other suitable technique as would be appreciated by one of ordinary skill in the art upon viewing this disclosure.

FIG. 5 is a flowchart of an embodiment of a leg detection method 500 using the vision system 100. In one embodiment, the vision system 100 may employ method 500 to detect and to determine the position of legs 205 of a dairy livestock 202. For example, the vision system 100 may be configured to determine the position of the hind legs 205 of the dairy livestock 202 in order to identify an access region 418 where a robotic arm 200 may safely approach the dairy livestock 202.

At step 502, the vision system 100 obtains a 3D image 138 of a rearview of a dairy livestock 202 in a stall 402. In one embodiment, the vision system 100 may obtain the 3D image 138 by employing a 3D camera 136 to generate the 3D image 138. In another embodiment, the vision system 100 may obtain the 3D image 138 from a memory (e.g. memory 104). For example, the 3D image 138 may be previously captured and stored into a memory.

At step 504, the vision system 100 identifies one or more regions 410 within the 3D image 138 comprising depth values greater than a depth value threshold 125. The one or more regions 410 may represent areas in the 3D image 138 with enough depth with respect to the z-axis 308 to potentially be a thigh gap region 412. The vision system 100 may compare portions of the 3D image 138 to the depth value threshold 125 to identify one or more regions 410 in the 3D image 138 that comprise depth values greater than the depth value threshold 125. A region 410 with a depth value greater than the depth value threshold 125 may indicate that the region 410 extends to at least a predetermined depth along the z-axis 308 into the 3D image 138.

At step 506, the vision system 100 applies one or more rules from a thigh gap detection rule set 126 to the one or more regions 410 to identify a thigh gap region 412 among the one or more regions 410. The vision system 100 may apply the one or more rules from the thigh gap detection rule set 126 to a region 410 from the one or more regions 410. Non-limiting examples of the vision system 100 applying one or more rules from the thigh gap detection rule set 126 to regions 410 are described below. At step 508, the vision system 100 determines whether the region 410 satisfied the one or more rules of the thigh gap detection rule set 126. The vision system 100 may proceed to step 510 when the region 410 does not satisfy the one or more rules of the thigh gap detection rule set 126. Otherwise, the vision system 100 may proceed to step 512 when the region 410 satisfies the one or more rules of the thigh gap detection rule set 126. At step 510, the vision system 100 may discard the region 410 from the one or more regions 410 in response to determining that the region 410 does not satisfy the one or more rules of the thigh gap detection rule set 126, and therefore is not the thigh gap region 412. At step 512, the vision system 100 may identify the region 410 as the thigh gap region 412 in response to determining that the region 410 satisfies the one or more rules of the thigh gap detection rule set 126.

As an example, the thigh gap rule set 126 may identify a marker 414 positioned between the hind legs 205 of the dairy livestock 202 adjacent to or coincident with a lower edge 416 of the 3D image 138. One or more markers 414 may be employed by the vision system 100 to indicate user defined features or logic that may be used for identifying areas of interest (e.g. thigh gap region 412, teat detection region 434, and/or tail detection region 702). For example, a user may set a marker 414 in a location within a 3D image 138 where a thigh gap region 412 is more likely to occur such as between the hind legs 205 of the dairy livestock 202 and proximate to a lower edge of the 3D image 138. The vision system 100 may be configured to employ markers 414 as part of a decision process to discard regions 410 that do not comprise the marker 414 and identify a region 410 as the thigh gap region 412 when the region 410 comprises the marker 414. Markers 414 may be set at predefined locations before processing the 3D image 138 to identify the thigh gap region 412 or may be set while processing the 3D image 138 to identify the thigh gap region 412.

As another example, the thigh gap rule set 126 may identify one or more boundaries within the 3D image 138 and may discard regions 410 that are outside of the defined boundaries, coincident with, or share an edge with the defined boundaries. For example, the thigh gap rule set 126 may identify a first 3D image edge 430 and a second 3D image edge 432 and may discard regions 410 that share an edge with either the first 3D image edge 430 or the second 3D image edge 432. Since the thigh gap region 412 may be generally located between a pair of legs 205 of the dairy livestock 202 in a central portion of the 3D image 138, the vision system 100 may discard regions 410 that share an edge with either the first 3D image edge 430 or the second 3D image edge 432. The vision system 100 may also be configured to identify a region 410 as the thigh gap region 412 when the region 410 does not share an edge with either the first 3D image edge 430 or the second 3D image edge 432.

As another example, the thigh gap rule set 126 may comprise a rule that indicates a minimum or a maximum area value with respect to the x-axis 304 and the y-axis 306 to be considered a thigh gap region 412. The minimum or maximum area value may be determined and set to provide enough clearance for a robotic arm 200. For instance, the vision system 100 may be configured to compare one or more regions 410 to a minimum area value to be considered a thigh gap region 412 and may discard regions 410 with an area less than the minimum area value to be considered the thigh gap region 412. In other words, the vision system 100 may discard or reject regions 410 that are too small to be the thigh gap region 412. The vision system 100 may be configured to identify a region 410 as the thigh gap region 412 when the region 410 has an area greater than or equal to the minimum area value to be considered the thigh gap region 412. As another example, the vision system 100 may be configured to compare one or more regions 410 to a maximum area value to be considered a thigh gap region 412 and may discard regions 410 with an area greater than the maximum area value to be considered the thigh gap region 412. In other words, the vision system 100 may discard or reject regions 410 that are too large to be the thigh gap region 412. The vision system 100 may be configured to identify a region 410 as the thigh gap region 412 when the region 410 has an area less than or equal to the maximum area value to be considered the thigh gap region 412. In general, the vision system 100 may apply such rules to reject or ignore regions 410 that are either too small to provide enough clearance for the robotic arm 200, and therefore, are not the thigh gap 412 or regions 410 that are too large to be a space between the legs 205 of the dairy livestock 202.

As another example, the thigh gap rule set 126 may comprise a rule that indicates a minimum or maximum height value with respect to the y-axis 306 to be considered a thigh gap region 412. The minimum or maximum height value may be determined and set to provide enough clearance for a robotic arm 200. For example, the vision system 100 may be configured to compare the height of one or more regions 410 to a minimum height value to be considered a thigh gap region 410 and may discard regions 410 with a height less than the minimum height value to be considered the thigh gap region 412. In other words, the vision system 100 may discard or reject regions 410 that are too short to be the thigh gap region 412. The vision system 100 may be configured to identify a region 410 as the thigh gap region 412 when the region 410 has a height greater than or equal to the minimum height value to be considered the thigh gap region 412. As another example, the vision system 100 may be configured to compare the height of one or more regions 410 to a maximum height value to be considered a thigh gap region 410 and may discard regions 410 with a height greater than the maximum height value to be considered the thigh gap region 412. In other words, the vision system 100 may discard or reject regions 410 that are too tall to be the thigh gap region 412. The vision system 100 may also be configured to identify a region 410 as the thigh gap region 412 when the region 410 has a height less than or equal to the maximum height value to be considered the thigh gap region 412. In general, the vision system 100 may apply such rules to reject or ignore regions 410 with a vertical dimension with respect to the y-axis 306 is too short to provide clearance for the robotic arm 200, and therefore, are not the thigh gap region 412 or too tall to be space between the legs 205 of the dairy livestock 202.

As another example, the thigh gap rule set 126 may comprise a rule that indicates a minimum or maximum width value with respect to the x-axis 304 to be considered a thigh gap region 412. The minimum or maximum width value may be determined and set to provide enough clearance for a robotic arm 200. For example, the vision system 100 may be configured to compare the width of one or more regions 410 to a minimum width value to be considered a thigh gap region 410 and may discard regions 410 with a width less than the minimum width value to be considered the thigh gap region 412. In other words, the vision system 100 may discard or reject regions 410 that are too narrow to be the thigh gap region 412. The vision system 100 may also be configured to identify a region 410 as the thigh gap region 412 when the region 410 has a width greater than or equal to the minimum width value to be considered the thigh gap region 412. As another example, the vision system 100 may be configured to compare the width of one or more regions 410 to a maximum width value to be considered a thigh gap region 410 and may discard regions 410 with a width greater than the maximum width value to be considered the thigh gap region 412. In other words, the vision system 100 may discard or reject regions 410 that are too wide to be the thigh gap region 412. The vision system 100 may also be configured to identify a region 410 as the thigh gap region 412 when the region 410 has a width less than or equal to the maximum width value to be considered the thigh gap region 412. In general, the vision system 100 may apply such rules to reject or ignore regions 410 with a horizontal dimension with respect to the x-axis 304 is too narrow to provide clearance for the robotic arm 200, and therefore, are not the thigh gap region 412 or too wide to be a space between the legs 205 of the dairy livestock 202.

At step 514, the vision system 100 determines whether the thigh gap region 412 has been identified from among the one or more regions 410. The vision system 100 returns to step 506 in response to determining that the thigh gap region 412 has not been identified. The vision system 100 may proceed to step 516 in response to determining that the thigh gap region 412 has been identified from among the one or more regions 410. For example, the vision system 100 may proceed to step 516 when the thigh gap region 412 has been identified even if there are still more regions 410 from the one or more regions 410 to examine.

At step 516, the vision system 100 demarcates an access region 418 within the thigh gap region 412. In one embodiment, the vision system 100 may demarcate the access region 418 by determining the largest region (e.g. rectangular region) that fits within the thigh gap region 412. For example, the vision system 100 may set the first vertical edge 420 of the access region 418 at one of the edges of the thigh gap region 412 that is adjacent to one of the legs 205 of the dairy livestock 202 and the second vertical edge 220 of the access region 418 at another edge of the thigh gap region that corresponds with another leg 205 of the dairy livestock 202. The vision system 100 may then set the first lower edge 424 and the first upper edge 426 within the thigh gap region 412. In other embodiments, the vision system 100 may demarcate the access region 418 by determining a region within the thigh gap region 418 that accommodates a predetermined access region 418 shape or area.

At step 518, the vision system 100 determines whether to reduce the width 428 of the access region 418. For example, the vision system 100 may be configured to provide a safety margin for avoiding contact with the legs 205 of the dairy livestock 202 and to reduce the width 428 of the access region 418. The vision system 100 may proceed to step 520 in response to determining to reduce the width 428 of the access region 410. Otherwise, the vision system 100 may proceed to step 522 in response to determining not to reduce the width 428 of the access region 410. The vision system 100 may determine whether to reduce the width 428 of the access region 418 and the amount of width reduction based on user input and/or predefined instructions.

At step 520, the vision system 100 reduces the width 428 of the access region 418 by shifting the first vertical edge 420 and the second vertical edge 422 of the access region 418. As an example, the vision system 100 may shift the first vertical edge 420 toward the second vertical edge 422 and may shift the second vertical edge 422 toward the first vertical edge 420. Reducing the width 428 of the access region 418 may further restrict the movement of the robotic arm 200 with respect to the x-axis 304 to avoid contacting the legs 205 of the dairy livestock 202.

At step 522, the vision system 100 determines position information for the first vertical edge 420 and the second vertical edge 422 of the access region 418. The vision system 100 may determine the position of the first vertical edge 420 and the second vertical edge 422 based on their pixel locations in the 3D image 138, Cartesian coordinates or vectors with respect to the x-axis 304, the y-axis 306, and the z-axis 308, or any other suitable technique as would be appreciated by one of ordinary skill in the art upon viewing this disclosure. In other embodiments, the vision system 100 may determine position information for the first upper edge 426 and/or the first lower edge 424. The vision system 100 may also output the position information for the first vertical edge 420, the second vertical edge 422, the first upper edge 426, and/or the first lower edge 424.

FIG. 6 is a flowchart of an embodiment of a teat detection method 600 using the vision system 100 with a 3D image 138. In one embodiment, the vision system 100 may employ method 600 to detect and to determine the position of one or more teat candidates 442 or one or more teats 203 of a dairy livestock 202. For example, the vision system 100 may employ method 600 to determine the position of the one or more teats 203 in order to perform operations (e.g. teat preparation and/or milk extraction) on the dairy livestock 202.

At step 602, the vision system 100 obtains a 3D image 138 of a rearview of a dairy livestock 202 in a stall 402. The vision system 100 may obtain the 3D image 138 of the dairy livestock 202 similarly to as described in step 502 of FIG. 5.

At step 604, the vision system 100 identifies one or more regions 410 within the 3D image 138 comprising depth values greater than a depth value threshold 125. The vision system 100 may identify the one or more regions 410 within the 3D image 138 similarly to as described in step 504 of FIG. 5.

At step 606, the vision system 100 applies one or more rules from a thigh gap detection rule set 126 to identify a thigh gap region 412 among the one or more regions 410. The vision system 100 may apply one or more rules from a thigh gap detection rule set 126 to identify the thigh gap region 412 similarly to as described in steps 506-514 of FIG. 5.

At step 608, the vision system 100 demarcates an access region 418 within the thigh gap region 412. The vision system 100 may demarcate the access region 418 within the thigh gap region 412 similarly to as described in step 516 of FIG. 5. In one embodiment, the vision system 100 may also reduce the width 428 of the access region 418 similarly to as described in step 520 of FIG. 5.

At step 610, the vision system 100 demarcates a teat detection region 434 within the 3D image 138. In one embodiment, the vision system 100 may set the third vertical edge 436 of the teat detection region 434 to extend vertically from the first vertical edge 420 of the access region 418 and the fourth vertical edge 438 of the teat detection region 434 to extend vertically from the second vertical edge 422 of the access region 418. The vision system 100 may then set the second lower edge 440 and the second upper edge 442 of the teat detection region 434. In one embodiment, the second lower edge 440 is adjacent to or coincident with the first upper edge 426 of the access region 418 and the second upper edge 442 is adjacent to or coincident with an upper edge of the 3D image 138.

At step 612, the vision system 100 partitions the 3D image 138 within the teat detection region 434 along the z-axis 308 to generate a plurality of image depth planes 302. The vision system 100 may partition the 3D image 138 along the z-axis 308 into any suitable number of image depth planes 302 with any suitable spacing between the image depth planes 302.

At step 614, the vision system 100 identifies one or more teat candidates 442 within an image depth plane 302 from the plurality of image depth planes 302. The vision system 100 may compare a teat model 128 to features of the dairy livestock 202 in the image depth plane 302 to identify teat candidates 442 within the image depth plane 302.

The vision system 100 may iteratively examine each image depth planes 302 from the plurality of image depth planes 302 to identify features of the dairy livestock 202 and then compare the identified features to the teat model 128. The vision system 100 may progressively advance through the image depth planes 302 along the z-axis 308 in a direction where depth increases. During each iteration, the vision system 100 advances through the image depth planes 302 and may identify one or more features. Some features of the dairy livestock 202 may correspond with desired features (e.g. teats 203) of the dairy livestock 202, but these features may not be identifiable as teat candidates 442 until an appropriate depth is reached in the plurality of image depth planes 302. For example, an initial image depth plane 302 may comprise a feature that represents a portion of a teat 203, however, the teat 203 may not be identifiable as a teat candidate 442 until subsequent image depth planes 203 where features of the teat 203 are more pronounced.

Examples of examining features of a dairy livestock 202 in an image depth plane 302 are described in FIGS. 13A and 13B.

In one embodiment, the teat model 128 may comprise a teat shape (e.g. an ellipse) and the vision system 100 may compare the teat shape to features of the dairy livestock 202 within the image depth plane 302. The vision system 100 may be configured to iterative compare properties of the teat model 128, such as geometric shape and size, to features of the dairy livestock 202 within one or more image depth planes 302. For example, the vision system 100 may compare the teat model 128 to one or more features of the dairy livestock 202 in a first image depth 302 and may discard or ignore features of the dairy livestock 202 that do not substantially match the teat model 128. The vision system 100 may continue to compare the teat model 128 to features of the dairy livestock 202 in one or more additional image depth planes 302. The vision system 100 may identify features of the dairy livestock 202 as teat candidates 442 in response to determining that the features of the dairy livestock 202 correspond with the teat model 128 within one or more image depth planes 302. Examples of comparing a teat model 128 to features of the dairy livestock 202 are described in FIGS. 13A and 13B.

At step 616, the vision system 100 applies one or more rules from a teat detection rule set 124 to each of the one or more teat candidates 442 to identify one or more teats 203 from among the teat candidates 442. The teat detection rule set 124 may comprise one or more rules that define criteria for a teat candidate 442 to be considered a teat 203 of the dairy livestock 202. The vision system 100 may apply the one or more rules of the teat detection rule set 124 to each of the teat candidates 442 to determine whether each of the teat candidates 442 meet the criteria to be considered a teat 203. Non-limiting examples of the vision system 100 applying one or more rules from the teat detection rule set 124 to teat candidates 442 are described below.

At step 618, the vision system 100 may determine whether the teat candidate 442 satisfies the one or more rules of the teat detection rule set 124. The vision system 100 may proceed to step 620 when the teat candidate 442 does not satisfy the rules of the teat detection rule set 124. In other words, the vision system 100 may proceed to step 620 when the teat candidate 442 does not meet the criteria to be considered a teat 203 of the dairy livestock 202. The vision system 100 may proceed to step 622 when the teat candidate 442 when the teat candidate 442 satisfies the rules of the teat detection rule set 124. In other words, the vision system may proceed to step 622 when the teat candidate 442 meets the criteria to be considered a teat 203 of the dairy livestock 202. At step 620, the vision system 100 may discard or reject a teat candidate 442 in response to determining that the teat candidate 442 does not satisfy the one or more rules from the teat detection rule set 124. At step 622, the vision system 100 may identify a teat candidate 442 as a teat 203 of the dairy livestock 202 in response to determining that the teat candidate 442 satisfies the one or more rules from the teat detection rule set 124.

As an example, the teat detection rule set 124 may comprise a rule that indicates a minimum or maximum area value with respect to the x-axis 304 and the y-axis 306 to be considered a teat 203. The vision system 100 may compare the area of each of the teat candidates 442 to a minimum area value to be considered a teat 203 and may discard teat candidates 442 with an area less than the minimum area value to be considered a teat 203. In other words, the vision system 100 may discard or rejection teat candidates 442 that are too small to be a teat 203. The vision system 100 may identify a teat candidate 442 as a teat 203 when the teat candidate 442 has an area greater than or equal to the minimum area value to be considered a teat 203. As another example, the vision system 100 may compare the area of each of the teat candidates 442 to a maximum area value to be considered a teat 203 and may discard teat candidates 442 with an area greater than the maximum area value to be considered a teat 203. In other words, the vision system 100 may discard or rejection teat candidates 442 that are too large to be a teat 203. The vision system 100 may identify a teat candidate 442 as a teat 203 when the teat candidate 442 has an area less than or equal to the maximum area value to be considered a teat 203. In general, the vision system 100 may apply such rules to reject or ignore teat candidates 442 generated by features that have area with respect to the x-axis 304 and the y-axis 306 that is too small, for example, from a skin fold, or too large, for example, from an udder, to be a teat 203.

As another example, the teat detection rule set 124 may comprise a rule that indicates a minimum or maximum height position value with respect to the y-axis 306 to be considered a teat 203. The minimum and maximum height position value may determined and set to define limits for discarding and/or identifying teats 203 from among the teat candidates 442. The vision system 100 may compare the height position of teat candidates 442 with respect to the y-axis 306 to a minimum height position value to be considered a teat 203 and may discard teat candidates 442 with a height position less than the minimum height position value to be considered a teat 203. In other words, the vision system 100 may discard or reject teat candidates 442 that are too low to be a teat 203. The vision system 100 may identify a teat candidate 442 as a teat 203 when the teat candidate 442 has a height position greater than or equal to the minimum height position value to be considered a teat 203. As another example, the vision system 100 may compare the height position of teat candidates 442 with respect to the y-axis 306 to a maximum height position value to be considered a teat 203 and may discard teat candidates 442 with a height position greater than the maximum height position value to be considered a teat 203. In other words, the vision system 100 may discard or reject teat candidates 442 that are too high to be a teat 203. The vision system 100 may identify a teat candidate 442 as a teat 203 when the teat candidate 442 has a height position less than or equal to the maximum height position value to be considered a teat 203. In general, the vision system 100 may apply such rules to reject or ignore teat candidate 442 that are positioned too high or too low with respect to the y-axis 306 to be a teat 203. In one embodiment, teats 203 may be generally located in a central portion of the 3D image 138, and therefore, teat candidates 442 that are closer to upper edge or a lower edge of the 3D image 138 are unlikely to be teats 203 of the dairy livestock 202.

As another example, the teat detection rule set 124 may comprise a rule that indicates a minimum or maximum width value with respect to the x-axis 304 to be considered a teat 203. The vision system 100 may compare the width of teat candidates 442 to a minimum width value to be considered a teat 203 and may discard teat candidates 442 with a width less than the minimum width value to be considered a teat 203. In other words, the vision system 100 may discard or reject teat candidates 442 that are too narrow to be a teat 203. The vision system 100 may identify a teat candidate 442 as a teat 203 when the teat candidate 442 has a width greater than or equal to the minimum width value to be considered a teat 203. As another example, the vision system 100 may compare the width of teat candidates 442 to a maximum width value to be considered a teat 203 and may discard teat candidates 442 with a width greater than the maximum width value to be considered a teat 203. In other words, the vision system 100 may discard or reject teat candidates 442 that are too wide to be a teat 203. The vision system 100 may identify a teat candidate 442 as a teat 203 when the teat candidate 442 has a width less than or equal to the maximum width value to be considered a teat 203. In general, the vision system 100 may apply such rules to reject or ignore teat candidates 442 generated by features that have a width with respect to the x-axis 304 that is too narrow, for example, from a skin fold, or too large, for example, from an udder, to be a teat 203.

At step 624, the vision system 100 determines whether a target number of teats 203 have been identified. The target number of teats 203 may be a predefined value set by an operator. For example, the vision system 100 may be configured to identify four teats 203 of the dairy livestock 202. In other examples, the vision system 100 may be configured to find any other suitable number of teats 203. The vision system 100 may return to step 614 in response to determining that the target number of teats 203 has not been identified. In other words, the vision system 100 may continue to search for and identify additional teats 203 until the target number of teats 203 has been identified. In one embodiment, the vision system 100 may adjust one or more properties of the teat model 128 to identify other potential teat candidates 442. For example, the vision system 100 may adjust the size or shape from the teat model 128 that used for comparisons to identify teat candidates 442. The vision system 100 may proceed to step 620 in response to determining that the target number of teats 203 has been identified.

At step 626, the vision system 100 determines position information for the one or more teats 203. In one embodiment, the vision system 100 may determine the position for the one or more teats 203 based on their respective positions with respect to the plurality of image depth planes 302. For example, the image depth plane 302 where a teat 203 is identified may indicate a depth of the teat 203 with respect to the z-axis 308. The position of the teat 203 within the image depth plane 302 may indicate the vertical position of the teat 203 with respect to the y-axis 306 and the horizontal position of the teat 203 with respect to the x-axis 304. The vision system 100 may determine and/or output the position information for the one or more teat candidates 442 and/or the one or more teats 203 based on their pixel locations in the 3D image 138, Cartesian coordinates or vectors with respect to the x-axis 304, the y-axis 306, and the z-axis 308, or any other suitable technique as would be appreciated by one of ordinary skill in the art upon viewing this disclosure.

FIG. 7 is another embodiment of a 3D image 138 of a rearview of a dairy livestock 202 in a stall 402. FIG. 7 illustrates using a 3D image 138 to detect a tail 201 of the dairy livestock 202. Similar to FIG. 4, the dairy livestock 202 is oriented within the 3D image with respect to an x-axis 304, a y-axis 306, and a z-axis 308. The vision system 100 may be configured to identify a thigh gap region 412 and to demarcate an access region 418 similarly to as previously described in FIG. 4.

In one embodiment, the vision system 100 may be configured to demarcate a tail detection region 702. A tail detection region 702 may be an area that the vision system 100 examines to detect and to identify tail candidates 712 and/or a tail 201 of the dairy livestock 202. In general, the tail detection region 702 may be an area where the tail 201 of the dairy livestock 202 is likely to be located.

The tail detection region 702 may comprise a third vertical edge 704 extending vertically from the first vertical edge 420 of the access region 418, a fourth vertical edge 706 extending vertically from the second vertical edge 422 of the access region 418, a second upper edge 708 spanning between the third vertical edge 704 and the fourth vertical edge 706, and a second lower edge 710 spanning between the third vertical edge 704 and the fourth vertical edge 706. The second lower edge 710 may be adjacent to or coincident with the first upper edge 426 of the access region 418.

The vision system 100 may be configured to partition the 3D image 138 within the tail detection region 702 along the z-axis 308 to generate a plurality of image depth planes 302 and to examine each of the image depth planes 302 for tail candidates 712. The vision system 100 may be configured to identify one or more tail candidates 712 within an image depth plane 302 and to compare a tail model 129 to the one or more tail candidates 712 to identify a tail 201 of the dairy livestock 202. In one embodiment, the tail model 129 may indicate a predetermined tail shape and the vision system 100 may be configured to compare the predetermined tail shape to the one or more tail candidates 712. The vision system 100 may be configured to discard tail candidates 712 that do not correspond with the tail model 129 and to identify tail candidates 712 that correspond with the tail model 129 as the tail 201 of the dairy livestock 202. In one embodiment, the vision system 100 may be configured to identify a tail candidate 712 as the tail 201 of the dairy livestock 202 in response to determining that the tail candidate 712 corresponds with the tail model 129 for one or more image depth planes 302. Examples of comparing a tail model 129 to tail candidates 712 are described in FIGS. 14A and 14B.

The vision system 100 may be configured to determine and/or output position information for the one or more tail candidates 712 and/or the tail 201 of the dairy livestock 202. For instance, the vision system 100 may determine and/or output the position of the one or more tail candidates 712 and the tail 201 of the dairy livestock 202 based on their pixel location in the 3D image 138, Cartesian coordinates or vectors with respect to the x-axis 304, the y-axis 306, and the z-axis 308, or any other suitable technique as would be appreciated by one of ordinary skill upon viewing this disclosure.

FIG. 8 is a flowchart of an embodiment of a tail detection method 800 using the vision system 100. In one embodiment, the vision system 100 may employ method 800 to detect and to determine the position of a tail 201 of a dairy livestock 202. For example, the vision system 100 may be configured to determine the position of the tail 201 of the dairy livestock 202 to avoid the tail 201 while positioning a robotic arm 200 and/or performing operations using the robotic arm 200.

At step 802, the vision system 100 obtains a 3D image 138 of a rearview of a dairy livestock 202 in a stall 402. The vision system 100 may obtain the 3D image 138 similarly to as described in step 502 of FIG. 5.

At step 804, the vision system 100 identifies one or more regions 410 within the 3D image 138 comprising depth values greater than a depth value threshold 125. The vision system 100 may identify one or more regions 410 within the 3D image 138 similarly to as described in step 504 of FIG. 5.

At step 806, the vision system 100 applies one or more rules from a thigh gap detection rule set 126 to the one or more regions 410 to identify a thigh gap region 412 among the one or more regions 410. The vision system 100 may be configured to apply one or more rules from a thigh gap detection rule set 126 to a identify the thigh gap region 412 similarly to as described in step 506-514 of FIG. 5.

At step 808, the vision system 100 demarcates an access region 418 within the thigh gap region 412. The vision system 100 may demarcate the access region 418 similarly to as described in step 516 of FIG. 5. In one embodiment, the vision system 100 may also reduce the width 428 of the access region 418 similarly to as described in step 520 of FIG. 5.

At step 810, the vision system 100 demarcates a tail detection region 702 within the 3D image 138. In one embodiment, the vision system 100 may set the third vertical edge 704 of the tail detection region 702 to extend vertically from the first vertical edge 420 of the access region 418 and the fourth vertical edge 706 of the tail detection region 702 to extend vertically from the second vertical edge 422 of the access region 418. The vision system 100 may then set the second upper edge 708 and the second lower edge 710 of the tail detection region 702. In one embodiment, the second lower edge 710 is adjacent to or coincident with the first upper edge 426 of the access region 418 and the second upper edge 708 is adjacent to or coincident with an upper edge of the 3D image 138.

At step 812, the vision system 100 partitions the 3D image 138 within the tail detection region 702 along the z-axis 308 to generate a plurality of image depth planes 302. The vision system 100 may partition the 3D image 138 along the z-axis 308 into any suitable number of image depth planes 302 with any suitable spacing between the image depth planes 302.

At step 814, the vision system 100 identifies one or more tail candidates 712 within an image depth plane 302 from the plurality of image depth planes 302. The vision system 100 may identify features of the dairy livestock 202 within one or more of the plurality of image depth planes 302 as tail candidates 712. In one embodiment, the vision system 100 may use one or more geometric shapes (e.g. an ellipse) to identify features that correspond with tail candidates 712 within each of the image depth planes 302. The one or more geometric shapes may correspond with tail shapes for dairy livestock 202. The vision system 100 may identify a feature of the dairy livestock 202 as a tail candidate 712 when the feature substantially matches one of the geometric shapes that corresponds with a tail shape. At step 816, the vision system 100 compares each of the one or more tail candidates 712 to a tail model 129 (e.g. a predetermined tail shape) to identify a tail 201 of the dairy livestock 202 within the plurality of image depth planes 302. Examples of comparing a tail model 129 to tail candidates 712 are described in FIGS. 14A and 14B.

As an example, the vision system 100 may iteratively examine each of the image depth planes 302 from the plurality of image depth plane 302 to identify features of the dairy livestock 202 as tail candidates 712. The vision system 100 may progressively advance through the image depth planes 302 along the z-axis 308 in a direction where depth increases. During each iteration of the vision system 100 advancing through the image depth plane 302, one or more tail candidates 712 may be identified. The vision system 100 may then compare the identified tail candidates 712 to the tail model 129 to identify a tail 201 of the dairy livestock 202. Some tail candidates 712 may correspond with the tail 201 of the dairy livestock 202, but these tail candidates 712 may not be identifiable as the tail 201 until an appropriate depth is reached in the plurality of image depth planes 302. For example, an initial image depth plane 302 may comprise a tail candidate 712 that represents a portion of the tail 201, however, the tail candidate 712 may not be identifiable as the tail 201 until subsequent image depth planes 302 where the features of the tail 201 are more pronounced.

In one embodiment, the tail model 129 may comprise a tail shape and the vision system 100 may compare the tail shape to the tail candidates 712 within each of the plurality of image depth planes 302. The vision system 100 may be configured to iteratively compare properties of the tail model 129, such as geometric shape and size, to the tail candidates 712 within one or more of the image depth planes 302. For example, the vision system 100 may compare the tail model 129 to each of the tail candidates 712 and may discard or ignore tail candidates 712 that do not substantially match the tail model 129. For example, the vision system 100 may determine that the tail candidate 712 and the tail model 129 do not correspond with each other when the size and/or shape of the tail candidate 712 does not match the tail model 129. The vision system 100 may continue to compare the tail model 129 to tail candidates 712 in one or more additional image depth planes 302. The vision system 100 may identify a tail candidate 712 as the tail 201 in response to determining that the tail candidate 712 corresponds with the tail model 129 within one or more image depth planes 302. For example, the vision system 100 may determine that the tail candidate 712 and the tail model 129 correspond with each other when the size and/or shape of the tail candidate 712 substantially matches the tail model 129. Examples of comparing a tail model 129 to tail candidates 712 are described in FIGS. 14A and 14B.

At step 818, the vision system 100 determines whether the one or more tail candidates 712 correspond with the tail model 129. The vision system 100 may proceed to step 820 in response to determining that the one or more tail candidates 712 do not correspond with the tail model 129. Otherwise, the vision system 100 may proceed to step 822 in response to determining that the one or more tail candidates correspond with the tail model 129. At step 820, the vision system 100 discards tail candidates 712 that do not correspond with the tail model 129 and then proceeds to step 824. The vision system 100 may discard or disregard tail candidates 712 that are substantially different from the tail model 129 and are unlikely the tail 201 of the dairy livestock 202. At step 822, the vision system 100 identifies tail candidates 712 from among the one or more tail candidates 712 as a tail 201 of the dairy livestock 202 and then proceeds to step 824. The vision system 100 identifies tail candidates 712 that match the tail model 129 and are likely portions of the tail 201 of the dairy livestock 202.

At step 824, the vision system 100 determines whether the tail 201 of the dairy livestock 202 has been identified from among the one or more tail candidates 712. The vision system 100 may return to step 814 in response to determining that the tail 201 has not been identified. In other words, the vision system 100 may continue to search for and identify tail candidates 712 until the tail 201 has been identified. In one embodiment, the vision system 100 may adjust one or more properties used to identify other tail candidates 712. For example, the vision system 100 may adjust the size or shape of a tail shape that is used to identify tail candidates 712. The vision system 100 may proceed to step 826 in response to determining that the tail 201 has been identified.

In another embodiment, the vision system 100 may proceed to step 826 in response to determining that the tail 201 has been identified in at least two of the image depth planes 302 and may otherwise return to step 814.

At step 826, the vision system 100 determines position information for the tail 201 of the dairy livestock 202. In one embodiment, the vision system 100 may determine the position of the tail 201 based on its position with respect to the plurality of image depth planes 302. For example, the image depth plane 302 where the tail 201 is identified may indicate a depth of the tail 201 with respect to the z-axis 308. The position of the tail 201 within the image depth plane 302 may indicate the vertical position of the tail 201 with respect to the y-axis 306 and the horizontal position of the tail 201 with respect to the x-axis 304. The vision system 100 may determine and/or output the position of the tail 201 of the dairy livestock 202 based on pixel locations in the 3D image 138, Cartesian coordinates or vectors with respect to the x-axis 304, the y-axis 306, and the z-axis 308, or any other suitable technique as would be appreciated by one of ordinary skill in the art upon viewing this disclosure.

FIG. 9 is an embodiment of a profile signal 134 used by the vision system 100 to identify features (e.g. teats 203) of the dairy livestock 202. The vision system 100 may be configured to use the profile signal 134 to identify features of the dairy livestock 202 to facilitate performing one or more operations on the dairy livestock 202.

In one embodiment, the vision system 100 may be configured to use profile signals 134 after repositioning of the robotic arm 200 adjacent to the dairy livestock 202 based on position information derived from one or more 3D images 138. For example, the robotic arm 200 may move from approximately a first distance 212 away from the dairy livestock 202 to approximately a second distance 214 away from the dairy livestock 202 via an access region 418.

FIG. 9 is a graph 900 of an embodiment of a profile signal 134 of a portion of a dairy livestock 202. In one embodiment, the vision system 100 is configured to employ the laser 132 to generate a profile signal 134 of a portion of a dairy livestock 202. The profile signal 134 may be used by the vision system 100 to identify one or more teat candidates 442 and/or teats 203 of the dairy livestock 202. An example of the vision system 100 using a profile signal 134 to identify one or more teat candidates 442 is described in FIG. 10.

Axis 904 indicates distance or offset, for example in millimeters (mm), with respect to an first axis (e.g. the x-axis 304 with respect to the robotic arm 200 and the laser 132) and axis 906 indicates a distance or offset, for example in mm, with respect to a second axis (e.g. the z-axis 308 with respect to the robotic arm 200 and the laser 132). Profile signals 134 comprises information associated with the relative distance between the dairy livestock 202 and the robotic arm 200 along the x-axis 304. As an example, the profile signal 134 may be generated by a laser 132 positioned at a point 902 located at 0 mm on the z-axis 308 and 0 mm on the x-axis 304. In FIG. 9, negative values of the x-axis 304 indicate positions to the left of the laser 132 and positive values of the x-axis 304 indicate positions to the right of the laser 132. The profile signal 134 comprises relative distance information from about 200 mm to the left of the laser 132 (shown as −200 mm) to about 200 mm to the right of the laser 132.

At about −200 mm, the dairy livestock 202 may be about 450 mm from the laser 132. From about −200 mm to about −125 mm, the distance between the laser 132 and the dairy livestock 202 decreases from about 450 mm to about 275 mm. The decrease in distance between the laser 132 and the dairy livestock 202 may indicate that the portion of the dairy livestock 202 between about −200 mm and about −125 mm is extending towards the laser 132. From about −125 mm to about −80 mm, the distance between the laser 132 and the dairy livestock 202 remains relatively constant at about 275 mm. From about −80 mm to about −40 mm, the distance between the laser 132 and the dairy livestock 202 increases from about 275 mm to about 400 mm. The increase in distance between the laser 132 and the dairy livestock 202 may indicate that the portion of the dairy livestock 202 between about −80 mm and about −40 mm is extending away from the laser 132. Generally, the portion of the profile signal 134 from about −200 mm to about −40 mm represents a portion of the dairy livestock 202 that extends toward the laser 132, has a relatively constant depth section, and then extends away from the laser 132. The vision system 100 may be configured to interpret this general pattern in the portion of the profile signal 134 from about −200 mm to about −40 mm as potentially comprising a teat 203.

From about −40 mm to about 10 mm along the x-axis 940, the distance between the laser 132 and the dairy livestock 202 decreases from about 400 mm to about 250 mm. The decrease in distance between the laser 132 and the dairy livestock 202 may indicate that the portion of the dairy livestock 202 between about −40 mm and about 10 mm along the x-axis 904 is extending towards the laser 132. From about 10 mm to about 40 mm along the x-axis 904, the distance between the laser 132 and the dairy livestock 202 remains relatively constant at about 250 mm. From about 40 mm to about 200 mm along the x-axis 904, the distance between the laser 132 and the dairy livestock 202 generally increases from about 250 mm to about 450 mm. The increase in distance between the laser 132 and the dairy livestock 202 may indicate that the portion of the dairy livestock 202 between about 40 mm and about 200 mm along the x-axis 904 is extending away from the laser 132. The portion of the profile signal 134 from about −40 mm to about 200 mm along the x-axis 904 generally represents a pattern similar to as previously described for the portion of the profile signal 134 between about −200 mm to about −40 mm along the x-axis 904. Again, the vision system 100 may be configured to interpret this general pattern in the portion of the profile signal 134 from about −40 mm to about 200 mm along the x-axis 940 as potentially comprising another teat 203.

Profile signals 134 may comprise one or more rising distance gradients 908 and/or one or more falling distance gradients 910. A rising distance gradient 908 may indicate an increase in the distance between the robotic arm 200 and the dairy livestock 202 and may be generally defined as a change or transition from a first distance away from the robotic arm 200 to second distance that is further away from the robotic arm 200. For example, the portion of the profile signal 134 from about −80 mm to about −40 mm along the x-axis 940 may be referred to as a rising distance gradient 908. A falling distance gradient 910 may indicate a decrease in the distance between the robotic arm 200 and the dairy livestock 202 and may be generally defined as a change or transition from a first distance away from the robotic arm 200 to a second distance that is closer to the robotic arm 200. For example, the portion of the profile signal 134 from about −150 mm to about −125 mm along the x-axis 904 may be referred to as a falling distance gradient 910.

The amount of distance change of a rising distance gradient 908 or a falling distance gradient 910 with respect to the z-axis 906 may be referred to as a distance gradient length 916. A relatively large distance gradient length 916 may indicate a large distance change between the robotic arm 200 and the dairy livestock 202 and a relatively small distance gradient length 916 may indicate a small distance change between the robotic arm 200 and the dairy livestock 202. For example, the magnitude of the distance gradient length 916 between a location at about −150 mm to a location at about −125 mm along the x-axis 904 may be about 125 mm.

A falling distance gradient 910 may be paired with a rising distance gradient 908 to form complementary distance gradients 912. The spacing between a falling distance gradient 910 and a corresponding rising distance gradient 908 in a complementary distance gradient 912 may be referred to as a complementary distance gradient spacing 918. For example, the portion of the profile signal 134 from about −150 mm to about −40 mm along the x-axis 904 comprises a falling distance gradient 910 (e.g. from about −150 mm to about −125 mm along the x-axis 904) and a rising distance gradient 908 (e.g. from about −80 mm to about −40 mm along the x-axis 904) and may be referred to as a complementary distance gradient 912. The portion of the profile signal 134 between the falling distance gradient 910 and the rising distance gradient 908 (e.g. from about −125 mm to about −80 mm along the x-axis 904) may be referred to as the complementary distance gradient spacing 918.

Complementary distance gradients 912 may be used to identify edge pair candidates 914 that correspond with potential teats 203 of the dairy livestock 202. Edge pair candidates 914 may comprise a complementary distance gradient 912 which may be used by the vision system 100 to identify edge pairs 920 and/or teat candidates 442. Edge pair candidates 914 comprise a falling distance gradient 910 that is paired with an adjacent rising distance gradient 908, which may generally describe the profile or pattern for potential teats 203 of the dairy livestock 202. For example, the falling distance gradient 910 and the rising distance gradient 908 in the portion of the profile signal 134 from about −150 mm to about −40 mm along the x-axis 904 may be referred to as an edge pair candidate 914. An example of using edge pairs 920 to identify teats 203 is described in FIG. 15.

The vision system 100 may compare the complementary distance gradients 912 of each of the edge pair candidates 914 to a minimum distance gradient length 916 to be considered an edge pair 920 and to identify one or more of the edge pair candidates 914 as an edge pair 920 when an edge pair candidate 914 has complementary distance gradient 912 lengths greater than or equal to the minimum distance gradient length 916 to the be considered an edge pair 920. In other words, the vision system 100 may analyze each edge pair candidate 914 to determine whether the gradient lengths 916 is sufficient to potentially be a teat 203 of the dairy livestock 202. Analyzing the gradient lengths 916 of edge pair candidates 914 allows the vision system 100 to eliminate false positives caused by other features of the dairy livestock 202 such as skin folds.

The vision system 100 may be configured to apply one or more rules from a teat detection rule set 124 to edge pairs 920 to eliminate false positives of potential teats 203 and/or to identify teat candidates 442 from among the one or more edge pairs 920. Examples of applying rules from a teat detection rule set 124 are described in FIGS. 10 and 15.

The vision system 100 may be configured to determine and/or output position information for the one or more edge pairs 920 and/or one or more teat candidates 442 identified in a profile signal 134. For instance, the vision system 100 may determine and/or output the position information of the one or more edge pairs 920 and one or more teat candidates 442 based on their Cartesian coordinates or polar coordinates, for example, with respect to axis 904 and axis 906.

FIG. 10 is a flowchart of an embodiment of a teat detection method 1000 using the vision system 100 with a profile signal 134. As an example, a robotic arm 200 may position itself adjacent to a dairy livestock 202 within an access region 418 identified by the vision system 100. The vision system 100 may employ method 1000 to use profile signals 134 to identify one or more teat candidates 442 on the dairy livestock 202 and to determine position information associated with the identified teat candidates 442.

At step 1002, the vision system 100 obtains a profile signal 134 of a least a portion of a dairy livestock 202. In one embodiment, obtaining the profile signal 134 comprises employing a laser 132 or a 3D camera 136 to generate the profile signal 134. For example, the vision system 100 may employ laser 132 to perform a laser scan of a portion of the dairy livestock 202 to generate the profile signal 134. As another example, the vision system 100 may capture a 3D image 138 and may process the 3D image 138 to generate the profile signal 134, for example, similarly to as described in FIG. 4. In another embodiment, obtaining the profile signal 134 comprises obtaining a profile signal 134 from a memory, for example, memory 104.

At step 1004, the vision system 100 detects one or more edge pair candidates 914 in the profile signal 134. For example, the vision system 100 may identify complementary distance gradients 912 (i.e. falling distance gradient 910 and rising distant gradient 908 pairs) in the profile signal 134 as edge pair candidates 914.

At step 1006, the vision system 100 compares complementary distance gradient 912 lengths for each of the edge pair candidates 914 to a minimum distance gradient length 916 to be considered an edge pair 920. In other words, the vision system 100 analyzes the complementary distance gradient 912 lengths to remove complementary distance gradients 912 that are too small be a teat 203 of the dairy livestock 202. For example, some complementary distance gradients 912 may be generated by other features of the dairy livestock 202 such as skinfolds. Comparing the complementary distance gradients 912 to the minimum gradient distance length 916 may reduce false positives when identifying potential teats 203 of a dairy livestock 202. The minimum distance gradient distance length 916 may be a fixed predetermined value or an adjustable value.

At step 1008, the vision system 100 identifies one or more edge pairs 920 from among the one or more edge pair candidates 914 based on the comparison. For example, the vision system 100 may identify one or more of the edge pair candidates 914 as an edge pair 920 when an edge pair candidate 914 has complementary distance gradient 912 lengths greater than or equal to the minimum distance gradient length 916 to the be considered an edge pair 920.

At step 1010, the vision system 100 applies one or more rules from a teat detection rule set 124 to each of the one or more edge pairs 920 to identify one or more teat candidates 442 from among the edge pairs 920. The teat detection rule set 124 may comprise one or more rules that define criteria for an edge pair 920 to be considered a teat candidate 442 for a teat 203 of the dairy livestock 202. The vision system 100 may apply the one or more rules of the teat detection rule set 124 to each of the edge pairs 920 to determine whether each edge pair 920 meets the criteria to be considered a teat candidate 442. Non-limiting examples of the vision system 100 applying one or more rules from the teat detection rule set 124 to edge pairs 920 are described below. At step 1012, the vision system 100 determined whether the edge pair 920 satisfies the one or more rules of the teat detection rule set 124. The vision system 100 may proceed to step 1014 when the edge pair 920 does not satisfy the rules of the teat detection rule set 124. In other words, the vision system 100 may proceed to step 1014 when the edge pair 920 does not meet the criteria to be considered a teat candidate 442 for a teat 203 of the dairy livestock 202. The vision system 100 may proceed to step 1016 when the edge pair 920 satisfies the rules of the teat detection rule set 124. In other words, the vision system 100 may proceed to step 1016 when the edge pair 920 meets the criteria to be considered a teat candidate 442 for a teat 203 of the dairy livestock 202. At step 1014, the vision system 100 may discard or reject edge pairs 920 in response to determining that the edge pair 920 does not satisfy one or more rules of the teat detection rule set 124. At step 1016, the vision system 100 may identify an edge pair 920 as a teat candidate 442 in response to determining that the edge pair 920 satisfies the one or more rules from the teat detection rule set 124.

As an example, the teat detection rule set 124 may comprise a rule that indicates for the vision system 100 to compare the one or more edge pairs 920 to a teat model 128 and to discard edge pairs 920 that do not correspond with the teat model 128. In other words, the vision system 100 may discard edge pairs 920 that vary in shape beyond some tolerance from the teat model 128. The vision system 100 may be configured to identify an edge pair 920 from among the one or more edge pairs 920 as a teat candidate 442 when the edge pair 920 corresponds with the teat model 128. In general, the vision system 100 may apply such a rule to determine whether an edge pair 920 has the general size and shape to be considered a teat candidate 442. The vision system 100 may reject and ignore edge candidates 920 that are either too big, too small, or the wrong shape to be considered a teat candidate 442. An example of comparing a teat model 128 to edge pairs 920 to identify teat candidates 442 is described in FIG. 15.

As another example, the teat detection rule set 124 may comprise a rule that indicates a minimum or a maximum complementary distance gradient spacing 918 to be considered a teat candidate 442. For example, the vision system 100 may be configured to compare the complementary distance gradient spacing 918 of each of the one or more edge pairs 920 to a minimum complementary distance gradient spacing 918 to be considered a teat candidate 442. The vision system 100 may be configured to discard edge pairs 920 with a complementary distance gradient spacing 918 less than the minimum complementary distance gradient spacing 918 to be considered a teat candidate 442. In other words, the vision system 100 may discard or reject edge pairs 920 that are too narrow to be a teat candidate 442. The vision system 100 may be configured to identify an edge pair 920 as a teat candidate 442 when the edge pair 920 has a complementary distance gradient spacing 918 greater than or equal to the minimum complementary distance gradient spacing 918 to be considered a teat candidate 442. As another example, the vision system 100 may be configured to compare the complementary distance gradient spacing 918 of each of the one or more edge pairs 920 to a maximum complementary distance gradient spacing 918 to be considered a teat candidate 442. The vision system 100 may be configured to discard edge pairs 920 with a complementary distance gradient spacing 918 greater than the maximum complementary distance gradient spacing 918 to be considered a teat candidate 442. In other words, the vision system 100 may discard or reject edge pairs 920 that are too far apart to be a teat candidate 442. The vision system 100 may be configured to identify an edge pair 920 as a teat candidate 442 when the edge pair 920 has a complementary distance gradient spacing 918 less than or equal to the maximum complementary distance gradient spacing 918 to be considered a teat candidate 442. In general, the vision system 100 may apply such rules to determine whether an edge pair 920 has complementary gradient spacing 918 that likely corresponds with a teat 203 of the dairy livestock 202. The vision system 100 may reject or ignore edge pairs 920 that are generated by features of a dairy livestock 202 with a large complementary gradient spacing 918 such as an udder or with a small complementary gradient spacing 918 such as skin fold.

As another example, the teat detection rule set 124 may comprise a rule that indicates a minimum or a maximum distance gradient length 916 to be considered a teat candidate 442. For example, the vision system 100 may be configured to compare the distance gradient length 916 of each of the one or more edge pairs 920 to a minimum complementary distance gradient length 916 to be considered a teat candidate 442. The vision system 100 may be configured to discard edge pairs 920 with a distance gradient length 916 less than the minimum distance gradient length 916 to be considered a teat candidate 442. In other words, the vision system 100 may discard or reject edge pairs 920 that are too short to be a teat candidate 442. The vision system 100 may be configured to identify an edge pair 920 as a teat candidate 442 when the edge pair 920 has a distance gradient length 916 greater than or equal to the minimum distance gradient length 916 to be considered a teat candidate 442. As another example, the vision system 100 may be configured to compare the distance gradient length 916 of each of the one or more edge pairs 920 to a maximum complementary distance gradient length 916 to be considered a teat candidate 442. The vision system 100 may be configured to discard edge pairs 920 with a distance gradient length 916 greater than the maximum distance gradient length 916 to be considered a teat candidate 442. In other words, the vision system 100 may discard or reject edge pairs 920 that are too long to be a teat candidate 442. The vision system 100 may be configured to identify an edge pair 920 as a teat candidate 442 when the edge pair 920 has a distance gradient length 916 less than or equal to the maximum distance gradient length 916 to be considered a teat candidate 442. In general, the vision system 100 may apply such rules to determine whether each edge pair 920 has a distance gradient length 916 that likely corresponds with a teat 203 of the dairy livestock 202.

At step 1018, the vision system 100 determines whether there are anymore edge pairs 920 to analyze. The vision system 100 may return to step 1010 in response to determining that there are more edge pairs 920 to analyze. In other words, the vision system 100 may continue to determine whether the remaining edge pairs 920 meet the criteria to be considered a teat candidate 442. The vision system 100 may proceed to step 1020 in response to determining that there are no more edge pairs 920 to analyze.

At step 1020, the vision system 100 determines position information for the one or more teat candidates 442. In one embodiment, the vision system 100 may determine the position for the one or more teat candidates 442 based on their respective positions with respect to their location in the profile signal 134. For example referring to FIG. 9, the profile signal 134 may define location of teat candidates 442 with respect to a relative location of the robotic arm 200 and the laser 132, for example, point 902. The position of a teat candidate 442 may be indicated by a location in the profile signal 134 with respect to the x-axis 904 and the z-axis 906. For instance, the vision system 100 may determine a teat candidate 442 is located at about −100 mm with respect to the x-axis 904 and about 275 mm with respective the z-axis 906. In other examples, the vision system 100 may determine the teat candidate 442 is located within a general location, for example, between about −150 mm and about −75 mm with respect to the x-axis 904. In other embodiments, the vision system 100 may determine position information for a teat candidate 442 with respect to one or more coordinate systems. For example, the vision system 100 may determine the location of a teat candidate 442 within a profile signal 134 and may translate the location of the teat candidate 442 into terms of another coordinate system such as a coordinate system based on the location of the robot with a workspace (e.g. stall 402). The vision system 100 may determine and/or output the position of the one or more teat candidates 442 based on their Cartesian coordinates, polar coordinates, or vectors with respect to the x-axis 302, the y-axis 306, and the z-axis 308, or any other suitable technique as would be appreciated by one of ordinary skill in the art upon viewing this disclosure. In some embodiments, the vision system 100 may output the position information for the one or more teat candidates 442.

FIG. 11A is a position map 1100 of an embodiment of a plurality of teats 203 of a dairy livestock 202. The vision system 100 may use the position map 1100 to identify teats 203 and/or to determine the location of teats 203 of the dairy livestock 202 relative to a known reference point 1101. The teats 203 of the dairy livestock 202 are oriented in the position map 1100 with respect to the x-axis 304, the y-axis 306, and the z-axis 308. Each teat 203 may be associated with a teat identifier 127 which may be any suitable identifier that uniquely identifies a teat 203. For example, a first teat 1102 may be associated with a teat identifier 127 that corresponds with a front right teat 203 of the dairy livestock 202, a second teat 1104 may be associated with a teat identifier 127 that corresponds with a front left teat 203 of the dairy livestock 202, a third teat 1106 may be associated with a teat identifier 127 that corresponds with a rear right teat 203 of the dairy livestock 202, and a fourth teat 1108 may be associated with a teat identifier 127 that corresponds with a rear left teat 203 of the dairy livestock 202.

In FIG. 11A, the first teat 1102 is located at a first location 1103, the second teat 1104 is located at a second location 1105, the third teat 1106 is located a third location 1107, and the fourth teat 1108 is located a fourth location 1109 in the position map 1100. The locations of the teats 203 may be an absolute location or a relative location relative to reference point 1101. The vision system 100 may use any suitable reference point 1101 as would be appreciated by one of ordinary skill in the art upon viewing this disclosure. For example, the position of the teats 203 may be a relative position with respect to a reference point 1101 (e.g. a corner) in stall 402 or a relative position with respect to a reference point 1101 (e.g. a base) of a robotic arm 200. The position of the teats 203 may be with respect to any reference point 1101 as would be appreciated by one of ordinary skill in the art upon viewing this disclosure. The location of the teats 203 may be expressed or represented in any suitable units, for example, inches, centimeter, or millimeters.

In one embodiment, the location of teats 203 may be obtained from position information generated from processing a 3D image 138 and/or a profile signal 134. For example, the location of teats 203 may be obtained from a method such as teat detection method 800 in FIG. 8 or teat detection method 1000 in FIG. 10. In another embodiment, the location of teats 203 may be obtained from a memory, for example, teat location information 130 in memory 104 or livestock information database 114. For example, the location of the teats 203 may be obtained from historical information for the location of teats 203 on a particular dairy livestock 202.

In another embodiment, the locations of teats 203 may be obtained from one or more teat candidate clusters. A teat candidate cluster may comprise a plurality of data points (e.g. a point cloud) that represent possible teat 203 locations. For example, teat candidate clusters may be generated by the output from one or more teat detection processes (e.g. teat detection method 800 in FIG. 8 or teat detection method 1000 in FIG. 10) over multiple iterations. The position information for the teats 203 generated from each iteration of the one or more teat detection processes may be aggregated or combined into a single data set. The position information for each teat 203 may be a data point within the single data set. The position information for a teat 203 may comprise relative or absolute position information for the teat 203. For example, relative position information may describe the location of a teat 203 with respect to other teats 203. Absolute position information may described the location of a teat with respect to a known coordinate system. The data points corresponding to the teats 203 may form clusters around the general location of teats 203, and these clusters of data points may be referred to as teat candidate clusters. The vision system 100 may be configured to perform one or more operations on teat candidate clusters to determine teat 203 locations. For example, the vision system 100 may be configured to average data points of a teat candidate cluster to determine a teat 203 location. In other words, the vision system may be configured to approximate the location of a teat 203 based on the data points in a teat candidate cluster. Other examples of operations that the vision system 100 may perform on teat candidate clusters include, but are not limited to, finding a median data point and filtering data points. An example of using teat candidate clusters is described in FIG. 16.

In one embodiment, the vision system 100 may be configured to apply one or more offsets to the locations of the teats 203. Offsets may be applied with respect to the x-axis 304, the y-axis 306, and/or the z-axis 308. For example, the vision system 100 may be configured to determine a robot position offset 1120 between a center line of a dairy livestock 202 and base of the robotic arm 200. The vision system 100 may then apply the robot position offset 1120 to the locations of the teats 203 to shift the locations of the teats 203 by the robot position offset 1120. In another example, the vision system 100 may be configured to determine a dairy livestock position offset 1122 based on the location of the dairy livestock 202 within a stall 402. For example, the dairy livestock position offset 1122 may be based on the position of the dairy livestock 202 with respect to a rear wall of the stall 402. The vision system 100 may then apply the dairy livestock position offset 1122 to the locations of the teats 203 to shift the locations of the teats 203 by the dairy livestock position offset 1122. Alternatively, any other kind of offset may be applied to the locations of the teat 203.

In one embodiment, the vision system 100 may be configured to identify an unknown teat 1110 using teat location information and/or the position map 1100. The vision system 100 may receive a teat position associated with an unknown teat 1110 and may then determined whether the unknown teat 1110 corresponds with the first teat 1102, the second teat 1104, the third teat 1106, or the fourth teat 1108. For instance, the vision system 100 may be configured to determine a first position distance 1112 between the teat location of the unknown teat 1110 and the first teat 1102, a second position distance 1114 between the teat location of the unknown teat 1110 and the second teat 1104, a third position distance 1116 between the teat location of the unknown teat 1110 and the third teat 1106, and a fourth position distance 1118 between the teat location of the unknown teat 1110 and the fourth teat 1108. The vision system 100 may be configured to compare the first position distance 1112, the second position distance 1114, the third position distance 1116, and the fourth position distance 1116 to determine the identity of the unknown teat 1110. The vision system 100 may be configured to associate the unknown teat 1110 with a teat identifier 127 in response to identifying a teat 203 that corresponds with the unknown teat 1110. For example, the vision system 100 may associate the unknown teat 1110 with a teat identifier 127 corresponding with the first teat 1102, the second teat 1104, the third teat 1106, and the fourth teat 1108 based on the comparison of the first position distance 1112, the second position distance 1114, the third position distance 1116, and the fourth position distance 1116. An example of the vision system 100 identifying an unknown teat 1110 is described in FIG. 12A.

FIG. 11B is a position map 1120 of another embodiment of a plurality of teats 203 of a dairy livestock 202. The vision system 100 may use the position map 1120 to associate teat candidates 442 with teats 203 of the dairy livestock 202. The teats 203 of the dairy livestock 202 are oriented in the position map 1120 with respect to the x-axis 304, the y-axis 306, and the z-axis 308. Each teat 203 may be associated with a teat identifier 127 which may be any suitable identifier that uniquely identifies a teat 203. For example, a first teat 1102 may be associated with a teat identifier 127 that corresponds with a front right teat 203 of the dairy livestock 202, a second teat 1104 may be associated with a teat identifier 127 that corresponds with a front left teat 203 of the dairy livestock 203, a third teat 1106 may be associated with a teat identifier 127 that corresponds with a rear right teat 203 of the dairy livestock, and a fourth teat 1108 with a teat identifier 127 corresponding with a rear left teat 203 of the dairy livestock 202. The location of the teats 203 may be determined similarly to as described in FIG. 11A.

One or more teat candidates 442 may be oriented in the position map 1120 with respect to the x-axis 304, the y-axis 306, and the z-axis 308. Teat candidate 442 position information may be obtained from the output of one or more teat detection processes (e.g. teat detection method 800 in FIG. 8 or teat detection method 1000 in FIG. 10) or from a memory (e.g. memory 104). Teat candidate 442 position information may comprise relative or absolute position information for a teat candidate 442. For example, relative position information may describe the location of a teat candidate 442 with respect to other teat candidates 442 and/or teats 203. Absolute position information may describe the location of a teat candidate 442 with respect to a known coordinate system. In FIG. 11B, a first teat candidate 1122 may be a first distance 1126 away from a target teat 203 (e.g. the second teat 1104) and a second teat candidate 1124 may be a second distance 1128 away from the target teat 203.

In one embodiment, the vision system 100 may be configured to associate or link teat candidates 442 with teats 203 of the dairy livestock 202. The vision system 100 may receive teat candidate position information associated with one or more teat candidates 442. The vision system 100 may also receive a teat identifier 127 that indicates a target teat 203 from the plurality of teats 203 (e.g. the first teat 1102, the second teat 1104, the third teat 1106, and the fourth teat 1108) to associate with one of the teat candidates 442. The vision system 100 may use the teat candidate position information to determine which of the teat candidates 442 corresponds with the target teat 203. For example, the vision system 100 may determine which teat candidate 442 corresponds with the target teat 203 based on the distance a teat candidate 442 is away from the target teat 203.

As another example, the vision system 100 may determine which teat candidate 442 corresponds with the target teat 203 based on the position of a teat candidate 442 with respect to other teat candidates 442 and/or with respect the target teat 203. For instance, a teat candidate 442 that is positioned as the left most (i.e. closest to the left side of the dairy livestock 202) teat candidate 442 along the x-axis 304 with respect to other teat candidates 442 may be identified as the target teat 203 when the target teat 203 is a left teat 203 (e.g. front left teat 203 or rear left teat 203) of the dairy livestock 202. In FIG. 11B, the first teat candidate 1122 is the left most teat candidate 442 compared to the second teat candidate 1124 and may be identified as the target teat 203. Similarly, a teat candidate 442 that is positioned as the right most (i.e. closest to the right side of the dairy livestock 202) teat candidate 442 along the x-axis 304 with respect to other teat candidates 442 may be identified as the target teat 203 when the target teat 203 is a right teat 203 (e.g. front right teat 203 or rear right teat 203) of the dairy livestock 202. Alternatively, a teat candidate 442 that is positioned as the forward or front most (i.e. closest to the head of the dairy livestock 202) teat candidate 442 along the z-axis 308 with respect to other teat candidates 442 may be identified as the target teat 203 when the target teat 203 is a front teat 203 (e.g. front left teat 203 or front right teat 203) of the dairy livestock 202. Alternatively, a teat candidate 442 that is positioned as the rear most (i.e. closest to the tail 201 of the dairy livestock 202) teat candidate 442 along the z-axis 308 with respect to other teat candidates 442 may be identified as the target teat 203 when the target teat 203 is a rear teat 203 (e.g. rear left teat 203 or rear right teat 203) of the dairy livestock 202.

In one embodiment, each teat 203 may be associated with a teat location range 1130 that indicates maximum distance a teat candidate 442 can be away from a teat 203 to be considered the teat 203. For example, in FIG. 11B, the first teat candidate 1122 is the left most teat candidate 442 compared to the second teat candidate 1124 but the first teat candidate 1122 is not located within the teat location range 1130 of the target teat 203, and therefore, the second teat candidate 1124 may be identified as the target teat 203.

As an example, the vision system 100 may obtain teat location information 130 for a plurality of teats 203 on a dairy livestock 202 in a stall 402. The locations of the teats 203 may be obtained from position information generated by 3D images 138 and/or a profile signal 134, or obtained from a memory (e.g. teat location information 130 in memory 104 or livestock database 114). The vision system 100 may also obtain teat candidate position information associated with a plurality of teat candidates 442 which may be obtain from processing a 3D image 138 and/or a profile signal 134. For instance, the teat candidate position for the plurality of teat candidates 442 may be obtained from a method such as teat detection method 800 in FIG. 8 or teat detection method 1000 in FIG. 10.

The vision system 100 may receive a teat identifier 127 for a target teat 203 from among the plurality of teats 203 on the dairy livestock 202. In one embodiment, the vision system 100 may receive the teat identifier 127 from an operator that identifies the target teat 203. In another embodiment, the vision system 100 may determine which teat 203 from the plurality of teats 203 is closest to the plurality of teat candidates 442 and the teat identifier 127 for the determined teat 203 may be used for the target teat 203. The teat identifier 127 indicates whether the target teat 203 is a front right teat 203, a front left teat 203, a rear right teat 203, or a rear left teat 203 of the dairy livestock 202. For example, in FIG. 11B the teat identifier 127 may indicate that the target teat 203 is the front left teat 203 of the dairy livestock 202.

When the vision system 100 determines that the teat identifier 127 corresponds with a left teat 203, the vision system 100 selects the left most teat candidate 442 from the plurality of teat candidates 442. The vision system 100 may determine which teat candidate 442 from the plurality of teat candidates 442 is closest to the left side of the dairy livestock 202 based on its position (e.g. relative position or absolute position) with respect to the other teat candidates 442 from the plurality of teat candidates 442. The vision system 100 may select the teat candidate 442 from the plurality of teat candidates 442 that is determined to be closest to the left side of the dairy livestock 202. For example, in FIG. 11B the vision system 100 may select the first teat candidate 1122 as the left most teat candidate 442.

The vision system 100 may determine whether the selected teat candidate 442 is within the teat location range 1130 for the target teat 203. The vision system 100 may determine that the selected teat candidate 442 is too far away from the target teat 203 to be considered the target teat 203 when the distance between the selected teat candidate 442 and the target teat 203 is greater than or outside of the teat location range 1130. A selected teat candidate 442 that is outside of the teat location range 1130 may indicate that the selected teat candidate 442 is a false positive and does not correspond with an actual teat candidate 442. The vision system 100 may determine that the selected teat candidate 442 is a valid teat candidate 442 when the distance between the selected teat candidate 442 and the target teat 203 is equal to, less than, or within the teat location range 1130. A selected teat candidate 442 that is within the teat location range 1130 may indicate that the selected teat candidate 442 likely corresponds with the target teat 203. In FIG. 11B, the first teat candidate 1122 is outside of the teat location range 1130 for the target teat 203.

When the vision system 100 determines that the selected teat candidate 442 is outside of the teat location range 1130 of the target teat 203, the vision system 100 may select the next left most teat candidate 442 from the plurality of teat candidates 442. In other words, the vision system 100 may continue searching for another left most teat candidate 442 that is within the teat location range 1130 of the target teat 203, which is likely to correspond with the target teat 203. In general, the vision system 100 may iteratively select other teat candidates 442 that are adjacent to the previously selected teat candidate 442 until identifying a selected teat candidate 442 that is within the teat location range 1130. For example, in FIG. 11B the vision system 100 may select the second teat candidate 1124 in response to the first teat candidate 1122 being outside of the teat location range 1103 for the target teat 203.

When the vision system 100 determines that the selected teat candidate 442 is within the teat location range 1130 of the target teat 203, the vision system 100 may determine that the selected teat candidate 442 corresponds with the target teat 203 and may associate or link the teat identifier 127 for the target teat 203 with the selected teat candidate 442. In the example of FIG. 11B, the vision system 100 may determine that the second teat candidate 442 corresponds with the target teat 203 (i.e. the front left teat 203 of the dairy livestock 202). The vision system 100 may store the association between the selected teat candidate 442 and the target teat 203 and/or any other information (e.g. position information) associated with the selected teat candidate 442 in a memory (e.g. memory 104 or livestock information database 114). The position information for the selected teat candidate 442 may be saved and/or used by the vision system 100 for performing operations on the dairy livestock 200 associated with the selected teat candidate 442. In some embodiments, the vision system 100 may output the teat identifier 127 and/or the teat candidate position that is associated with the selected teat candidate 442.

A process similar to as described above may be performed when the vision system 100 determines that the teat identifier 127 corresponds with a right teat 203. Another example of the vision system associating a teat candidate 442 with a teat 203 of the dairy livestock 202 is described in FIG. 12B.

FIG. 12A is a flowchart of an embodiment of a teat identification method 1200 using the vision system 100. As an example, a robotic arm 200 may be positioned adjacent to a dairy livestock 202 within an access region 418 identified by the vision system 100. The vision system 100 may employ method 1200 to identify one or more teats 203 of the dairy livestock 202 and/or to determine the location of teats 203 of the dairy livestock 202.

At step 1202, the vision system 100 obtains teat location information for a plurality of teats 203 on a dairy livestock 202 in a stall 402. The locations of the teats 203 may be obtained from position information generated from a 3D image 138 and/or a profile signal 134, obtained from a memory (e.g. teat location information 130 in memory 104 or livestock information database 114), or based on one or more teat candidate clusters similarly to as described in FIG. 11A. In one embodiment, the plurality of teats 203 may comprise a first teat 1102, a second teat 1104, a third teat 1106, and a fourth teat 1108. For example, the first teat 1102 may correspond with the front right teat 203, the second teat 1104 may correspond with the front left teat 203, the third teat 1106 may correspond with the rear right teat 203, and the fourth teat 1108 may correspond with the rear left teat 203 of the dairy livestock 202.

At step 1204, the vision system 100 obtain a teat position associated with an unknown teat 1110. For example, the vision system 100 may obtain the teat position for the unknown teat 1110 from position information generated from processing a 3D image 138 and/or a profile signal 134. For example, the teat position for the unknown teat 1110 may be obtained from a method such as teat detection method 800 in FIG. 8 or teat detection method 1000 in FIG. 10.

At step 1206, the vision system 100 determines a first position distance 1112 between the teat position of the unknown teat 1110 and the first teat 1102 of the plurality of teats. The vision system 100 may determine the distance between the unknown teat 1110 and the first teat 1102 by calculating a difference between the teat position of the unknown teat 1110 and the first teat 1102 with respect to the x-axis 304, the y-axis 306, and/or the z-axis 308 as the first position distance 1112.

At step 1208, the vision system 100 determines a second position distance 1114 between the teat position of the unknown teat 1110 and the second teat 1104 of the plurality of teats. The vision system 100 may determine the distance between the unknown teat 1110 and the second teat 1104 by calculating a difference between the teat position of the unknown teat 1110 and the second teat 1104 with respect to the x-axis 304, the y-axis 306, and/or the z-axis 308 as the second position distance 1114.

At step 1210, the vision system 100 determines a third position distance 1116 between the teat position of the unknown teat 1110 and the third teat 1106 of the plurality of teats. The vision system 100 may determine the distance between the unknown teat 1110 and the third teat 1106 by calculating a difference between the teat position of the unknown teat 1110 and the third teat 1106 with respect to the x-axis 304, the y-axis 306, and/or the z-axis 308 as the third position distance 1116.

At step 1212, the vision system 100 determines a fourth position distance 1118 between the teat position of the unknown teat 1110 and the fourth teat 1108 of the plurality of teats. The vision system 100 may determine the distance between the unknown teat 1110 and the fourth teat 1108 by calculating a difference between the teat position of the unknown teat 1110 and the fourth teat 1108 with respect to the x-axis 304, the y-axis 306, and/or the z-axis 308 as the fourth position distance 1118.

At step 1214, the vision system 100 compares the first position distance 1112, the second position distance 1114, the third position distance 1114, and the fourth position distance 1116 to each other in order to determine which of the first position distance 1112, the second position distance 1114, the third position distance 1114, and the fourth position distance 1116 has the smallest position distance. In other words, the vision system 100 compares the first position distance 1112, the second position distance 1114, the third position distance 1114, and the fourth position distance 1116 to determine which of the first teat 1102, the second teat 1104, the third teat 1106, and the fourth teat 1108 is closest to the location of the unknown teat 1110. As an example, in FIG. 11A the first position distance 1112 may be the smallest position distance and is closest to the unknown teat 1110.

At step 1216, the vision system 100 determines whether the first position distance 1112 has the smallest position distance which may indicate that the first teat 1102 is the closest to the unknown teat 1110. The vision system 100 may proceed to step 1218 when the vision system 100 determines that the first position distance 1112 has the smallest position distance. Otherwise, the vision system 100 may proceed to step 1220 when the first position distance 1112 does not have the smallest position distance.

At step 1218, the vision system 100 may associate a teat identifier 127 for the unknown teat 1110 with the first teat 1102 in response to determining that the first position distance 1112 has the smallest position distance and may proceed to step 1230. For example, the vision system 100 may modify a teat identifier 127 for the unknown teat 1110 to indicate that the unknown teat 1110 is the first teat 1102.

Returning to step 1216, the vision system 100 may proceed to step 1220 when the first position distance 1112 does not have the smallest position distance. At step 1220, the vision system 100 determines whether the second position distance 1114 has the smallest position distance which may indicate that the second teat 1104 is the closest to the unknown teat 1110. The vision system 100 may proceed to step 1222 when the vision system 100 determines that the second position distance 1114 has the smallest position distance. Otherwise, the vision system 100 may proceed to step 1224 when the second position distance 1114 does not have the smallest position distance.

At step 1222, the vision system 100 may associate a teat identifier 127 for the unknown teat 1110 with the second teat 1104 in response to determining that the second position distance 1114 has the smallest position distance and may proceed to step 1230. For example, the vision system 100 may modify a teat identifier 127 for the unknown teat 1110 to indicate that the unknown teat 1110 is the second teat 1104.

Returning to step 1220, the vision system 100 may proceed to step 1224 when the second position distance 1114 does not have the smallest position distance. At step 1224, the vision system 100 determines whether the third position distance 1116 has the smallest position distance which may indicate that the third teat 1106 is the closest to the unknown teat 1110. The vision system 100 may proceed to step 1226 when the vision system 100 determines that the third position distance 1116 has the smallest position distance. Otherwise, the vision system 100 may proceed to step 1228 when the third position distance 1116 does not have the smallest position distance.

At step 1226, the vision system 100 may associate a teat identifier 127 for the unknown teat 1110 with the fourth teat 1108 and may proceed to step 1230. For example, the vision system 100 may modify a teat identifier 127 for the unknown teat 1110 to indicate that the unknown teat 1110 is the fourth teat 1108.

Referring again to FIG. 11A as an example, the vision system 100 may determine that the first teat 1102 has the smallest position distance from the teat position of the unknown teat 1110 and the vision system 100 may modify a teat identifier 127 for the unknown teat 1110 to indicate that the unknown teat 1110 is the first teat 1102.

At step 1230, the vision system 100 stores the association between the teat identifier 127 and the teat position in a memory (e.g. memory 104 or livestock information database 114). The vision system 100 may store the modified teat identifier 127 for the unknown teat 110 and/or any other information (e.g. position information) associated with the unknown teat 1110. The position information for the unknown teat 1110 may be saved and/or used by the vision system 100 for performing operations on the dairy livestock 202 associated with the unknown teat 1110. In one embodiment, the vision system 100 may not store the association between the teat identifier 127 and the teat position in a memory and step 1220 may be omitted. In some embodiments, the vision system 100 may output the teat identifier 127 and/or the teat position that is associated with the unknown teat 1110.

FIG. 12B is a flowchart of another embodiment of a teat identification method 1250 using the vision system 100. As an example, a robotic arm 200 may be positioned adjacent to a dairy livestock 202 within an access region 418 identified by the vision system 100. The vision system 100 may employ method 1250 to determine which teat candidate 442 from among a plurality of teat candidates 442 corresponds with a target teat 203.

At step 1252, the vision system 100 determines the position of a first teat candidate 442 relative to a second teat candidate 442. The position of the first teat candidate 442 relative to the second teat candidate 442 may be determined based on teat candidate position information associated with the first teat candidate 442 and the second teat candidate 442. The teat candidate position information may be generated from processing a 3D image 138 and/or a profile signal 134 and may be stored in memory 104. For instance, the teat candidate position information may be obtained from a process such as teat detection method 800 in FIG. 8 or teat detection method 1000 in FIG. 10. The vision system 100 may determine whether the first teat candidate 442 is at a location to the left or to the right of the second teat candidate 442 based on the teat candidate position information. In some embodiments, the vision system 100 may also determine whether the first teat candidate 442 is in front of (i.e. closer to the head of the dairy livestock 202) or behind (i.e. closer to the rear of the dairy livestock 202) the second teat candidate 442.

At step 1254, the vision system 100 proceeds to step 1256 in response to determining that the first teat candidate 442 is to the left of the second teat candidate 442. Otherwise, the vision system 100 proceeds to step 1258 in response to determining that the first teat candidate 442 is not to the left of the second teat candidate 442. In other words, the vision system 100 proceeds to step 1258 in response to determining that the first teat candidate 442 is to the right of the second teat candidate 442.

At step 1256, the vision system 100 assigns the first teat candidate 442 as a left teat candidate 442 and assigns the second teat candidate 442 as a right teat candidate 442 and proceeds to step 1260. The vision system 100 assigns the first teat candidate 442 as the left teat candidate 442 in order to indicate that the first teat candidate 442 is the left most teat candidate 442 out of the first teat candidate 442 and the second teat candidate 442. Similarly, the vision system 100 assigns the second teat candidate 442 as the right teat candidate 442 to indicate that the second teat candidate 442 is the right most teat candidate 442 out of the first teat candidate 442 and the second teat candidate 442.

At step 1258, the vision system 100 assigns the first teat candidate 442 as a right teat candidate 442 and assigns the second teat candidate 442 as a left teat candidate 442 and proceeds to step 1260. The vision system 100 assigns the first teat candidate 442 as the right teat candidate 442 to indicate that the first teat candidate 442 is the right most teat candidate 442 out of the first teat candidate 442 and the second teat candidate 442. The vision system 100 assigns the second teat candidate 442 as the left teat candidate 442 to indicate that the second teat candidate 442 is the left most teat candidate 442 out of the first teat candidate 442 and the second teat candidate 442.

At step 1260, the vision system 100 receives a teat identifier 127 for a target teat 203 that indicates whether the target teat 203 is a left teat 203 (i.e. a front left teat 203 or a rear left teat 203) or a right teat 203 (i.e. a front right teat 203 or a rear right teat 203) of the dairy livestock 202. In one embodiment, the vision system 100 may receive the teat identifier 127 from an operator that identifies the target teat 203. In another embodiment, the vision system 100 may determine which teat 203 of the dairy livestock 202 is closest to the first teat candidate 442 and the second teat candidate 442 and the teat identifier 127 for the determined teat 203 may be used for the target teat 203. The teat identifier 127 may indicate whether the target teat 203 is a front right teat 203, a front left teat 203, a rear right teat 203, or a rear left teat 203 of the dairy livestock 202.

At step 1262, the vision system 100 proceeds to step 1264 in response to the teat identifier 127 indicating that the target teat 203 is a left teat 203 of the dairy livestock 202. Otherwise, the vision system 100 proceeds to step 1266 in response to the teat identifier 127 indicating that the target teat 203 is a right teat 203 of the dairy livestock 202.

At step 1264, the vision system 100 determines whether the left teat candidate 442 is within the teat location range 1130 of the target teat 203. For example, the teat location range 1130 may indicate a maximum distance a teat candidate 442 can be away from the target teat 203 to be considered the target teat 203. The vision system 100 may determine the distance between the left teat candidate 442 and the target teat 203 and may compare the determined distance to the maximum distance indicated by the teat location range 1130. The vision system 100 may determine that the left teat candidate 442 is too far away from the target teat 203 to be considered the target teat 203 when the distance between the left teat candidate 442 and the target teat 203 is greater than or outside of the teat location range 1130 for the target teat 203. When the left teat candidate 442 is outside of the teat location range 1130 may indicate that that the left teat candidate 442 is a false positive and does not correspond with an actual teat 203 of the dairy livestock 202. In some embodiments, the vision system 100 may discard the left teat candidate 442 in response to determining that the left teat candidate 442 is outside of the teat location range 1130. The vision system 100 may determine that the left teat candidate 442 is a valid match for the target teat 203 when the distance between the left teat candidate 442 and the target teat 203 is equal to, less than, or within the teat location range 1130 of the target teat 203. When the left teat candidate 442 is within the teat location range 1130 may indicate that left teat candidate 442 is likely the target 203.

At step 1268, the vision system 100 proceeds to step 1270 in response to determining that the left teat candidate 442 is within the teat location range 1130 of the target teat 203. Otherwise, the vision system 100 proceeds to step 1272 in response to determining that the left teat candidate 442 is not within the teat location range 1130 of the target teat 203.

At step 1270, the vision system 100 links the teat identifier 127 for the target teat 203 with the left teat candidate 442 to identify the left teat candidate 442 as the target teat 203. In one embodiment, the vision system 100 may store the relationship between the left teat candidate 442 and the teat identifier 127 for the target teat 203 in a memory (e.g. memory 104 or livestock information database 114). The vision system 100 may store also store any other information associated with the left teat candidate 442, for example, teat candidate position information for the left teat candidate 442.

At step 1272, the vision system 100 links the teat identifier 127 for the target teat 203 with the right teat candidate 442 to identify the right teat candidate 442 as the target teat 203. In one embodiment, the vision system 100 may store the relationship between the right teat candidate 442 and the teat identifier 127 for the target teat 203 and/or any other information associated with the right teat candidate 442 in a memory (e.g. memory 104 or livestock information database 114).

Returning to step 1262, the vision system 100 proceeds to step 1266 in response to determining that the target teat 203 is a right teat 203 of the dairy livestock 202. At step 1266, the vision system 100 determines whether the right teat candidate 442 is within the teat location range 1130 of the target teat 203. The vision system 100 may determine whether the right teat candidate 442 is within the teat location range 1130 of the target teat 203 similarly to as described in step 1264.

At step 1274, the vision system 100 proceeds to step 1276 in response to determining that the right teat candidate 442 is within the teat location range 1130 of the target teat 203. Otherwise, the vision system 100 proceeds to step 1278 in response to determining that the right teat candidate 442 is not within the teat location range 1130 of the target teat 203.

At step 1276, the vision system 100 links the teat identifier 127 for the target teat 203 with the right teat candidate 442 to identify the right teat candidate 442 as the target teat 203. In one embodiment, the vision system 100 may store the relationship between the right teat candidate 442 and the teat identifier 127 for the target teat 203 and/or any other information associated with the right teat candidate 442 in a memory (e.g. memory 104 or livestock information database 114).

At step 1278, the vision system 100 links the teat identifier 127 for the target teat 203 with the left teat candidate 442 to identify the left teat candidate 442 as the target teat 203. In one embodiment, the vision system 100 may store the relationship between the left teat candidate 442 and the teat identifier 127 for the target teat 203 and/or any other information associated with the left teat candidate 442 in a memory (e.g. memory 104 or livestock information database 114).

In another embodiment, teat identification method 1250 may be performed in a similar manner to determine whether a first teat candidate 442 or a second teat candidate 442 can be linked to a teat identifier 127 of a target teat 203 that is a front teat 203 (e.g. a front left teat 203 or a front right teat 203) or a rear teat 203 (e.g. a rear right teat 203 or a rear left teat 203). In another embodiment, teat identification method 1250 may be performed in a similar manner to determine whether a first teat candidate 442 or a second teat candidate 442 can be linked to a teat identifier 127 of a particular target teat 203 (e.g. a front left teat 203, a front right teat 203, a rear right teat 203 or a rear left teat 203.

FIG. 13A is an embodiment of a comparison between a teat model 128 and a feature 1302 of a dairy livestock 202 in an image depth plane 302 without a match. The teat model 128 may generally define a geometric shape that corresponds with the teat 203 of a dairy livestock 202 within an image depth plane 302 of a 3D image 138. The vision system 100 may compare the teat model 128 to features of the dairy livestock 202 to determine whether any of the features correspond with a teat 203 or teat candidate 442 of the dairy livestock 202. In FIG. 13A, feature 1302 may represent a feature of the dairy livestock 202 that is beginning to appear within an image depth plane 302 as the vision system 100 progressively advances through a plurality of image depth planes 302. The vision system 100 may compare the teat model 128 to the feature 1302, but because the size and shape of the feature 1302 do not match the teat model 128 the vision system 100 may be unable to determine whether or not the feature 1302 is a teat 203 of the dairy livestock 202. The vision system 100 may compare the teat model 128 to the feature 1302 in subsequent image depth planes 302 to determine whether the feature 1302 corresponds with a teat 203 of the dairy livestock 202.

FIG. 13B is another embodiment of a comparison between a teat model 128 and a feature 1302 of a dairy livestock 202 in an image depth plane 302 with a match. Similar to FIG. 13A, the teat model 128 may generally define a geometric shape that corresponds with the teat 203 of a dairy livestock 202 within an image depth plane 302 of a 3D image 138. The vision system 100 may compare the teat model 128 to features of the dairy livestock 202 to determine whether any of the features correspond with a teat 203 or teat candidate 442 of the dairy livestock 202. In FIG. 13B, feature 1302 represents a feature of the dairy livestock 202 that is more pronounced within an image depth plane 302 as the vision system 100 progressively advances through a plurality of image depth planes 302. The vision system 100 may compare the teat model 128 to the feature 1302 and may determine that the feature 1302 matches or corresponds with the teat model 128 due to its similar size and shape as the teat model 128. The vision system 100 may determine that the feature 1302 corresponds with a teat candidate 442 or a teat 203 of the dairy livestock 202.

FIG. 14A is an embodiment of a comparison between a tail model 129 and a tail candidate 712 in an image depth plane 302 without a match. The tail model 129 may generally define a geometric shape that corresponds with the tail 201 of a dairy livestock 202 within an image depth plane 302 of a 3D image 138. The vision system 100 may compare the tail model 129 to features (e.g. tail candidates 712) of the dairy livestock 202 to determine whether any of the features correspond with a tail 201 of the dairy livestock 202. In FIG. 14A, tail candidate 712 may represent a feature of the dairy livestock 202 that is beginning to appear within an image depth plane 302 as the vision system 100 progressively advances through a plurality of image depth planes 302. The vision system 100 may compare the tail model 129 to the tail candidate 712, but because the size and shape of the tail candidate 712 do not match the tail model 129 the vision system 100 may be unable to determine whether or not the tail candidate 712 is the tail 201 of the dairy livestock 202. The vision system 100 may compare the tail model 129 to the tail candidate 712 in subsequent image depth planes 302 to determine whether the tail candidate 712 corresponds with the tail 201 of the dairy livestock 202.

FIG. 14B is another embodiment of a comparisons between a tail model 129 and a tail candidate 712 in an image depth plane 302 with a match. Similar to FIG. 14A, the tail model 129 may generally define a geometric shape that corresponds with the tail 201 of a dairy livestock 202 within an image depth plane 302 of a 3D image 138. The vision system 100 may compare the tail model 129 to features (e.g. tail candidates 712) of the dairy livestock 202 to determine whether any of the features correspond with a tail 201 of the dairy livestock 202. In FIG. 14B, tail candidate 712 represents a feature of the dairy livestock 202 that is more pronounced within an image depth plane 302 as the vision system 100 progressively advances through a plurality of image depth planes 302. The vision system 100 may compare the tail model 129 to the tail candidate 712 and may determine that the tail candidate 712 matches or corresponds with the tail model 129 due to its similar size and shape as the tail model 129. The vision system 100 may determine that the tail candidate 712 corresponds with the tail 201 of the dairy livestock 202.

FIG. 15 is an embodiment of a comparison between a teat model 128 and edge pairs 920A, 920B, 920C, and 920D in a profile signal 134. The teat model 128 may generally define a shape or pattern that corresponds with teats 203 and/or teat candidates 442 of a dairy livestock 202. The vision system 100 may compare the teat model 128 to edge pairs 920 along the profile signal 134 to identify teats 203 or teat candidates 442. For example, the vision system 100 may first compare the teat model 128 to an edge pair 920A. The vision system 100 may determine that the teat model 128 and the edge pair 920A differ too much, for example, beyond a set of tolerances, and that the edge pair 920A does not correspond with a teat 203 of the dairy livestock 202. Similarly, the vision system 100 may compare the teat model 128 to an edge pair 920B and may determine that the teat model 128 and the edge pair 920B differ too much and that the edge pair 920B does not correspond with a teat 203 of the dairy livestock 202. The vision system 100 may compare the teat model 128 to an edge pair 920C and may determine that the teat model 128 and the edge pair 920C are similar, for example, within a set of tolerance, and that the edge pair 920C corresponds with a teat 203 of the dairy livestock 202. Similarly, vision system 100 may compare the teat model 128 to an edge pair 920D and may determine that the teat model 128 and the edge pair 920D are similar and that the edge pair 920D corresponds with a teat 203 of the dairy livestock 202.

FIG. 16 is a position map 1600 of an embodiment of teat candidate clusters 1602 for teats 203 of dairy livestock 202. The vision system 100 may use teat candidate clusters 1602 to identify and/or to determine the location of teats 203 of a dairy livestock 202. For example, the vision system 100 may use teat candidate clusters 1602 during a teat identification process such as teat identification method 1100. The teat candidate clusters 1602 are oriented in the position map 1600 with respect to the x-axis 304, the y-axis 306, and the z-axis 308.

Each teat candidate cluster 1602 comprises a plurality of data points 1604 that represent possible teat 203 locations. Teat candidate clusters 1602 may be generated by the output of one or more teat detection processes (e.g. teat detection method 800 or teat detection method 1000) over one or more iterations. Data points 1604 of the teat candidate clusters 1602 may form clusters around general locations 1606 of teats 203. The vision system 100 may be configured to perform one or more operations on the data points 1604 of the teat candidate clusters 1602 to determine the general locations 1606 of the teats 203. Examples of operations include, but are not limited to, averaging data points 1604 within a teat candidate cluster 1602, finding a median data point 1604 within a teat candidate cluster, and filtering out outlier data points 1604. Any other suitable operation may be performed on the data points 1604 of the teat candidate clusters 1602 to determine the general locations 1606 of the teats 203 as would be appreciated by one of ordinary skill in the art upon viewing this disclosure.

FIG. 17 illustrates a flowchart of an embodiment of a teat attachment method 1700 using vision system 100. In general, method 1700 may be utilized by vision system 100 to attach teat cup 210 to a desired teat 203 of dairy livestock 202. For example, method 1700 may be utilized when robotic arm 200 is closer to dairy livestock 202. As a specific example, method 1700 may be utilized when robotic arm 200 is at approximately a second distance 214 away from the dairy livestock 202, as described above. Method 1700 may begin in step 1710.

At step 1710, a robotic arm is commanded to move to a first location corresponding to an expected teat position of a desired teat. For example, processor 102 may command robotic arm 200 to move to a first location corresponding to an expected teat position associated with the desired teat 203 of a dairy livestock 202 as determined from historical teat location information. In some embodiments, the historical teat location information may be any of the information previously described in reference to livestock information database 114 (e.g., teat location information 130, position maps 131, etc.) In some embodiments, the expected teat position associated with the desired teat 203 may be obtained from historical information for the location of teats 203 on a particular dairy livestock 202. In some embodiments, the expected teat position may be obtained from any other appropriate method as described herein.

At step 1715, at least two scans of dairy livestock 202 are preformed. For example, processor 102 may command laser 132 on robotic arm 200 to perform first and second scans of teats 203 of dairy livestock 202 after robotic arm 200 moves to the first location of step 1710 that corresponds to the expected teat position. In some embodiments, two scans by laser 132 in this step generates first and second profile signals 134. Specifically, a first scan by laser 132 may produce a first profile signal 134 and a second scan by laser 132 may produce a second profile signal 134. After the first and second profile signals 134 are generated, processor 102 may access them from their stored locations. For example, processor 102 may access the first and second profile signals 134 stored in laser 132 or memory 104.

At step 1720, method 1700 determines whether the desired teat 203 is found in both the first and second profile signals 134 generated in step 1715. For example, processor 102 may analyze both first and second profile signals 134 generated in step 1715 using any appropriate method described herein to determine whether the desired teat 203 is located in both the first and second profile signals 134. As a specific example, step 1720 may include any of the methods described above with respect to FIGS. 9-13B and 15-16 in order to determine whether the desired teat 203 is found in both the first and second profile signals 134 generated in step 1715. If the desired teat 203 is found in both the first and second profile signals 134 generated in step 1715, method 1700 proceeds to step 1730. Otherwise, if the desired teat 203 is not found in both the first and second profile signals 134 generated in step 1715 (e.g., is found in none or is found in only one of the profile signals 134 generated in step 1715), method 1700 proceeds to step 1725.

At step 1725, method 1700 commands the robotic arm to move up a predetermined amount. For example, processor 102 issues one or more instructions to robotic arm 200 to move up a predetermined amount relative to the ground on which dairy livestock 202 is standing. In some embodiments, the predetermined amount is less than or equal to 5 mm. In some embodiments, the predetermined amount is substantially equal to 5 mm (e.g., is within 0-5% or 5-10% of 5 mm).

At step 1730, method 1700 determines whether scan locations of the desired teat 203 in the first and second profile signals 134 of step 1715 are within a predetermined distance of each other. For example, processor 102 determines (e.g., using any of the methods described above with respect to FIGS. 9-13B and 15-16) a first location of the desired teat 203 in the first profile signal 134 and a second location of the desired teat 203 in the second profile signal 134. Processor 102 may then compare the two locations in order to determine whether they are within the predetermined distance of each other. In some embodiments, the predetermined distance is less than or equal to 5 mm. In some embodiments, the predetermined distance is substantially equal to 5 mm (e.g., is within 0-5% or 5-10% of 5 mm).

At step 1735, the robotic arm is commanded to move to a second location corresponding to the scan locations of the desired teat 203 in the first and second profile signals 134. For example, processor 102 may command robotic arm 200 to move to a second location corresponding to either the location of the desired teat 203 in the first profile signal 134 or the location of the desired teat 203 in the second profile signal 134. In some embodiments, processor 102 may randomly select either the location of the desired teat 203 in the first profile signal 134 or the location of the desired teat 203 in the second profile signal 134 as the second location for robotic arm 200. In other embodiments, any other appropriate method or calculation may be employed in this step to select the second location for robotic arm 200. For example, processor 102 may average the locations of the desired teat 203 in the first and second profile signals 134 or select a midpoint between the locations of the desired teat 203 in the first and second profile signals 134 as the second location for robotic arm 200.

At step 1740, at least two more scans of dairy livestock 202 are preformed. For example, processor 102 may command laser 132 on robotic arm 200 to perform third and fourth scans of teats 203 of dairy livestock 202 after robotic arm 200 moves to the second location of step 1735. In some embodiments, two scans by laser 132 in this step generates third and fourth profile signals 134. Specifically, a third scan by laser 132 may produce a third profile signal 134 and a fourth scan by laser 132 may produce a fourth profile signal 134. After the third and fourth profile signals 134 are generated, processor 102 may access them from their stored locations. For example, processor 102 may access the third and fourth profile signals 134 stored in laser 132 or memory 104.

At step 1745, method 1700 determines whether the desired teat 203 is found in both the third and fourth profile signals 134 generated in step 1740. For example, processor 102 may analyze both third and fourth profile signals 134 generated in step 1740 using any appropriate method described herein to determine whether the desired teat 203 is located in both the third and fourth profile signals 134. As a specific example, step 1745 may include any of the methods described above with respect to FIGS. 9-13B and 15-16 in order to determine whether the desired teat 203 is found in both the third and fourth profile signals 134 generated in step 1740. If the desired teat 203 is found in both the third and fourth profile signals 134 generated in step 1740, method 1700 proceeds to step 1750. Otherwise, if the desired teat 203 is not found in both the third and fourth profile signals 134 generated in step 1740 (e.g., is found in none or is found in only one of the profile signals 134 generated in step 1740), method 1700 proceeds back to step 1725.

At step 1750, method 1700 determines whether scan locations of the desired teat 203 in the third and fourth profile signals 134 of step 1740 are within a predetermined distance of each other. For example, processor 102 determines (e.g., using any of the methods described above with respect to FIGS. 9-13B and 15-16) a third location of the desired teat 203 in the third profile signal 134 and a fourth location of the desired teat 203 in the fourth profile signal 134. Processor 102 may then compare the two locations in order to determine whether they are within the predetermined distance of each other. In some embodiments, the predetermined distance is less than or equal to 5 mm. In some embodiments, the predetermined distance is substantially equal to 5 mm (e.g., is within 0-5% or 5-10% of 5 mm).

At step 1755, method 1700 attempts to attach teat cup 210 to the desired teat 203 of dairy livestock 202. For example, processor 102 may issue one or more commands to robotic arm 200 to attach teat cup 210 to the desired teat 203. Robotic arm 200 may move and adjust teat cup 210 as appropriate (e.g., raise, lower, move in any appropriate direction, etc.) in order to attach teat cup 210 to the desired teat 203. After step 1755, method 1700 may end.

Particular embodiments may repeat one or more steps of method 1700, where appropriate. Although this disclosure describes and illustrates particular steps of method 1700 as occurring in a particular order, this disclosure contemplates any suitable steps of method 1700 occurring in any suitable order (e.g., any temporal order). Moreover, although this disclosure describes and illustrates an example teat attachment method including the particular steps of method 1700, this disclosure contemplates any suitable teat attachment method including any suitable steps, which may include all, some, or none of the steps of method 1700, where appropriate. Furthermore, although this disclosure describes and illustrates particular components, devices, or systems carrying out particular steps of method 1700, this disclosure contemplates any suitable combination of any suitable components, devices, or systems carrying out any suitable steps of method 1700.

FIG. 18 illustrates a flowchart of an embodiment of another teat attachment method 1800 using vision system 100. In general, similar to method 1700, method 1800 may be utilized by vision system 100 to attach teat cup 210 to a desired teat 203 of dairy livestock 202. For example, method 1800 may be utilized when robotic arm 200 is closer to dairy livestock 202. As a specific example, method 1800 may be utilized when robotic arm 200 is at approximately a second distance 214 away from the dairy livestock 202, as described above. Method 1800 may begin in step 1810.

At step 1810, a robotic arm is commanded to move to a first location corresponding to an expected teat position of a desired teat 203. For example, processor 102 may command robotic arm 200 to move to a first location corresponding to an expected teat position associated with the desired teat 203 of a dairy livestock 202 as determined from historical teat location information. In some embodiments, the historical teat location information may be any of the information previously described in reference to livestock information database 114 (e.g., teat location information 130, position maps 131, etc.) In some embodiments, the expected teat position associated with the desired teat 203 may be obtained from historical information for the location of teats 203 on a particular dairy livestock 202. In some embodiments, the expected teat position may be obtained from any other appropriate method as described herein.

At step 1820, method 1800 commands the robotic arm to move up a predetermined amount. For example, processor 102 issues one or more instructions to robotic arm 200 to move up a predetermined amount relative to the ground on which dairy livestock 202 is standing. In some embodiments, step 1820 occurs after step 1810 in which the robotic arm moves to the first location corresponding to the expected teat position. In some embodiments, the predetermined amount is less than or equal to 5 mm. In some embodiments, the predetermined amount is substantially equal to 5 mm (e.g., is within 0-5% or 5-10% of 5 mm).

At step 1830, at least one scan of dairy livestock 202 is preformed. For example, processor 102 may command laser 132 on robotic arm 200 to perform a first scan of teats 203 of dairy livestock 202 after robotic arm 200 moves up the predetermined amount in step 1820. In some embodiments, the first scan by laser 132 in this step generates a first profile signal 134. After the first profile signal 134 is generated, processor 102 may access it from its stored location. For example, processor 102 may access the first profile signal 134 stored in laser 132 or memory 104. Method 1800 may then determine whether the desired teat 203 is found in the first profile signal 134. For example, processor 102 may analyze the first profile signal 134 generated by laser 132 using any appropriate method described herein in order to determine whether the desired teat 203 is located in the first profile signal 134. As a specific example, step 1830 may include any of the methods described above with respect to FIGS. 9-13B and 15-16 in order to determine whether the desired teat 203 is located in the first profile signal 134. If the desired teat 203 is found in the first profile signal 134, method 1800 proceeds to step 1840. Otherwise, if the desired teat 203 is not found in the first profile signal 134, method 1800 proceeds back to step 1820.

At step 1840, the robotic arm is commanded to move to a second location corresponding to the scan location of the desired teat 203 in the first profile signal 134 from step 1830. For example, processor 102 issue one or more commands to robotic arm 200 to move to a second location so that teat cup 210 is at or close to (e.g., within 10% of) the location of the desired teat 203 as determined from the first profile signal 134. Robotic arm 200 may move and adjust teat cup 210 as appropriate (e.g., raise, lower, move in any appropriate direction, etc.) in order to move it to the second location.

At step 1850, at least one more scan of dairy livestock 202 is preformed. For example, processor 102 may command laser 132 on robotic arm 200 to perform a second scan of teats 203 of dairy livestock 202 after robotic arm 200 moves to the second location in step 1840. In some embodiments, the second scan by laser 132 in this step generates a second profile signal 134. After the second profile signal 134 is generated, processor 102 may access it from its stored location. For example, processor 102 may access the second profile signal 134 stored in laser 132 or memory 104. Method 1800 may then determine whether the desired teat 203 is found in the second profile signal 134. For example, processor 102 may analyze the second profile signal 134 generated by laser 132 using any appropriate method described herein in order to determine whether the desired teat 203 is located in the second profile signal 134. As a specific example, step 1850 may include any of the methods described above with respect to FIGS. 9-13B and 15-16 in order to determine whether the desired teat 203 is located in the second profile signal 134. If the desired teat 203 is found in the second profile signal 134, method 1800 proceeds to step 1860. Otherwise, if the desired teat 203 is not found in the second profile signal 134, method 1800 proceeds back to step 1810.

At step 1860, method 1800 determines whether the scan location of the desired teat 203 in the second profile signal 134 of step 1850 is within a predetermined distance of the current location of robotic arm 200. For example, processor 102 determines (e.g., using any of the methods described above with respect to FIGS. 9-13B and 15-16) a location of the desired teat 203 in the second profile signal 134. Processor 102 may then compare the location of the desired teat 203 in the second profile signal 134 with a current location of teat cup 210 attached to robotic arm 200 (or any other portion of robotic arm 200 such as laser 132) in order to determine whether they are within the predetermined distance of each other. In some embodiments, the predetermined distance is less than or equal to 2 mm. In some embodiments, the predetermined distance is substantially equal to 2 mm (e.g., is within 0-5% or 5-10% of 5 mm). If it is determined in this step that the scan location of the desired teat 203 in the second profile signal 134 of step 1850 is within the predetermined distance of the current location of robotic arm 200, method 1800 proceeds to step 1870. Otherwise, if it is determined in this step that the scan location of the desired teat 203 in the second profile signal 134 of step 1850 is not within the predetermined distance of the current location of robotic arm 200, method 1800 proceeds back to step 1840.

At step 1870, method 1800 attempts to attach teat cup 210 to the desired teat 203 of dairy livestock 202. For example, processor 102 may issue one or more commands to robotic arm 200 to attach teat cup 210 to the desired teat 203. Robotic arm 200 may move and adjust teat cup 210 as appropriate (e.g., raise, lower, move in any appropriate direction, etc.) in order to attach teat cup 210 to the desired teat 203. After step 1870, method 1800 may end.

Particular embodiments may repeat one or more steps of method 1800, where appropriate. Although this disclosure describes and illustrates particular steps of method 1800 as occurring in a particular order, this disclosure contemplates any suitable steps of method 1800 occurring in any suitable order (e.g., any temporal order). Moreover, although this disclosure describes and illustrates an example teat attachment method including the particular steps of method 1800, this disclosure contemplates any suitable teat attachment method including any suitable steps, which may include all, some, or none of the steps of method 1800, where appropriate. Furthermore, although this disclosure describes and illustrates particular components, devices, or systems carrying out particular steps of method 1800, this disclosure contemplates any suitable combination of any suitable components, devices, or systems carrying out any suitable steps of method 1800.

FIG. 19 illustrates a flowchart of an embodiment of a teat attachment method 1900 that may be used by vision system 100. In general, method 1900 may be utilized by vision system 100 to attach teat cup 210 to a desired teat 203 of dairy livestock 202 when teats 203 are close together (e.g., left and right teats 203 are within a certain distance of each other). Method 1900 may be utilized when robotic arm 200 is closer to dairy livestock 202. As a specific example, method 1900 may be utilized when robotic arm 200 is at approximately a second distance 214 away from the dairy livestock 202, as described above. Method 1900 may begin in step 1910.

At step 1910, method 1900 determines a first expected teat position associated with a first teat 203 and a second expected teat position associated with a second teat 203. In some embodiments, the first teat 203 is a desired teat in which to attach teat cup 210, and the second teat 203 is any teat 203 adjacent to desired teat 203. As specific examples, if the desired teat 203 is a right front teat 203, the second teat 203 may be either a left front teat 203 or a right rear teat 203. In some embodiments, the first and second expected teat positions are determined from historical teat location information. In some embodiments, the historical teat location information may be any of the information previously described in reference to livestock information database 114 (e.g., teat location information 130, position maps 131, etc.) In some embodiments, the first and second expected teat positions may be obtained from historical information for the location of teats 203 on a particular dairy livestock 202. In some embodiments, the first and second expected teat positions may be obtained from any other appropriate method as described herein.

At step 1920, method 1900 determines a distance between the first expected teat position and the second expected teat position of step 1910. For example, processor 102 determines (e.g., using any of the methods described above with respect to FIGS. 9-13B and 15-16) a first location of the desired teat 203 and a second location of the second teat 203. Processor 102 may then compare the two locations in order to determine a distance between the two locations. Examples of the determined distances may be distances 1112, 1114, 1116, and 1118 of FIG. 11A and distances 1126 and 1128 of FIG. 11B.

At step 1930, method 1900 determines whether the distance determined in step 1920 is less than or equal to a predetermined distance. In some embodiments, the predetermined distance is 5 cm. In some embodiments, the predetermined distance is substantially equal to 5 cm (e.g., is within 0-5% or 5-10% of 5 cm). If the distance determined in step 1920 is less than or equal to the predetermined distance, method 1900 proceeds to step 1940. If the distance determined in step 1920 is not less than or equal to the predetermined distance, method 1900 ends or executes a different algorithm in step 1935 for attaching teat cup 210 to dairy livestock 202 (e.g., method 1700 or 1800).

At step 1940, robotic arm 200 is commanded to move to a first location that is between the first expected teat position and the second expected teat position of step 1910. For example, processor 102 may command robotic arm 200 to move to a first location that is exactly between (i.e., equidistant between) the first expected teat position and the second expected teat position of step 1910. In some embodiments, the first location is substantially equidistant between the first expected teat position and the second expected teat position of step 1910 (e.g., is within 0-5% or 5-10% of the midpoint).

At step 1950, method 1900 commands the robotic arm to move up a predetermined amount. For example, processor 102 issues one or more instructions to robotic arm 200 to move up a predetermined amount relative to the ground on which dairy livestock 202 is standing. In some embodiments, the predetermined amount is less than or equal to 5 mm. In some embodiments, the predetermined amount is substantially equal to 5 mm (e.g., is within 0-5% or 5-10% of 5 mm).

At step 1960, at least one scan of dairy livestock 202 is preformed. For example, processor 102 may command laser 132 on robotic arm 200 to perform a scan of teats 203 of dairy livestock 202 after robotic arm 200 moves up the predetermined amount in step 1950. In some embodiments, the scan by laser 132 in this step generates a profile signal 134. After the profile signal 134 is generated, processor 102 may access it from its stored location. For example, processor 102 may access the profile signal 134 stored in laser 132 or memory 104. Method 1900 may then determine whether the both the desired teat 203 and the second teat 203 (e.g., left and right teats 203) are found in the profile signal 134. For example, processor 102 may analyze the profile signal 134 generated by laser 132 using any appropriate method described herein in order to determine whether both teat 203s are located in the profile signal 134. As a specific example, step 1960 may include any of the methods described above with respect to FIGS. 9-13B and 15-16 in order to determine whether both teats 203 are located in the profile signal 134. If both teats 203 are found in the profile signal 134, method 1900 proceeds to step 1970. Otherwise, if both teats 203 are not found in the profile signal 134, method 1900 proceeds back to step 1950.

At step 1970, method 1900 attempts to attach teat cup 210 to one of the teats 203 found in step 1960. For example, processor 102 may issue one or more commands to robotic arm 200 to attach teat cup 210 to the desired teat 203 or the second teat 203. Robotic arm 200 may move and adjust teat cup 210 as appropriate (e.g., raise, lower, move in any appropriate direction, etc.) in order to attach teat cup 210 to either teats found in step 1960. After step 1970, method 1900 may end.

Particular embodiments may repeat one or more steps of method 1900, where appropriate. Although this disclosure describes and illustrates particular steps of method 1900 as occurring in a particular order, this disclosure contemplates any suitable steps of method 1900 occurring in any suitable order (e.g., any temporal order). Moreover, although this disclosure describes and illustrates an example teat attachment method including the particular steps of method 1900, this disclosure contemplates any suitable teat attachment method including any suitable steps, which may include all, some, or none of the steps of method 1900, where appropriate. Furthermore, although this disclosure describes and illustrates particular components, devices, or systems carrying out particular steps of method 1900, this disclosure contemplates any suitable combination of any suitable components, devices, or systems carrying out any suitable steps of method 1900.

FIG. 20 illustrates a flowchart of an embodiment of a teat attachment method 2000 that may be used by vision system 100. In general, method 2000 may be utilized by vision system 100 to attach teat cup 210 to a desired teat 203 of dairy livestock 202 when teats 203 are offset (e.g., vision system 100 can see a particular teat 203 from one position but not from up close when vision system 100 is moved under teat 203). Typically, method 2000 is utilized when robotic arm 200 is closer to dairy livestock 202. As a specific example, method 2000 may be utilized when robotic arm 200 is at approximately a second distance 214 away from the dairy livestock 202, as described above. Method 2000 may begin in step 2010.

In step 2010, method 2000 accesses a first profile signal 134 generated by laser 132 from a first scan of dairy livestock 202. In some embodiments, the first profile signal 134 is generated by laser 132 in response to one or more commands from processor 102. For example, processor 102 may command laser 132 on robotic arm 200 to perform a first scan of teats 203 of dairy livestock 202. In some embodiments, the first scan by laser 132 in this step generates the first profile signal 134. After the first profile signal 134 is generated, processor 102 may access it from its stored location. For example, processor 102 may access the first profile signal 134 stored in laser 132 or memory 104. Method 2000 may then determine whether the desired teat 203 is found in the first profile signal 134. For example, processor 102 may analyze the first profile signal 134 generated by laser 132 using any appropriate method described herein in order to determine whether the desired teat 203 is located in the first profile signal 134. As a specific example, step 2010 may include any of the methods described above with respect to FIGS. 9-13B and 15-16 in order to determine whether the desired teat 203 is located in the first profile signal 134. In some embodiments, the desired teat 203 is determined to be located at a first scan location within the first profile signal 134. If the desired teat 203 is found in the first profile signal 134, method 2000 proceeds to step 2030. Otherwise, if the desired teat 203 is not found in the first profile signal 134, method 2000 proceeds to step 2020.

At step 2020, method 2000 commands the robotic arm to move up a predetermined amount. For example, processor 102 issues one or more instructions to robotic arm 200 to move up a predetermined amount relative to the ground on which dairy livestock 202 is standing. In some embodiments, the predetermined amount is less than or equal to 5 mm. In some embodiments, the predetermined amount is substantially equal to 5 mm (e.g., is within 0-5% or 5-10% of 5 mm).

At step 2030, the robotic arm is commanded to move to a first location corresponding to the first scan location of the desired teat 203 in the first profile signal 134 from step 2010. For example, processor 102 may issue one or more commands to robotic arm 200 to move to a first location so that teat cup 210 is at or close to (e.g., within 10% of) the location of the desired teat 203 as determined from the first profile signal 134. Robotic arm 200 may move and adjust teat cup 210 as appropriate (e.g., raise, lower, move in any appropriate direction, etc.) in order to move it to the first location.

At step 2040, a counter corresponding to the desired teat 203 is accessed and incremented. In some embodiments, each specific teat 203 of each specific dairy livestock 202 has an assigned counter. For example, a front right teat 203 of a specific dairy livestock 202 may be assigned a first counter, while a front left teat 203 of the same dairy livestock 202 may be assigned a second counter. The counters and their current values may be stored in any appropriate memory of vision system 100 such as memory 104 and may be initialized to zero. Processor 102 may determine in step 2040 an appropriate counter for the desired teat 203 in any appropriate manner (e.g., using teat identifiers 127). Once determined, processor 102 increments the value of the counter by one and stores the updated value back in the appropriate memory device (e.g., memory 104).

At step 2050, method 2000 determines whether the counter accessed in step 2040 equals a predetermined number. For example, processor 102 determines in this step whether the counter equals a predetermined number such as three. The predetermined number may be any appropriate number (e.g., 1, 2, 3, 4, 5, etc.) and may be customizable by the user. If it is determined in this step that the counter accessed in step 2040 equals the predetermined number, method 2000 proceeds to step 2080. Otherwise, if it is determined in this step that the counter accessed in step 2040 does not equal the predetermined number, method 2000 proceeds to step 2060.

In step 2060, method 2000 accesses a second profile signal 134 generated by laser 132 from a second scan of dairy livestock 202. In some embodiments, the second profile signal 134 is generated by laser 132 in response to one or more commands from processor 102. For example, processor 102 may command laser 132 on robotic arm 200 to perform a second scan of teats 203 of dairy livestock 202. In some embodiments, the second scan by laser 132 in this step generates the second profile signal 134. After the second profile signal 134 is generated, processor 102 may access it from its stored location. For example, processor 102 may access the second profile signal 134 stored in laser 132 or memory 104. Method 2000 may then determine whether the desired teat 203 is found in the second profile signal 134. For example, processor 102 may analyze the second profile signal 134 generated by laser 132 using any appropriate method described herein in order to determine whether the desired teat 203 is located in the second profile signal 134. As a specific example, step 2010 may include any of the methods described above with respect to FIGS. 9-13B and 15-16 in order to determine whether the desired teat 203 is located in the second profile signal 134. In some embodiments, the desired teat 203 is determined to be located at a second scan location within the second profile signal 134. If the desired teat 203 is found in the second profile signal 134, method 2000 proceeds to step 2080. Otherwise, if the desired teat 203 is not found in the second profile signal 134, method 2000 proceeds to step 2070.

At step 2070, the robotic arm is commanded to move back to a previous location. In some embodiments, the previous location is the first scan location determined in step 2010. In other embodiments, the previous location of this step is the first location of step 2030. Processor 102 may issue one or more commands to robotic arm 200 to move and adjust teat cup 210 as appropriate (e.g., raise, lower, move in any appropriate direction, etc.) in order to move it or any portion of robotic arm 200 (e.g., laser 132) to the previous location. After step 2070, method 2000 proceeds back to step 2010.

At step 2080, method 2000 attempts to attach teat cup 210 to the desired teat 203. For example, processor 102 may issue one or more commands to robotic arm 200 to attach teat cup 210 to the desired teat 203. Robotic arm 200 may move and adjust teat cup 210 as appropriate (e.g., raise, lower, move in any appropriate direction, etc.) in order to attach teat cup 210 to the desired teat 203. After step 2080, method 2000 may end.

Particular embodiments may repeat one or more steps of method 2000, where appropriate. Although this disclosure describes and illustrates particular steps of method 2000 as occurring in a particular order, this disclosure contemplates any suitable steps of method 2000 occurring in any suitable order (e.g., any temporal order). Moreover, although this disclosure describes and illustrates an example teat attachment method including the particular steps of method 2000, this disclosure contemplates any suitable teat attachment method including any suitable steps, which may include all, some, or none of the steps of method 2000, where appropriate. Furthermore, although this disclosure describes and illustrates particular components, devices, or systems carrying out particular steps of method 2000, this disclosure contemplates any suitable combination of any suitable components, devices, or systems carrying out any suitable steps of method 2000.

FIG. 21 illustrates a flowchart of an embodiment of a teat attachment method 2100 that may be used by vision system 100. In general, method 2100 may be utilized by vision system 100 to attach teat cup 210 to a desired teat 203 of dairy livestock 202 when certain teats 203 are hidden by other teats 203 (e.g., front teats 203 are hidden by rear teats 203 when approached by robotic arm 200 from the rear of dairy livestock 202). Typically, method 2100 is utilized when robotic arm 200 is closer to dairy livestock 202. As a specific example, method 2100 may be utilized when robotic arm 200 is at approximately a second distance 214 away from the dairy livestock 202, as described above. Method 2100 may begin in step 2110.

At step 2110, method 2100 determines whether a teat 203 in which teat cup 210 is to be attached is a front teat 203. As described above, front teats 203 are closer to the head of dairy livestock 202, and rear teats 203 are closer to the rear of dairy livestock 202. In some embodiments, processor 102 accesses any appropriate stored information as described herein in order to determine whether teat 203 in which teat cup 210 is to be attached is a front teat 203. For example, processor 102 may utilize teat identifiers 127, teat location information 130, position maps 131, or any other information described herein. If it is determined in step 2110 that teat 203 in which teat cup 210 is to be attached is a front teat 203, method 2100 proceeds to step 2130. Otherwise, if it is determined in step 2110 that teat 203 in which teat cup 210 is to be attached is not a front teat 203 (i.e., is a rear teat 203), method 2100 ends or proceeds to step 2120 where a different algorithm for attaching teat cup 210 to dairy livestock 202 is executed.

At step 2130, method 2100 determines: 1) a front teat position associated with front teat 203 in which teat cup 210 is to be attached, and 2) a rear teat position associated with a rear teat 203 that is on the same side of dairy livestock 202 as the front teat 203 (e.g., both of the left side). As specific examples, if the front teat 203 is a right front teat 203, the rear teat 203 is a right rear teat 203. In some embodiments, the front and rear teat positions are determined from historical teat location information. In some embodiments, the historical teat location information may be any of the information previously described in reference to livestock information database 114 (e.g., teat location information 130, position maps 131, etc.) In some embodiments, the front and rear teat positions may be obtained from historical information for the location of teats 203 on a particular dairy livestock 202. In some embodiments, the front and rear teat positions may be obtained from any other appropriate method as described herein.

Additionally in step 2130, method 2100 determines an amount of separation between the front and rear teats 203 using the front and rear teat positions previously determined in this step. For example, processor 102 determines the front and rear teat positions using any of the methods described above with respect to FIGS. 9-13B and 15-16. Processor 102 may then compare the two positions in order to determine the amount of separation (i.e., distances) between the front teat 203 and rear teat 203. Examples of the determined distances may be distances 1112, 1114, 1116, and 1118 of FIG. 11A and distances 1126 and 1128 of FIG. 11B.

At step 2140, method 2100 determines whether the amount of separation determined in step 2130 is greater than or equal to a predetermined distance. In some embodiments, the predetermined distance is 1 cm. In some embodiments, the predetermined distance is substantially equal to 1 cm (e.g., is within 0-5% or 5-10% of 1 cm). If it is determined in step 2140 that the amount of separation determined in step 2130 is greater than or equal to the predetermined distance, method 2100 proceeds to step 2150. If it is determined in step 2140 that the amount of separation determined in step 2130 is not greater than or equal to the predetermined distance, method 2100 ends or executes a different algorithm in step 2120 for attaching teat cup 210 to dairy livestock 202 (e.g., method 1700, 1800, etc.).

At step 2150, an updated front teat position is calculated based on the amount of separation between the front teat 203 and the rear teat 203 determined in step 2130. In some embodiments, this step may include adding half of the amount of separation between the front teat 203 and the rear teat 203 to the front teat position as determined in step 2130. For example, if the amount of separation determined in step 2130 is 4 cm, step 2150 may include adding 2 cm (i.e., half of the amount of separation) to the front teat position as determined in step 2130 to calculate the updated front teat position.

At step 2160, robotic arm 200 is commanded to move to a first location that corresponds to the updated front teat position from step 2150. For example, processor 102 may command robotic arm 200 to move to a first location corresponding to the updated front teat position. Processor 102 may issue one or more commands to robotic arm 200 to move (e.g., raise, lower, move in any appropriate direction, etc.) so that teat cup 210, laser 132, or any other portion of robotic arm 200 is at the first location.

At step 2170, method 2100 commands the robotic arm to move up a predetermined amount. For example, processor 102 issues one or more instructions to robotic arm 200 to move up a predetermined amount relative to the ground on which dairy livestock 202 is standing. In some embodiments, the predetermined amount is less than or equal to 5 mm. In some embodiments, the predetermined amount is substantially equal to 5 mm (e.g., is within 0-5% or 5-10% of 5 mm).

At step 2180, at least one scan of dairy livestock 202 is preformed. For example, processor 102 may command laser 132 on robotic arm 200 to perform a first scan of teats 203 of dairy livestock 202 after robotic arm 200 moves up the predetermined amount in step 2170. In some embodiments, the first scan by laser 132 in this step generates a first profile signal 134. After the first profile signal 134 is generated, processor 102 may access it from its stored location. For example, processor 102 may access the first profile signal 134 stored in laser 132 or memory 104. Method 2100 may then determine whether the desired teat (e.g., front teat 203) is found in the first profile signal 134. For example, processor 102 may analyze the first profile signal 134 generated by laser 132 using any appropriate method described herein in order to determine whether the front teat 203 is located in the first profile signal 134. As a specific example, step 2180 may include any of the methods described above with respect to FIGS. 9-13B and 15-16 in order to determine whether the front teat 203 is located in the first profile signal 134. If the front teat 203 is found in the first profile signal 134, method 2100 proceeds to step 2190. Otherwise, if the front teat 203 is not found in the first profile signal 134, method 2100 proceeds back to step 2170.

At step 2190, method 2100 attempts to attach teat cup 210 to the front teat 203 of dairy livestock 202. For example, processor 102 may issue one or more commands to robotic arm 200 to attach teat cup 210 to the front teat 203. Robotic arm 200 may move and adjust teat cup 210 as appropriate (e.g., raise, lower, move in any appropriate direction, etc.) in order to attach teat cup 210 to the front teat 203. After step 2190, method 2100 may end. In some embodiments, method 2100 may additionally include utilizing a positioner (e.g., a tail paddle) to move one or more teats 203 out of the way so that vision system 100 can locate and attach teat cup 210 to hidden teats 203. For example, processor 102 may command a paddle to move one or more of rear teats 203 to a new position (e.g. up, to the left, or to the right) to prevent interference with vision system 100. This may allow vision system 100 to approach and attach teat cup 210 to one of front teats 203 in a more efficient and accurate manner. In general, the positioner may be any device coupled to robotic arm 200 that is able to mechanically move teats 203. In some embodiments, the positioner may be tail positioner 1710 as described in FIGS. 17-19 and their associated descriptions in U.S. patent application Ser. No. 15/282,479 entitled "Vision System with Tail Positioner," which is incorporated herein by reference in its entirety. In some embodiments, method 2100 may utilize a positioner to move rear teats 203 prior to any of steps 2110-2170. As a specific example, but not by way of limitation, method 2100 may utilize a positioner to move one or more of rear teats 203 out of the way of vision system 100 before step 2160 where robotic arm 200 is commanded to move to the first location that corresponds to the updated front teat position from step 2150. Using a positioner to move one or more teats 203 out of the way of vision system 100 may increase the efficiency and accuracy of method 2100 and vision system 100.

Particular embodiments may repeat one or more steps of method 2100, where appropriate. Although this disclosure describes and illustrates particular steps of method 2100 as occurring in a particular order, this disclosure contemplates any suitable steps of method 2100 occurring in any suitable order (e.g., any temporal order). Moreover, although this disclosure describes and illustrates an example teat attachment method including the particular steps of method 2100, this disclosure contemplates any suitable teat attachment method including any suitable steps, which may include all, some, or none of the steps of method 2100, where appropriate. Furthermore, although this disclosure describes and illustrates particular components, devices, or systems carrying out particular steps of method 2100, this disclosure contemplates any suitable combination of any suitable components, devices, or systems carrying out any suitable steps of method 2100.

FIG. 22 illustrates a flowchart of an embodiment of a method 2200 for selecting teat attachment algorithms using vision system 100. In general, method 2200 may be utilized by vision system 100 to automatically select an appropriate attachment algorithm for attaching teat cup 210 to a desired teat 203 of dairy livestock 202. Method 2200 utilizes counters in order to decide which algorithms work best for particular dairy livestock 202. In some embodiments, the counters indicate the type of dairy livestock 202 is being approached (e.g., fresh, unsettled dairy livestock 202 vs. older, settled dairy livestock 202). Method 2200 may be utilized when robotic arm 200 is closer to dairy livestock 202. As a specific example, method 2200 may be utilized when robotic arm 200 is at approximately a second distance 214 away from the dairy livestock 202, as described above. Method 2200 may begin in step 2210.

At step 2210, method 2200 accesses a first and a second success counter. In some embodiments, the first success counter is associated with a successful attachment of a teat cup 210 to a dairy livestock 202 using a first attach algorithm, and the second success counter is associated with a successful attachment of the teat cup 210 to the dairy livestock 202 using a second attach algorithm. In some embodiments, each success counter is associated with a specific dairy livestock 202. In some embodiments, the success counters are stored in one or more memory devices such as memory 104 or livestock information database 114. In some embodiments, the first attach algorithm is method 1700 and the second attach algorithm is method 1800.

At step 2220, method 2200 determines whether the first success counter is greater than the second success counter. For example, processor 102 may access the first and second success counters stored in memory and compare the two counters. If the first success counter is greater than the second success counter, method 2200 proceeds to step 2230 where the first attach algorithm is executed. If the first success counter is not greater than the second success counter (e.g., if the first success counter is less than or equal to the second success counter), method 2200 proceeds to step 2240 where the second attach algorithm is executed.

At step 2230, method 2200 executes the first attach algorithm in order to attempt to attach teat cup 210 to dairy livestock 202 using robotic arm 200. For example, processor 102 may execute method 1700 as described above with respect to FIG. 17.

At step 2250, method 2200 determines whether teat cup 210 was successfully attached to dairy livestock 202 using the first attach algorithm in step 2230. In some embodiments, processor 102 may utilize laser 132 and/or 3D camera 136 in order to determine whether teat cup 210 was successfully attached to dairy livestock 202. In some embodiments, other sensors on robotic arm 200 (e.g., flow sensors) may be utilized to determine whether teat cup 210 was successfully attached to dairy livestock 202. In some embodiments, an operator may select an option to indicate to vision system 100 that teat cup 210 was successfully attached to dairy livestock 202. If it is determined in this step that teat cup 210 was successfully attached to dairy livestock 202, method 2200 proceeds to step 2270. Otherwise, if it is determined in this step that teat cup 210 was not successfully attached to dairy livestock 202, method 2200 proceeds to step 2240 where the second attach algorithm is executed.

At step 2270, the first success counter is accessed and incremented. In some embodiments, each dairy livestock 202 has an assigned success counter for the first attach algorithm. The success counters and their current values may be stored in any appropriate memory of vision system 100 such as memory 104 or livestock information database 114 and may be initialized to zero. In this step, processor 102 increments the value of the first success counter by one and stores the updated value back in the appropriate memory device (e.g., memory 104 or livestock information database 114). After step 2270, method 2200 may end.

At step 2240, method 2200 executes the second attach algorithm in order to attempt to attach teat cup 210 to dairy livestock 202 using robotic arm 200. For example, processor 102 may execute method 1800 as described above with respect to FIG. 18.

At step 2260, method 2200 determines whether teat cup 210 was successfully attached to dairy livestock 202 using the second attach algorithm in step 2240. In some embodiments, processor 102 may utilize laser 132 and/or 3D camera 136 in order to determine whether teat cup 210 was successfully attached to dairy livestock 202. In some embodiments, other sensors on robotic arm 200 (e.g., flow sensors) may be utilized to determine whether teat cup 210 was successfully attached to dairy livestock 202. In some embodiments, an operator may select an option to indicate to vision system 100 that teat cup 210 was successfully attached to dairy livestock 202. If it is determined in this step that teat cup 210 was successfully attached to dairy livestock 202, method 2200 proceeds to step 2280. Otherwise, if it is determined in this step that teat cup 210 was not successfully attached to dairy livestock 202, method 2200 proceeds to step 2230 where the first attach algorithm is executed.

At step 2280, the second success counter is accessed and incremented. In some embodiments, each dairy livestock 202 has an assigned success counter for the second attach algorithm. The success counters and their current values may be stored in any appropriate memory of vision system 100 such as memory 104 or livestock information database 114 and may be initialized to zero. In this step, processor 102 increments the value of the second success counter by one and stores the updated value back in the appropriate memory device (e.g., memory 104 or livestock information database 114). After step 2280, method 2200 may end.

Particular embodiments may repeat one or more steps of method 2200, where appropriate. Although this disclosure describes and illustrates particular steps of method 2200 as occurring in a particular order, this disclosure contemplates any suitable steps of method 2200 occurring in any suitable order (e.g., any temporal order). Moreover, although this disclosure describes and illustrates an example algorithm selection method including the particular steps of method 2200, this disclosure contemplates any suitable algorithm selection method including any suitable steps, which may include all, some, or none of the steps of method 2200, where appropriate. Furthermore, although this disclosure describes and illustrates particular components, devices, or systems carrying out particular steps of method 2200, this disclosure contemplates any suitable combination of any suitable components, devices, or systems carrying out any suitable steps of method 2200.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A vision system comprising:
    a robotic arm configured to attach a teat cup to a dairy livestock in a stall;
    one or more memory devices configured to store a plurality of success counters, each success counter associated with a successful attachment of the teat cup to a particular dairy livestock using a particular attach algorithm; and
    a processor communicatively coupled to the robotic arm and the one or more memory devices, the processor configured to:
        access a first success counter associated with a first attach algorithm;
        access a second success counter associated with a second attach algorithm;
        determine whether the first success counter is greater than the second success counter;
        if it is determined that the first success counter is greater than the second success counter:
            execute the first attach algorithm in order to attempt to attach the teat cup to the dairy livestock using the robotic arm;
            determine that the teat cup was successfully attached to the dairy livestock using the first attach algorithm; and
            in response to determining that the teat cup was successfully attached to the dairy livestock using the first attach algorithm, increment the first success counter; and
        if it is determined that the first success counter is not greater than the second success counter:
            execute the second attach algorithm in order to attempt to attach the teat cup to the dairy livestock using the robotic arm;
            determine that the teat cup was successfully attached to the dairy livestock using the second attach algorithm; and
            in response to determining that the teat cup was successfully attached to the dairy livestock using the second attach algorithm, increment the second success counter.

2. The vision system of claim 1, wherein the processor is further configured to:
    determine that the teat cup was not successfully attached to the dairy livestock using the first attach algorithm; and
    in response to determining that the teat cup was not successfully attached to the dairy livestock using the first attach algorithm:
        execute the second attach algorithm in order to attempt to attach the teat cup to the dairy livestock using the robotic arm;
        determine that the teat cup was successfully attached to the dairy livestock using the second attach algorithm; and
        in response to determining that the teat cup was successfully attached to the dairy livestock using the second attach algorithm, increment the second success counter and store the incremented second success counter in the one or more memory devices.

3. The vision system of claim 1, wherein the processor is further configured to:
    determine that the teat cup was not successfully attached to the dairy livestock using the second attach algorithm; and
    in response to determining that the teat cup was not successfully attached to the dairy livestock using the second attach algorithm:
        execute the first attach algorithm in order to attempt to attach the teat cup to the dairy livestock using the robotic arm;
        determine that the teat cup was successfully attached to the dairy livestock using the first attach algorithm;
        in response to determining that the teat cup was successfully attached to the dairy livestock using the first attach algorithm, increment the first success counter and store the incremented first success counter in the one or more memory devices.

4. The vision system of claim 1, wherein the processor is further configured to:
    store the incremented first success counter in the one or more memory devices; and
    store the incremented second success counter in the one or more memory devices.

5. The vision system of claim 1, wherein executing the first attach algorithm in order to attempt to attach the teat cup to the dairy livestock using the robotic arm comprises sending one or more instructions to the robotic arm and a laser coupled to the robotic arm.

6. The vision system of claim 1, wherein executing the second attach algorithm in order to attempt to attach the teat cup to the dairy livestock using the robotic arm comprises sending one or more instructions to the robotic arm and a laser coupled to the robotic arm.

7. The vision system of claim 1, wherein determining that the teat cup was successfully attached to the dairy livestock comprises analyzing a profile signal generated by a laser by scanning the dairy livestock.

8. A method, comprising:
    accessing, by a processor, a first success counter associated with a successful attachment of a teat cup to a dairy livestock using a first attach algorithm;
    accessing, by the processor, a second success counter associated with a successful attachment of the teat cup to the dairy livestock using a second attach algorithm;
    determining, by the processor, whether the first success counter is greater than the second success counter;
    if it is determined that the first success counter is greater than the second success counter:
        executing, by the processor, the first attach algorithm in order to attempt to attach the teat cup to the dairy livestock using a robotic arm;
        determining, by the processor, that the teat cup was successfully attached to the dairy livestock using the first attach algorithm; and in response to determining that the teat cup was successfully attached to the dairy livestock using the first attach algorithm, incrementing, by the processor, the first success counter; and if it is determined that the first success counter is not greater than the second success counter:
   executing, by the processor, the second attach algorithm in order to attempt to attach the teat cup to the dairy livestock using the robotic arm;
   determining, by the processor, that the teat cup was successfully attached to the dairy livestock using the second attach algorithm; and
   in response to determining that the teat cup was successfully attached to the dairy livestock using the second attach algorithm, incrementing, by the processor, the second success counter.

9. The method of claim 8, further comprising:
determining, by the processor, that the teat cup was not successfully attached to the dairy livestock using the first attach algorithm; and
in response to determining that the teat cup was not successfully attached to the dairy livestock using the first attach algorithm:
   executing, by the processor, the second attach algorithm in order to attempt to attach the teat cup to the dairy livestock using the robotic arm;
   determining, by the processor, that the teat cup was successfully attached to the dairy livestock using the second attach algorithm; and
   in response to determining that the teat cup was successfully attached to the dairy livestock using the second attach algorithm, incrementing, by the processor, the second success counter.

10. The method of claim 8, further comprising:
determining, by the processor, that the teat cup was not successfully attached to the dairy livestock using the second attach algorithm; and
in response to determining that the teat cup was not successfully attached to the dairy livestock using the second attach algorithm:
   executing, by the processor, the first attach algorithm in order to attempt to attach the teat cup to the dairy livestock using the robotic arm;
   determining, by the processor, that the teat cup was successfully attached to the dairy livestock using the first attach algorithm;
   in response to determining that the teat cup was successfully attached to the dairy livestock using the first attach algorithm, incrementing, by the processor, the first success counter.

11. The method of claim 8, further comprising:
storing, by the processor, the incremented first success counter in the one or more memory devices; and
storing, by the processor, the incremented second success counter in the one or more memory devices.

12. The method of claim 8, wherein executing the first attach algorithm in order to attempt to attach the teat cup to the dairy livestock using the robotic arm comprises sending one or more instructions to the robotic arm and a laser coupled to the robotic arm.

13. The method of claim 8, wherein executing the second attach algorithm in order to attempt to attach the teat cup to the dairy livestock using the robotic arm comprises sending one or more instructions to the robotic arm and a laser coupled to the robotic arm.

14. The method of claim 8, wherein determining that the teat cup was successfully attached to the dairy livestock comprises analyzing a profile signal generated by a laser by scanning the dairy livestock.

15. One or more computer-readable non-transitory storage media comprising a software program that, when executed by one or more processors, cause the one or more processors to:
access a first success counter associated with a successful attachment of a teat cup to a dairy livestock using a first attach algorithm;
access a second success counter associated with a successful attachment of the teat cup to the dairy livestock using a second attach algorithm;
determine whether the first success counter is greater than the second success counter;
if it is determined that the first success counter is greater than the second success counter:
   execute the first attach algorithm in order to attempt to attach the teat cup to the dairy livestock using the robotic arm;
   determine that the teat cup was successfully attached to the dairy livestock using the first attach algorithm; and
   in response to determining that the teat cup was successfully attached to the dairy livestock using the first attach algorithm, increment the first success counter; and
if it is determined that the first success counter is not greater than the second success counter:
   execute the second attach algorithm in order to attempt to attach the teat cup to the dairy livestock using the robotic arm;
   determine that the teat cup was successfully attached to the dairy livestock using the second attach algorithm; and
   in response to determining that the teat cup was successfully attached to the dairy livestock using the second attach algorithm, increment the second success counter.

16. The one or more computer-readable non-transitory storage media of claim 15, the software program, when executed by the one or more processors, further cause the one or more processors to:
determine that the teat cup was not successfully attached to the dairy livestock using the first attach algorithm; and
in response to determining that the teat cup was not successfully attached to the dairy livestock using the first attach algorithm:
   execute the second attach algorithm in order to attempt to attach the teat cup to the dairy livestock using the robotic arm;
   determine that the teat cup was successfully attached to the dairy livestock using the second attach algorithm; and
   in response to determining that the teat cup was successfully attached to the dairy livestock using the second attach algorithm, increment the second success counter and store the incremented second success counter in the one or more memory devices.

17. The one or more computer-readable non-transitory storage media of claim 15, the software program, when executed by the one or more processors, further cause the one or more processors to:

determine that the teat cup was not successfully attached to the dairy livestock using the second attach algorithm; and in response to determining that the teat cup was not successfully attached to the dairy livestock using the second attach algorithm:

execute the first attach algorithm in order to attempt to attach the teat cup to the dairy livestock using the robotic arm;

determine that the teat cup was successfully attached to the dairy livestock using the first attach algorithm;

in response to determining that the teat cup was successfully attached to the dairy livestock using the first attach algorithm, increment the first success counter and store the incremented first success counter in the one or more memory devices.

18. The one or more computer-readable non-transitory storage media of claim 15, wherein executing the first attach algorithm in order to attempt to attach the teat cup to the dairy livestock using the robotic arm comprises sending one or more instructions to the robotic arm and a laser coupled to the robotic arm.

19. The one or more computer-readable non-transitory storage media of claim 15, wherein executing the second attach algorithm in order to attempt to attach the teat cup to the dairy livestock using the robotic arm comprises sending one or more instructions to the robotic arm and a laser coupled to the robotic arm.

20. The one or more computer-readable non-transitory storage media of claim 15, wherein determining that the teat cup was successfully attached to the dairy livestock comprises analyzing a profile signal generated by a laser by scanning the dairy livestock.

* * * * *